US009909333B2

(12) United States Patent  
Hayes et al.

(10) Patent No.: US 9,909,333 B2  
(45) Date of Patent: Mar. 6, 2018

(54) SWIMMING POOL CLEANER WITH HYDROCYCLONIC PARTICLE SEPARATOR AND/OR SIX-ROLLER DRIVE SYSTEM

(71) Applicant: Hayward Industries, Inc., Elizabeth, NJ (US)

(72) Inventors: Graham M. Hayes, Winston-Salem, NC (US); Scott Teuscher, Advance, NC (US); Edward Lawrence Marciano, Lexington, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 0 days.

(21) Appl. No.: 15/006,869

(22) Filed: Jan. 26, 2016

(65) Prior Publication Data

US 2016/0215516 A1    Jul. 28, 2016

Related U.S. Application Data

(60) Provisional application No. 62/107,565, filed on Jan. 26, 2015.

(51) Int. Cl.
*E04H 4/16*        (2006.01)
*B01D 21/26*       (2006.01)
(Continued)

(52) U.S. Cl.
CPC .......... *E04H 4/1654* (2013.01); *B01D 21/267* (2013.01); *B04C 5/24* (2013.01); *B04C 9/00* (2013.01); *B04C 2009/002* (2013.01)

(58) Field of Classification Search
CPC ....... E04H 4/1654; B01D 21/267; B04C 9/00; B04C 2009/002; B04C 5/24
(Continued)

(56) References Cited

U.S. PATENT DOCUMENTS 2,446,481 A    8/1948   Letterman
2,671,560 A    3/1954   Fontein et al.
(Continued)

FOREIGN PATENT DOCUMENTS

DE    102009057079 A1    8/2010
DE    102011014750 A1    9/2012
(Continued)

OTHER PUBLICATIONS

PCT Invitation to Pay Additional Fees, and Where Applicable, Protest Fee, dated Mar. 23, 2016, issued in connection with PCT International Application No. PCT/US16/14914 (2 pages).
(Continued)

*Primary Examiner* — Fred Prince
(74) *Attorney, Agent, or Firm* — McCarter & English, LLP

(57) ABSTRACT

Exemplary embodiments are directed to pool cleaners, generally including a canister body, a filtering medium assembly and a cyclone block. The canister body includes an inner chamber within inner walls of the canister body. The filtering medium assembly can be disposed within the inner chamber of the canister body. The cyclone block can be disposed within the inner chamber of the canister body and can be at least partially surrounded by the filtering medium assembly. The cyclone block includes a plurality of individual cyclone containers. A first cyclonic flow can be generated between the inner walls of the canister body and the filtering medium assembly. A second cyclonic flow can be generated within each of the plurality of cyclone containers.

90 Claims, 43 Drawing Sheets

(51) Int. Cl.
*B04C 9/00* (2006.01)
*B04C 5/24* (2006.01)

(58) Field of Classification Search
USPC ..... 210/167.16, 167.17, 416.1, 416.2; 15/1.7
See application file for complete search history.

(56) References Cited

U.S. PATENT DOCUMENTS

| | | | |
|---|---|---|---|
| 2,731,102 A * | 1/1956 | James | B04C 5/06 55/321 |
| 2,765,918 A | 10/1956 | Fontein et al. | |
| 2,945,559 A | 7/1960 | Buckman | |
| 2,999,563 A | 9/1961 | Wehn et al. | |
| 3,186,550 A | 6/1965 | Beduhn | |
| 3,288,294 A | 11/1966 | Frey | |
| 3,771,290 A | 11/1973 | Stethem | |
| 3,794,052 A | 2/1974 | Koble, Jr. et al. | |
| 3,868,739 A | 3/1975 | Hargrave | |
| 3,946,692 A | 3/1976 | Sierra et al. | |
| 4,100,641 A | 7/1978 | Pansini | |
| 4,154,680 A | 5/1979 | Sommer | |
| 4,168,557 A | 9/1979 | Rasch et al. | |
| 4,261,710 A | 4/1981 | Sullivan | |
| 4,299,051 A | 11/1981 | Pauly et al. | |
| 4,306,329 A | 12/1981 | Yokoi | |
| 4,338,697 A | 7/1982 | Broadwater | |
| 4,429,429 A | 2/1984 | Altschul | |
| 4,449,265 A | 5/1984 | Hoy | |
| 4,597,871 A | 7/1986 | Okouchi et al. | |
| 4,713,096 A | 12/1987 | Kajihara | |
| 4,726,902 A | 2/1988 | Hubbard | |
| 4,768,532 A | 9/1988 | Johnson | |
| 4,776,954 A | 10/1988 | Brooks | |
| 4,778,599 A | 10/1988 | Brooks | |
| 4,839,063 A | 6/1989 | Brooks | |
| 4,959,146 A | 9/1990 | Kristan | |
| 5,001,800 A | 3/1991 | Parenti et al. | |
| 5,114,575 A | 5/1992 | Yano et al. | |
| 5,172,445 A | 12/1992 | Chandler | |
| 5,197,158 A | 3/1993 | Moini | |
| 5,245,723 A | 9/1993 | Sommer | |
| 5,277,157 A | 1/1994 | Teich | |
| 5,337,434 A | 8/1994 | Erlich | |
| 5,351,355 A | 10/1994 | Chiniara | |
| 5,450,644 A | 9/1995 | Berman | |
| 5,454,129 A | 10/1995 | Kell | |
| 5,569,371 A | 10/1996 | Perling | |
| 5,617,600 A | 4/1997 | Frattini | |
| 5,839,156 A | 11/1998 | Park et al. | |
| 5,842,243 A | 12/1998 | Horvath et al. | |
| 5,842,532 A | 12/1998 | Fox et al. | |
| 5,846,273 A | 12/1998 | Dyson | |
| 5,858,038 A | 1/1999 | Dyson et al. | |
| 5,879,545 A | 3/1999 | Antoun | |
| 5,882,512 A | 3/1999 | Denkewicz, Jr. et al. | |
| 5,882,530 A | 3/1999 | Chase | |
| 5,893,938 A | 4/1999 | Dyson et al. | |
| 5,920,939 A | 7/1999 | Worwag | |
| 5,948,246 A | 9/1999 | Zuk, Jr. | |
| 5,980,639 A | 11/1999 | Trickey et al. | |
| D418,640 S | 1/2000 | Veloskey et al. | |
| 6,013,178 A | 1/2000 | Strano et al. | |
| 6,090,174 A | 7/2000 | Douma et al. | |
| 6,090,219 A | 7/2000 | Henkin et al. | |
| 6,109,451 A | 8/2000 | Grimes | |
| 6,115,864 A | 9/2000 | Davidsson et al. | |
| 6,129,775 A | 10/2000 | Conrad et al. | |
| 6,141,826 A | 11/2000 | Conrad et al. | |
| 6,155,657 A | 12/2000 | Erlich et al. | |
| 6,156,212 A | 12/2000 | Rader et al. | |
| 6,168,716 B1 | 1/2001 | Conrad et al. | |
| 6,193,787 B1 | 2/2001 | Dyson et al. | |
| 6,206,547 B1 | 3/2001 | Erlich | |
| 6,210,575 B1 | 4/2001 | Chase et al. | |
| 6,221,134 B1 | 4/2001 | Conrad et al. | |
| 6,228,151 B1 | 5/2001 | Conrad et al. | |
| 6,228,256 B1 | 5/2001 | Ekenback et al. | |
| 6,228,260 B1 | 5/2001 | Conrad et al. | |
| 6,231,645 B1 | 5/2001 | Conrad et al. | |
| 6,231,649 B1 | 5/2001 | Dyson et al. | |
| 6,238,451 B1 | 5/2001 | Conrad et al. | |
| 6,238,579 B1 | 5/2001 | Paxton et al. | |
| 6,251,296 B1 | 6/2001 | Conrad et al. | |
| 6,261,330 B1 | 7/2001 | Dyson et al. | |
| 6,277,278 B1 | 8/2001 | Conrad et al. | |
| 6,280,611 B1 | 8/2001 | Henkin et al. | |
| 6,289,553 B1 | 9/2001 | Dyson | |
| 6,294,084 B1 | 9/2001 | Henkin et al. | |
| 6,299,699 B1 | 10/2001 | Porat et al. | |
| 6,312,594 B1 | 11/2001 | Conrad et al. | |
| 6,334,234 B1 | 1/2002 | Conrad et al. | |
| 6,344,064 B1 | 2/2002 | Conrad | |
| 6,365,039 B1 | 4/2002 | Henkin et al. | |
| 6,383,266 B1 | 5/2002 | Conrad et al. | |
| 6,385,810 B1 | 5/2002 | Lang | |
| 6,391,095 B1 | 5/2002 | Conrad et al. | |
| 6,398,878 B1 | 6/2002 | Henkin et al. | |
| 6,398,973 B1 | 6/2002 | Saunders et al. | |
| 6,409,916 B1 | 6/2002 | Zelas et al. | |
| 6,412,133 B1 | 7/2002 | Erlich et al. | |
| 6,419,719 B2 | 7/2002 | Conrad et al. | |
| 6,423,217 B1 | 7/2002 | Campbell et al. | |
| 6,425,931 B1 | 7/2002 | Croggon | |
| 6,428,589 B1 | 8/2002 | Bair et al. | |
| 6,440,197 B1 | 8/2002 | Conrad et al. | |
| 6,461,508 B1 | 10/2002 | Thomson | |
| 6,473,927 B1 | 11/2002 | Sommer | |
| 6,482,252 B1 | 11/2002 | Conrad et al. | |
| 6,485,638 B2 | 11/2002 | Henkin et al. | |
| 6,502,269 B1 | 1/2003 | Balchan et al. | |
| 6,508,366 B2 | 1/2003 | Danger et al. | |
| 6,524,358 B2 | 2/2003 | Yang | |
| 6,530,484 B1 | 3/2003 | Bosman | |
| 6,533,834 B2 | 3/2003 | Conrad et al. | |
| 6,540,918 B2 | 4/2003 | Gil et al. | |
| 6,542,788 B2 | 4/2003 | Hosonuma et al. | |
| 6,546,593 B2 | 4/2003 | Oh et al. | |
| 6,582,489 B2 | 6/2003 | Conrad | |
| 6,595,753 B1 | 7/2003 | Illingworth et al. | |
| 6,596,044 B1 | 7/2003 | Bilek et al. | |
| 6,596,045 B2 | 7/2003 | Qian | |
| 6,596,046 B2 | 7/2003 | Conrad et al. | |
| 6,596,169 B1 | 7/2003 | Rong et al. | |
| 6,599,340 B2 | 7/2003 | Conrad et al. | |
| 6,601,255 B1 | 8/2003 | van der Meyden et al. | |
| 6,607,572 B2 | 8/2003 | Gammack et al. | |
| 6,607,575 B2 | 8/2003 | Oh et al. | |
| 6,616,094 B2 | 9/2003 | Illingworth | |
| 6,627,074 B2 | 9/2003 | Lincke | |
| 6,640,385 B2 | 11/2003 | Oh et al. | |
| 6,652,742 B2 | 11/2003 | Henkin et al. | |
| 6,679,930 B1 | 1/2004 | An et al. | |
| 6,679,993 B1 | 1/2004 | Charuckyj et al. | |
| RE38,479 E | 3/2004 | Henkin et al. | |
| 6,719,830 B2 | 4/2004 | Illingworth et al. | |
| 6,735,817 B2 | 5/2004 | Bair et al. | |
| 6,735,818 B2 | 5/2004 | Hamada et al. | |
| 6,736,873 B2 | 5/2004 | Conrad et al. | |
| 6,740,144 B2 | 5/2004 | Conrad et al. | |
| 6,742,613 B2 | 6/2004 | Erlich et al. | |
| 6,743,401 B2 | 6/2004 | Guerra | |
| 6,746,500 B1 | 6/2004 | Park et al. | |
| 6,758,226 B2 | 7/2004 | Porat | |
| 6,758,343 B1 | 7/2004 | Soto | |
| 6,782,585 B1 | 8/2004 | Conrad et al. | |
| 6,811,687 B2 | 11/2004 | Illingworth | |
| 6,811,713 B2 | 11/2004 | Arnaud | |
| 6,815,918 B2 | 11/2004 | Porat et al. | |
| 6,818,033 B2 | 11/2004 | North | |
| 6,818,036 B1 | 11/2004 | Seaman | |
| 6,835,222 B2 | 12/2004 | Gammack | |
| 6,836,931 B2 | 1/2005 | Bone | |
| 6,842,931 B2 | 1/2005 | Porat et al. | |
| 6,874,197 B1 | 4/2005 | Conrad et al. | |

(56) References Cited

U.S. PATENT DOCUMENTS

| | | | |
|---|---|---|---|
| 6,886,205 B1 | 5/2005 | Pichon |
| 6,890,375 B2 | 5/2005 | Huber |
| 6,896,720 B1 | 5/2005 | Arnold et al. |
| 6,896,819 B2 | 5/2005 | Morse et al. |
| 6,902,596 B2 | 6/2005 | Conrad et al. |
| 6,912,739 B1 | 7/2005 | Nowell |
| 6,915,544 B2 | 7/2005 | Roney et al. |
| 6,918,155 B2 | 7/2005 | Yacobi |
| 6,936,095 B2 | 8/2005 | North |
| 6,944,909 B2 | 9/2005 | Bair et al. |
| 6,954,960 B2 | 10/2005 | Pichon |
| 6,965,814 B2 | 11/2005 | Hadari |
| 6,971,136 B2 | 12/2005 | Horvath et al. |
| 6,974,488 B2 | 12/2005 | Dyson |
| 6,989,039 B2 | 1/2006 | Vuijk |
| 6,991,666 B2 | 1/2006 | Organ |
| 6,991,721 B2 | 1/2006 | Yuan |
| 7,014,671 B2 | 3/2006 | Oh |
| 7,039,980 B2 | 5/2006 | Van Der Meyden et al. |
| 7,060,182 B2 | 6/2006 | Erlich et al. |
| 7,065,826 B1 | 6/2006 | Arnold |
| D526,101 S | 8/2006 | Blanc-Tailleur |
| 7,097,680 B2 | 8/2006 | Oh |
| D529,669 S | 10/2006 | Blanc-Tailleur |
| 7,117,554 B2 | 10/2006 | Pichon |
| 7,117,557 B2 | 10/2006 | Bair et al. |
| 7,118,632 B2 | 10/2006 | Sumonthee |
| 7,128,770 B2 | 10/2006 | Oh et al. |
| 7,143,502 B2 | 12/2006 | Porat et al. |
| 7,144,515 B2 | 12/2006 | Brosemer |
| 7,160,346 B2 | 1/2007 | Park |
| 7,162,770 B2 | 1/2007 | Davidshofer |
| 7,165,284 B2 | 1/2007 | Erlich et al. |
| 7,169,201 B2 | 1/2007 | Oh et al. |
| 7,175,682 B2 | 2/2007 | Nakai et al. |
| 7,178,188 B1 | 2/2007 | Jaakola |
| 7,179,314 B2 | 2/2007 | Conrad et al. |
| 7,182,090 B2 | 2/2007 | Abbott |
| 7,199,711 B2 | 4/2007 | Field |
| 7,222,390 B2 | 5/2007 | Cipolla et al. |
| 7,241,393 B2 | 7/2007 | Stoy et al. |
| 7,247,181 B2 | 7/2007 | Hansen et al. |
| 7,261,754 B2 | 8/2007 | Oh et al. |
| 7,273,506 B2 | 9/2007 | Oh et al. |
| 7,291,190 B2 | 11/2007 | Dummelow et al. |
| 7,291,193 B2 | 11/2007 | Oh et al. |
| 7,294,159 B2 | 11/2007 | Oh et al. |
| 7,309,368 B2 | 12/2007 | Oh et al. |
| 7,314,560 B2 | 1/2008 | Yoshida et al. |
| 7,316,751 B2 | 1/2008 | Horvath et al. |
| 7,326,268 B2 | 2/2008 | Oh et al. |
| 7,329,294 B2 | 2/2008 | Conrad |
| 7,329,309 B2 | 2/2008 | Smith et al. |
| 7,331,078 B2 | 2/2008 | Grey |
| 7,335,241 B2 | 2/2008 | Oh et al. |
| 7,335,242 B2 | 2/2008 | Oh |
| 7,337,803 B2 | 3/2008 | van der Meijden et al. |
| 7,343,643 B2 | 3/2008 | Kondo |
| 7,361,200 B2 | 4/2008 | Oh et al. |
| 7,395,579 B2 | 7/2008 | Oh |
| 7,404,492 B2 | 7/2008 | Kucher et al. |
| 7,410,517 B2 | 8/2008 | Han et al. |
| 7,419,522 B2 | 9/2008 | Arnold |
| 7,425,268 B2 | 9/2008 | Russell |
| 7,436,143 B2 | 10/2008 | Lakshmanan et al. |
| 7,449,039 B2 | 11/2008 | Hong et al. |
| 7,449,040 B2 | 11/2008 | Conrad et al. |
| 7,455,708 B2 | 11/2008 | Conrad et al. |
| 7,462,212 B2 | 12/2008 | Han et al. |
| 7,470,299 B2 | 12/2008 | Han et al. |
| 7,473,289 B2 | 1/2009 | Oh et al. |
| 7,488,362 B2 | 2/2009 | Jeong et al. |
| 7,491,255 B2 | 2/2009 | Jung |
| 7,494,523 B2 | 2/2009 | Oh et al. |
| 7,497,899 B2 | 3/2009 | Han et al. |
| 7,503,458 B2 | 3/2009 | Kim et al. |
| 7,513,924 B2 | 4/2009 | French et al. |
| 7,520,996 B2 | 4/2009 | Van Noland |
| 7,534,279 B2 | 5/2009 | Oh et al. |
| 7,537,625 B2 | 5/2009 | Han et al. |
| 7,547,336 B2 | 6/2009 | Fester et al. |
| 7,547,337 B2 | 6/2009 | Oh et al. |
| 7,547,338 B2 | 6/2009 | Kim et al. |
| 7,547,351 B2 | 6/2009 | Oh et al. |
| 7,556,662 B2 | 7/2009 | Lee et al. |
| 7,563,296 B2 | 7/2009 | Ni |
| 7,563,297 B2 | 7/2009 | Kim |
| 7,563,298 B2 | 7/2009 | Oh |
| 7,581,287 B2 | 9/2009 | Yacobi |
| 7,582,128 B2 | 9/2009 | Hwang et al. |
| 7,582,129 B2 | 9/2009 | Kim et al. |
| 7,588,616 B2 | 9/2009 | Conrad et al. |
| 7,594,943 B2 | 9/2009 | Oh et al. |
| 7,594,944 B2 | 9/2009 | Oh |
| 7,601,188 B2 | 10/2009 | Hwang et al. |
| 7,618,470 B2 | 11/2009 | Eddington et al. |
| 7,628,831 B2 | 12/2009 | Gomiciaga-Pereda et al. |
| 7,628,833 B2 | 12/2009 | Oh |
| 7,651,544 B1 | 1/2010 | Fester et al. |
| 7,655,058 B2 | 2/2010 | Smith |
| 7,655,060 B2 | 2/2010 | Nakai et al. |
| 7,661,381 B2 | 2/2010 | Gorelik et al. |
| 7,662,202 B2 | 2/2010 | Oh et al. |
| 7,678,166 B2 | 3/2010 | Yoo et al. |
| 7,682,412 B2 | 3/2010 | Oh |
| 7,686,858 B2 | 3/2010 | Oh |
| 7,690,066 B2 | 4/2010 | Stoltz et al. |
| 7,708,789 B2 | 5/2010 | Fester |
| 7,708,791 B2 | 5/2010 | Oh et al. |
| 7,722,693 B2 | 5/2010 | Yoo et al. |
| 7,723,934 B2 | 5/2010 | Adam et al. |
| 7,731,770 B2 | 6/2010 | Strutt et al. |
| 7,731,881 B2 | 6/2010 | Dean et al. |
| 7,736,408 B2 | 6/2010 | Bock et al. |
| 7,740,675 B2 | 6/2010 | Conrad |
| 7,740,676 B2 | 6/2010 | Burnham et al. |
| 7,744,667 B2 | 6/2010 | Oh et al. |
| 7,744,668 B2 | 6/2010 | Oh et al. |
| 7,748,079 B2 | 7/2010 | McDowell et al. |
| 7,749,292 B2 | 7/2010 | Pan et al. |
| 7,749,293 B2 | 7/2010 | Conrad |
| 7,757,344 B2 | 7/2010 | Min et al. |
| 7,763,090 B2 | 7/2010 | Gomiciaga-Pereda et al. |
| 7,771,499 B2 | 8/2010 | Oh et al. |
| 7,776,115 B2 | 8/2010 | Oh et al. |
| 7,776,120 B2 | 8/2010 | Conrad |
| 7,785,383 B2 | 8/2010 | Oh et al. |
| 7,794,515 B2 | 9/2010 | Oh et al. |
| 7,803,207 B2 | 9/2010 | Conrad |
| 7,806,950 B2 | 10/2010 | Han et al. |
| 7,811,345 B2 | 10/2010 | Conrad |
| 7,815,702 B2 | 10/2010 | Hyun et al. |
| 7,815,703 B2 | 10/2010 | Park |
| 7,819,933 B2 | 10/2010 | Moon et al. |
| 7,827,643 B2 | 11/2010 | Erlich et al. |
| 7,828,866 B2 | 11/2010 | Courtney et al. |
| 7,842,112 B2 | 11/2010 | Lee et al. |
| 7,849,547 B2 | 12/2010 | Erlich et al. |
| 7,867,306 B2 | 1/2011 | Courtney et al. |
| 7,867,307 B2 | 1/2011 | Bates et al. |
| 7,867,308 B2 | 1/2011 | Conrad |
| 7,874,040 B2 | 1/2011 | Follows et al. |
| 7,879,120 B2 | 2/2011 | Seo et al. |
| 7,879,121 B2 | 2/2011 | Oh |
| 7,882,592 B2 | 2/2011 | Hwang et al. |
| 7,883,560 B2 | 2/2011 | Ni |
| 7,887,612 B2 | 2/2011 | Conrad |
| 7,900,308 B2 | 3/2011 | Erlich et al. |
| 7,902,972 B2 | 3/2011 | Soderkvist et al. |
| 7,908,696 B2 | 3/2011 | Pareti |
| 7,908,697 B2 | 3/2011 | Lavabre et al. |
| 7,909,990 B2 | 3/2011 | Takahashi et al. |
| 7,918,909 B2 | 4/2011 | McDowell |
| 7,931,717 B2 | 4/2011 | Conrad |

(56) References Cited

U.S. PATENT DOCUMENTS

| | | |
|---|---|---|
| 7,935,162 B2 | 5/2011 | Hyun et al. |
| 7,941,895 B2 | 5/2011 | Conrad |
| 7,955,405 B2 | 6/2011 | Smith |
| 7,955,406 B2 | 6/2011 | Smith |
| 7,966,692 B2 | 6/2011 | Kim |
| 7,976,597 B2 | 7/2011 | Smith |
| 7,996,956 B2 | 8/2011 | Wood et al. |
| 7,996,957 B2 | 8/2011 | Kah, Jr. |
| 8,001,652 B2 | 8/2011 | Bair et al. |
| 8,007,653 B2 | 8/2011 | Porat |
| 8,015,659 B2 | 9/2011 | Conrad et al. |
| 8,016,902 B2 | 9/2011 | Makarov |
| 8,021,453 B2 | 9/2011 | Howes |
| 8,032,983 B2 | 10/2011 | Griffith et al. |
| 8,034,140 B2 | 10/2011 | Conrad |
| 8,048,183 B2 | 11/2011 | Conrad |
| 8,051,532 B1 | 11/2011 | Griffith et al. |
| 8,062,398 B2 | 11/2011 | Luo et al. |
| 8,065,778 B2 | 11/2011 | Kim et al. |
| 8,100,999 B2 | 1/2012 | Ashbee et al. |
| 8,114,283 B2 | 2/2012 | Parkinson |
| 8,117,704 B2 | 2/2012 | Schneider et al. |
| 8,118,943 B2 | 2/2012 | Erlich et al. |
| 8,123,935 B2 | 2/2012 | Murray et al. |
| 8,141,191 B2 | 3/2012 | Hui |
| 8,146,201 B2 | 4/2012 | Conrad |
| 8,151,407 B2 | 4/2012 | Conrad |
| 8,152,878 B2 | 4/2012 | McLeod |
| 8,152,883 B2 | 4/2012 | Lee |
| 8,152,905 B2 | 4/2012 | Tuomas |
| 8,176,596 B2 | 5/2012 | Conrad |
| 8,182,563 B2 | 5/2012 | Horne et al. |
| 8,182,653 B2 | 5/2012 | Vaders |
| 8,192,515 B2 | 6/2012 | Conrad |
| 8,202,352 B2 | 6/2012 | Hu et al. |
| 8,205,756 B2 | 6/2012 | Backman |
| 8,209,815 B2 | 7/2012 | Makarov et al. |
| 8,220,096 B2 | 7/2012 | Hui |
| 8,241,430 B2 | 8/2012 | Erlich et al. |
| 8,250,702 B2 | 8/2012 | Conrad |
| 8,257,457 B2 | 9/2012 | Horne et al. |
| 8,268,029 B2 | 9/2012 | Yoo |
| 8,291,545 B2 | 10/2012 | Ivarsson et al. |
| 8,292,979 B2 | 10/2012 | Conrad |
| 8,296,891 B1 | 10/2012 | Rowam et al. |
| 8,296,900 B2 | 10/2012 | Conrad |
| 8,307,485 B2 | 11/2012 | Sumonthee |
| 8,308,832 B2 | 11/2012 | Yoo |
| 8,341,789 B2 | 1/2013 | Garti |
| 8,343,339 B2 | 1/2013 | Sumonthee |
| 8,348,064 B2 | 1/2013 | Tandon |
| 8,359,705 B2 | 1/2013 | Conrad |
| 8,375,509 B2 | 2/2013 | Bates et al. |
| 8,393,030 B2 | 3/2013 | Pichon et al. |
| 8,393,031 B2 | 3/2013 | Pichon et al. |
| 8,393,032 B2 | 3/2013 | Pichon et al. |
| 8,393,033 B2 | 3/2013 | Pichon et al. |
| 8,393,035 B2 | 3/2013 | Pichon et al. |
| 8,393,036 B2 | 3/2013 | Mastio et al. |
| 8,397,330 B2 | 3/2013 | Pichon et al. |
| 8,397,331 B2 | 3/2013 | Pichon et al. |
| 8,402,599 B2 | 3/2013 | Charlton et al. |
| 8,403,149 B2 | 3/2013 | Kadota et al. |
| 8,409,335 B2 | 4/2013 | Dyson et al. |
| 8,424,142 B2 | 4/2013 | Garti |
| 8,425,642 B2 | 4/2013 | Worker et al. |
| 8,434,182 B2 | 5/2013 | Horvath et al. |
| 8,434,193 B2 | 5/2013 | Sunderland et al. |
| 8,438,684 B2 | 5/2013 | Mastio et al. |
| 8,438,700 B2 | 5/2013 | Makarov et al. |
| 8,443,477 B2 | 5/2013 | Jang et al. |
| 8,453,295 B2 | 6/2013 | Studebaker |
| 8,468,633 B2 | 6/2013 | Arnold |
| 8,470,081 B2 | 6/2013 | Kulprathipanja et al. |
| 8,474,081 B2 | 7/2013 | Stoltz |
| 8,484,799 B2 | 7/2013 | Conrad |
| 8,495,789 B2 | 7/2013 | Nicolaou et al. |
| 8,499,411 B2 | 8/2013 | Tran et al. |
| 8,505,143 B2 | 8/2013 | Finezilber |
| 8,505,747 B2 | 8/2013 | Ford |
| 8,510,889 B2 | 8/2013 | Hui et al. |
| 8,510,907 B2 | 8/2013 | Conrad |
| 8,528,164 B2 | 9/2013 | Conrad |
| 8,544,093 B2 | 9/2013 | Unagami et al. |
| 8,561,732 B2 | 10/2013 | Schoon |
| 8,562,705 B2 | 10/2013 | Courtney et al. |
| 8,567,008 B2 | 10/2013 | Conrad |
| 8,568,500 B2 | 10/2013 | Han et al. |
| 8,572,802 B2 | 11/2013 | Dyson et al. |
| 8,578,555 B2 | 11/2013 | Conrad |
| 8,590,102 B2 | 11/2013 | Conrad |
| 8,601,641 B2 | 12/2013 | Conrad |
| 8,603,335 B2 | 12/2013 | Beard et al. |
| 8,607,407 B2 | 12/2013 | Conrad |
| 8,615,836 B2 | 12/2013 | Pichon et al. |
| 8,627,533 B2 | 1/2014 | Pichon et al. |
| 8,640,303 B2 | 2/2014 | Conrad |
| 8,640,304 B2 | 2/2014 | Conrad |
| 8,661,594 B2 | 3/2014 | Hui et al. |
| 8,661,605 B2 | 3/2014 | Svendsen et al. |
| 8,667,640 B2 | 3/2014 | Conrad |
| 8,671,512 B2 | 3/2014 | Qian et al. |
| 8,677,558 B2 | 3/2014 | Conrad |
| 8,679,211 B1 | 3/2014 | Makarov |
| 8,689,401 B2 | 4/2014 | Makarov et al. |
| 8,695,155 B2 | 4/2014 | Dyson et al. |
| 8,696,821 B2 | 4/2014 | Erlich et al. |
| 8,701,896 B2 | 4/2014 | Levitt et al. |
| 8,702,848 B2 | 4/2014 | Kulprathipanja et al. |
| 8,707,511 B2 | 4/2014 | Horne |
| 8,707,512 B2 | 4/2014 | Horne |
| 8,709,243 B2 | 4/2014 | Hui |
| 8,713,751 B2 | 5/2014 | Conrad |
| 8,726,461 B2 | 5/2014 | Makarov et al. |
| 8,727,137 B1 | 5/2014 | Blue |
| 8,739,359 B2 | 6/2014 | Conrad |
| 8,752,226 B2 | 6/2014 | Erlich et al. |
| 8,752,239 B2 | 6/2014 | Conrad |
| 8,756,740 B2 | 6/2014 | Hui |
| 8,763,200 B2 | 7/2014 | Kim et al. |
| 8,763,202 B2 | 7/2014 | Conrad |
| 8,769,767 B2 | 7/2014 | Conrad |
| 8,769,769 B1 | 7/2014 | Owen |
| 8,771,504 B2 | 7/2014 | Mastio et al. |
| 8,776,309 B2 | 7/2014 | Conrad |
| 8,784,652 B2 | 7/2014 | Rief et al. |
| 8,789,709 B2 | 7/2014 | Backman et al. |
| 8,800,088 B2 | 8/2014 | Garti |
| 8,800,104 B2 | 8/2014 | Conrad |
| 8,806,707 B2 | 8/2014 | Soen et al. |
| 8,806,708 B2 | 8/2014 | Sutton et al. |
| 8,806,711 B2 | 8/2014 | Jang |
| 8,813,305 B2 | 8/2014 | Conrad |
| 8,826,492 B2 | 9/2014 | Dyson et al. |
| 8,828,228 B2 | 9/2014 | Imagawa et al. |
| 8,844,093 B2 | 9/2014 | Conrad |
| 8,863,352 B2 | 10/2014 | Conrad |
| 8,863,353 B2 | 10/2014 | Smith |
| 8,869,344 B2 | 10/2014 | Conrad |
| 8,869,346 B2 | 10/2014 | Han et al. |
| 8,871,030 B2 | 10/2014 | Chen et al. |
| 8,875,342 B2 | 11/2014 | Conrad |
| 8,875,903 B2 | 11/2014 | Lean et al. |
| 8,883,006 B2 | 11/2014 | Kovach et al. |
| 8,888,999 B2 | 11/2014 | Van der Meijden |
| 8,898,856 B2 | 12/2014 | Ruben |
| 8,898,857 B2 | 12/2014 | Conrad |
| 8,914,941 B2 | 12/2014 | Kim et al. |
| 8,919,571 B2 | 12/2014 | Clark et al. |
| 8,931,136 B2 | 1/2015 | Mantell et al. |
| 8,935,828 B2 | 1/2015 | Ashbee et al. |
| 8,950,039 B2 | 2/2015 | Conrad |
| 8,973,214 B2 | 3/2015 | Conrad |
| 8,984,712 B2 | 3/2015 | Peng |

(56) References Cited

U.S. PATENT DOCUMENTS

| | | |
|---|---|---|
| 8,997,309 B2 | 4/2015 | Conrad |
| 8,997,310 B2 | 4/2015 | Davidshofer et al. |
| 9,009,912 B2 | 4/2015 | Conrad |
| 9,016,480 B2 | 4/2015 | Tandon |
| 9,027,201 B2 | 5/2015 | Conrad |
| 9,044,125 B2 | 6/2015 | Follows |
| 9,044,126 B2 | 6/2015 | Dyson |
| 9,066,643 B2 | 6/2015 | Conrad |
| 9,078,549 B2 | 7/2015 | Conrad |
| 9,084,522 B2 | 7/2015 | Conrad |
| 9,084,523 B2 | 7/2015 | Conrad |
| 9,084,524 B2 | 7/2015 | Conrad |
| 9,095,245 B2 | 8/2015 | Conrad |
| 9,095,246 B2 | 8/2015 | MacNaughton |
| 9,119,513 B2 | 9/2015 | Conrad |
| 9,119,514 B2 | 9/2015 | Conrad |
| 9,131,818 B2 | 9/2015 | Peace et al. |
| 9,155,435 B2 | 10/2015 | Maeda et al. |
| 9,439,547 B2 | 9/2016 | Makarov |
| 2001/0032809 A1 | 10/2001 | Henkin et al. |
| 2002/0011050 A1 | 1/2002 | Hansen et al. |
| 2002/0104790 A1 | 8/2002 | Lincke |
| 2003/0132152 A1 | 7/2003 | Illingworth |
| 2003/0159411 A1 | 8/2003 | Hansen et al. |
| 2003/0177594 A1 | 9/2003 | Van Der Meyden et al. |
| 2004/0021439 A1 | 2/2004 | Porat et al. |
| 2004/0025268 A1 | 2/2004 | Porat et al. |
| 2004/0074524 A1 | 4/2004 | Horvath et al. |
| 2004/0216251 A1 | 11/2004 | Van Der Meijden et al. |
| 2005/0177974 A1 | 8/2005 | Conrad et al. |
| 2005/0262652 A1 | 12/2005 | Sumonthee |
| 2005/0279682 A1 | 12/2005 | Davidson et al. |
| 2006/0059637 A1 | 3/2006 | Fridman et al. |
| 2006/0130445 A1 | 6/2006 | Park et al. |
| 2006/0130448 A1 | 6/2006 | Han et al. |
| 2006/0130449 A1 | 6/2006 | Han et al. |
| 2006/0137310 A1 | 6/2006 | Conrad et al. |
| 2006/0162299 A1 | 7/2006 | North |
| 2006/0207041 A1 | 9/2006 | Van Der Meyden et al. |
| 2006/0218744 A1 | 10/2006 | Hayashi et al. |
| 2006/0225768 A1 | 10/2006 | Erlich et al. |
| 2006/0230722 A1 | 10/2006 | Oh et al. |
| 2006/0230725 A1* | 10/2006 | Han .............. A47L 9/1625 55/345 |
| 2006/0254226 A1 | 11/2006 | Jeon |
| 2006/0277874 A1 | 12/2006 | Yoo |
| 2007/0028405 A1 | 2/2007 | Garti |
| 2007/0067930 A1 | 3/2007 | Garti |
| 2007/0079584 A1 | 4/2007 | Kim et al. |
| 2007/0079586 A1 | 4/2007 | Kim |
| 2007/0084160 A1 | 4/2007 | Kim |
| 2007/0095029 A1 | 5/2007 | Min et al. |
| 2007/0125715 A1 | 6/2007 | Christiansen et al. |
| 2007/0144116 A1 | 6/2007 | Hong et al. |
| 2007/0144117 A1 | 6/2007 | Park et al. |
| 2007/0214754 A1 | 9/2007 | Kim |
| 2007/0234691 A1 | 10/2007 | Han et al. |
| 2007/0251032 A1 | 11/2007 | Pichon et al. |
| 2007/0272274 A1 | 11/2007 | Adam et al. |
| 2008/0087299 A1 | 4/2008 | Erlich et al. |
| 2008/0099409 A1 | 5/2008 | Gorelik et al. |
| 2008/0125943 A1 | 5/2008 | Finezilber |
| 2008/0128343 A1 | 6/2008 | Garti |
| 2008/0222821 A1 | 9/2008 | Pichon |
| 2008/0235887 A1 | 10/2008 | Horvath et al. |
| 2008/0236628 A1 | 10/2008 | Horvath et al. |
| 2008/0250580 A1 | 10/2008 | Lavabre et al. |
| 2008/0289140 A1 | 11/2008 | Courtney et al. |
| 2008/0307589 A1 | 12/2008 | Schneider et al. |
| 2009/0031524 A1* | 2/2009 | Courtney .............. A47L 9/1625 15/347 |
| 2009/0038275 A1 | 2/2009 | Lee |
| 2009/0045110 A1 | 2/2009 | Garti |
| 2009/0205161 A1 | 8/2009 | Conrad |
| 2009/0232701 A1 | 9/2009 | Porat |
| 2009/0255069 A1 | 10/2009 | Hui |
| 2009/0282627 A1 | 11/2009 | Porat |
| 2009/0301522 A1 | 12/2009 | Abehasera et al. |
| 2009/0307854 A1 | 12/2009 | Garti |
| 2010/0005617 A1 | 1/2010 | Hyun et al. |
| 2010/0058546 A1* | 3/2010 | Erlich .............. E04H 4/1654 15/1.7 |
| 2010/0065482 A1 | 3/2010 | Sumonthee |
| 2010/0089014 A1 | 4/2010 | Zhou |
| 2010/0122422 A1 | 5/2010 | Hui |
| 2010/0175217 A1 | 7/2010 | Conrad |
| 2010/0223752 A1 | 9/2010 | Conrad |
| 2010/0229335 A1 | 9/2010 | Conrad |
| 2010/0299865 A1 | 12/2010 | Conrad |
| 2010/0299866 A1 | 12/2010 | Conrad |
| 2010/0306931 A1 | 12/2010 | Garti |
| 2010/0313380 A1 | 12/2010 | Pan et al. |
| 2011/0000030 A1 | 1/2011 | Pichon et al. |
| 2011/0000031 A1 | 1/2011 | Pichon et al. |
| 2011/0000032 A1 | 1/2011 | Pichon et al. |
| 2011/0000033 A1 | 1/2011 | Pichon et al. |
| 2011/0000034 A1 | 1/2011 | Pichon et al. |
| 2011/0000035 A1 | 1/2011 | Pichon et al. |
| 2011/0000036 A1 | 1/2011 | Pichon et al. |
| 2011/0005009 A1 | 1/2011 | Pichon et al. |
| 2011/0016646 A1 | 1/2011 | Pichon et al. |
| 2011/0016659 A1 | 1/2011 | Dyson et al. |
| 2011/0020139 A1 | 1/2011 | Pichon et al. |
| 2011/0023247 A1 | 2/2011 | Pichon et al. |
| 2011/0047727 A1 | 3/2011 | Pichon et al. |
| 2011/0067729 A1 | 3/2011 | Erlich et al. |
| 2011/0131936 A1* | 6/2011 | Chen .............. B01D 45/06 55/418 |
| 2011/0146024 A1 | 6/2011 | Conrad |
| 2011/0154585 A1 | 6/2011 | Mastio et al. |
| 2011/0154586 A1 | 6/2011 | Mastio et al. |
| 2011/0155186 A1 | 6/2011 | Mastio et al. |
| 2011/0162683 A1 | 7/2011 | Mastio et al. |
| 2011/0197932 A1 | 8/2011 | Mastio et al. |
| 2011/0203060 A1 | 8/2011 | Pichon et al. |
| 2011/0209447 A1* | 9/2011 | Worker .............. A47L 9/1641 55/347 |
| 2011/0219574 A1 | 9/2011 | Conrad |
| 2011/0219577 A1 | 9/2011 | Conrad |
| 2011/0302728 A1 | 12/2011 | Sumonthee |
| 2011/0314617 A1 | 12/2011 | Van Der Meijden et al. |
| 2011/0314629 A1 | 12/2011 | Conrad |
| 2011/0314630 A1 | 12/2011 | Conrad |
| 2011/0314631 A1 | 12/2011 | Conrad |
| 2012/0047682 A1 | 3/2012 | Makarov et al. |
| 2012/0060307 A1 | 3/2012 | Stoltz |
| 2012/0079673 A1 | 4/2012 | Wishney et al. |
| 2012/0079674 A1 | 4/2012 | Dyson et al. |
| 2012/0102664 A1* | 5/2012 | Hui .............. E04H 4/1654 15/1.7 |
| 2012/0103365 A1 | 5/2012 | Sumonthee |
| 2012/0210527 A1 | 8/2012 | Erlich et al. |
| 2012/0222251 A1 | 9/2012 | Conrad |
| 2012/0222252 A1 | 9/2012 | Conrad |
| 2012/0222255 A1 | 9/2012 | Conrad |
| 2012/0222257 A1 | 9/2012 | Conrad |
| 2012/0272474 A1 | 11/2012 | Follows et al. |
| 2012/0284956 A1 | 11/2012 | Follows |
| 2012/0284959 A1 | 11/2012 | Gammack |
| 2012/0311814 A1 | 12/2012 | Kah, Jr. |
| 2013/0008840 A1 | 1/2013 | Pesetsky et al. |
| 2013/0030659 A1* | 1/2013 | Porat .............. E04H 4/1654 701/49 |
| 2013/0031744 A1 | 2/2013 | Ota |
| 2013/0091641 A1 | 4/2013 | Ben Zion |
| 2013/0104321 A1 | 5/2013 | Michelon |
| 2013/0110319 A1 | 5/2013 | Michelon |
| 2013/0145574 A1 | 6/2013 | Makarov et al. |
| 2013/0152317 A1 | 6/2013 | Erlich et al. |
| 2013/0160232 A1* | 6/2013 | Peace .............. A47L 9/165 15/353 |
| 2013/0160233 A1 | 6/2013 | Peace et al. |
| 2013/0232722 A1 | 9/2013 | Conrad |
| 2013/0291334 A1 | 11/2013 | Peng |

(56) References Cited

U.S. PATENT DOCUMENTS

| | | |
|---|---|---|
| 2013/0305483 A1 | 11/2013 | Dyson et al. |
| 2013/0333155 A1* | 12/2013 | McLuckie ............ A47L 9/1608 15/347 |
| 2013/0333156 A1 | 12/2013 | Mcluckie et al. |
| 2014/0013538 A1 | 1/2014 | Dyson et al. |
| 2014/0014140 A1 | 1/2014 | Correa |
| 2014/0015959 A1 | 1/2014 | Durvasula et al. |
| 2014/0026356 A1 | 1/2014 | Miefalk |
| 2014/0041151 A1 | 2/2014 | Ford et al. |
| 2014/0042063 A1 | 2/2014 | Rief |
| 2014/0047668 A1 | 2/2014 | Dyson et al. |
| 2014/0053365 A1 | 2/2014 | Gammack et al. |
| 2014/0053367 A1 | 2/2014 | Conrad |
| 2014/0053368 A1 | 2/2014 | Gammack et al. |
| 2014/0064139 A1 | 3/2014 | Mcqueen et al. |
| 2014/0096341 A1 | 4/2014 | Conrad |
| 2014/0154641 A1 | 6/2014 | Bogen |
| 2014/0190900 A1 | 7/2014 | Stewart |
| 2014/0223871 A1 | 8/2014 | Makarov |
| 2014/0237752 A1 | 8/2014 | Conrad |
| 2014/0237755 A1 | 8/2014 | Conrad |
| 2014/0237757 A1 | 8/2014 | Conrad |
| 2014/0237758 A1 | 8/2014 | Conrad |
| 2014/0237759 A1 | 8/2014 | Conrad |
| 2014/0237762 A1 | 8/2014 | Conrad |
| 2014/0237764 A1 | 8/2014 | Conrad |
| 2014/0237765 A1 | 8/2014 | Conrad et al. |
| 2014/0237766 A1 | 8/2014 | Conrad |
| 2014/0237767 A1 | 8/2014 | Conrad |
| 2014/0237768 A1 | 8/2014 | Conrad |
| 2014/0237955 A1 | 8/2014 | Conrad |
| 2014/0237956 A1 | 8/2014 | Conrad |
| 2014/0237964 A1 | 8/2014 | Conrad |
| 2014/0237965 A1 | 8/2014 | Conrad |
| 2014/0245564 A1 | 9/2014 | Conrad |
| 2014/0245565 A1 | 9/2014 | Conrad |
| 2014/0262401 A1 | 9/2014 | Renaud |
| 2014/0271175 A1 | 9/2014 | Kumar et al. |
| 2014/0291220 A1 | 10/2014 | Mastio et al. |
| 2014/0303810 A1 | 10/2014 | van der Meijden et al. |
| 2014/0366313 A1 | 12/2014 | Conrad |
| 2014/0366495 A1 | 12/2014 | Stickney et al. |
| 2015/0000072 A1 | 1/2015 | Conrad |
| 2015/0000073 A1 | 1/2015 | Conrad |
| 2015/0000074 A1 | 1/2015 | Conrad |
| 2015/0000076 A1 | 1/2015 | Conrad |
| 2015/0000077 A1 | 1/2015 | Conrad |
| 2015/0000078 A1 | 1/2015 | Conrad |
| 2015/0000079 A1 | 1/2015 | Conrad |
| 2015/0007409 A1 | 1/2015 | Conrad |
| 2015/0049750 A1 | 2/2015 | Uy et al. |
| 2015/0076048 A1 | 3/2015 | Rief et al. |
| 2015/0096143 A1 | 4/2015 | Conrad |
| 2015/0096144 A1 | 4/2015 | Conrad |
| 2015/0107048 A1 | 4/2015 | Thompson et al. |
| 2015/0113762 A1 | 4/2015 | Robertson |
| 2015/0121645 A1 | 5/2015 | Irfan |
| 2015/0121651 A1 | 5/2015 | Conrad |
| 2015/0182086 A1 | 7/2015 | Dimbylow et al. |
| 2015/0190025 A1 | 7/2015 | Dimbylow et al. |
| 2015/0190026 A1 | 7/2015 | Dimbylow et al. |
| 2015/0208885 A1 | 7/2015 | Conrad |
| 2015/0216382 A1 | 8/2015 | Bower et al. |
| 2015/0216383 A1 | 8/2015 | Bower et al. |
| 2015/0216384 A1 | 8/2015 | Bower et al. |
| 2015/0257617 A1 | 9/2015 | Marsden et al. |
| 2015/0257618 A1 | 9/2015 | Bassett et al. |
| 2015/0320271 A1 | 11/2015 | Dimbylow et al. |
| 2015/0320272 A1 | 11/2015 | Dimbylow et al. |
| 2015/0320273 A1 | 11/2015 | Dimbylow et al. |
| 2016/0145884 A1 | 5/2016 | Erlich et al. |
| 2017/0073990 A1 | 3/2017 | Potucek et al. |
| 2017/0247896 A1 | 8/2017 | Hayes et al. |

FOREIGN PATENT DOCUMENTS

| | | |
|---|---|---|
| DE | 102012012594 A1 | 12/2013 |
| DE | 102012011358 B4 | 3/2014 |
| EP | 223528 A3 | 10/1987 |
| EP | 0314259 A2 | 5/1989 |
| EP | 0468876 A1 | 1/1992 |
| EP | 0565226 A1 | 10/1993 |
| EP | 0657603 A1 | 6/1995 |
| EP | 1002173 A1 | 5/2000 |
| EP | 1122382 A1 | 8/2001 |
| EP | 1041220 A3 | 9/2001 |
| EP | 1124642 B1 | 3/2003 |
| EP | 1124640 B1 | 6/2003 |
| EP | 1087055 B1 | 10/2004 |
| EP | 1489249 A2 | 12/2004 |
| EP | 1689956 A4 | 1/2007 |
| EP | 1785552 A2 | 5/2007 |
| EP | 1849934 A1 | 10/2007 |
| EP | 1287896 B1 | 5/2008 |
| EP | 1921229 A2 | 5/2008 |
| EP | 2059317 A2 | 5/2009 |
| EP | 1751377 B1 | 9/2009 |
| EP | 1925593 A3 | 4/2010 |
| EP | 2170522 A4 | 8/2010 |
| EP | 2116672 A3 | 8/2011 |
| EP | 2235294 B1 | 8/2011 |
| EP | 1972379 A3 | 11/2012 |
| EP | 2358479 B1 | 1/2013 |
| EP | 2554765 A2 | 2/2013 |
| EP | 2558180 A1 | 2/2013 |
| EP | 1712970 A3 | 3/2013 |
| EP | 1746553 A3 | 7/2013 |
| EP | 2624960 A1 | 8/2013 |
| EP | 2632602 A1 | 9/2013 |
| EP | 2654540 A2 | 10/2013 |
| EP | 2678111 A1 | 1/2014 |
| EP | 2333479 A3 | 4/2014 |
| EP | 2706170 A3 | 7/2014 |
| EP | 2725169 A3 | 8/2014 |
| EP | 2447449 A3 | 9/2014 |
| EP | 2804687 A1 | 11/2014 |
| EP | 2163711 A3 | 3/2015 |
| EP | 2842009 A1 | 3/2015 |
| EP | 2764182 A1 | 6/2015 |
| EP | 2771525 B1 | 7/2015 |
| EP | 2891342 A2 | 7/2015 |
| EP | 2820204 B1 | 8/2015 |
| EP | 2743430 A3 | 9/2015 |
| EP | 2829937 B1 | 9/2015 |
| EP | 2771524 B1 | 12/2015 |
| EP | 2516774 B1 | 3/2016 |
| EP | 2450505 B1 | 4/2016 |
| EP | 2743429 B1 | 10/2016 |
| EP | 2919915 B1 | 1/2017 |
| EP | 2006546 A3 | 4/2017 |
| EP | 2185779 B1 | 4/2017 |
| ES | 1071207 U | 5/2010 |
| FR | 2269364 A1 | 11/1975 |
| FR | 2584442 A1 | 1/1987 |
| FR | 2619498 A1 | 2/1989 |
| FR | 2729995 A1 | 8/1996 |
| FR | 2816494 A1 | 5/2003 |
| FR | 2864129 A1 | 6/2005 |
| FR | 2925557 A1 | 6/2009 |
| FR | 2929310 A1 | 10/2009 |
| FR | 2925556 B1 | 1/2010 |
| FR | 2954381 B1 | 5/2013 |
| FR | 2981970 B1 | 11/2013 |
| FR | 2981971 B1 | 12/2013 |
| FR | 2993298 A1 | 1/2014 |
| FR | 2998325 A1 | 5/2014 |
| FR | 2990032 B1 | 6/2014 |
| FR | 2997870 B1 | 1/2015 |
| FR | 2967922 B1 | 3/2015 |
| FR | 2992341 B1 | 3/2015 |
| GB | 667142 A | 2/1952 |
| GB | 737457 A * | 9/1955 |
| GB | 2347875 A | 9/2000 |

(56) References Cited

FOREIGN PATENT DOCUMENTS

| | | | |
|---|---|---|---|
| GB | 2376535 B | 7/2003 | |
| GB | 2462213 B | 12/2010 | |
| GB | 2490613 B | 3/2013 | |
| GB | 2491246 B | 5/2013 | |
| GB | 2503023 A | 12/2013 | |
| GB | 2503253 B | 10/2014 | |
| GB | 2492660 B | 1/2015 | |
| GB | 2519559 B | 11/2015 | |
| GB | 2508853 B | 6/2016 | |
| WO | 9963185 A1 | 12/1999 | |
| WO | 2005118984 A2 | 12/2005 | |
| WO | 2006/038757 A1 | 4/2006 | |
| WO | 2008055070 A3 | 6/2008 | |
| WO | 2008102325 A1 | 8/2008 | |
| WO | WO 2009/104959 A1 | * | 8/2009 |
| WO | 2013045718 A1 | 4/2013 | |
| WO | 2014125866 A1 | 8/2014 | |
| WO | 2014148980 A1 | 9/2014 | |
| WO | 2014150506 A1 | 9/2014 | |
| WO | 2014153121 A1 | 9/2014 | |
| WO | 2014158766 A1 | 10/2014 | |
| WO | 2014168918 A1 | 10/2014 | |
| WO | 2015023622 A1 | 2/2015 | |
| WO | 2015039621 A1 | 3/2015 | |
| WO | 2015040248 A1 | 3/2015 | |
| WO | 2015026019 A8 | 5/2015 | |
| WO | 2015094695 A1 | 6/2015 | |

OTHER PUBLICATIONS

International Search Report of the International Searching Authority dated Jun. 17, 2016, issued in connection with International Application No. PCT/US16/14914 (6 pages).
Written Opinion of the International Searching Authority dated Jun. 17, 2016, issued in connection with International Application No. PCT/US16/14914 (6 pages).
AquaVac, TigerShark Owner's Manual: All models—TigerShark, Plus, 2, 2 Plus & QC. Dec. 2004.
AquaBot Advertisement, Pool & Spa News (Oct. 2009) (2 pages).
Brock Catalog (dated 2005) (8 pages).
Caratti Catalog (dated 2007) (8 pages).
Cleaner shown at archive.org, link for Apr. 4, 2007 (2 sheets): http://web.archive.org/web/20070404093845/http:/www.mariner-3s.com/mariner_en/produkte/navigator/navigator.php.
Digital Image of Aquabot Cleaner (more than one year prior to Sep. 16, 2008) (1 page) Exact Date Unknown.
Digital Image of Dolphin Cleaner (more than one year prior to Sep. 16, 2008) (1 page) Exact Date Unknown.
Digital Image of Merlin Cleaner (more than one year prior to Sep. 16, 2008) (1 page) Exact Date Unknown.
Digital Image of Pool Rover Cleaner (more than one year prior to Sep. 16, 2008) Exact Date Unknown.
Digital Image of Squirrel Cleaner (more than one year prior to Sep. 16, 2008) Exact Date Unknown.
Dolphin 2×2 (more than one year prior to Sep. 16, 2008) (8 pages).
Dolphin Cleaner photos (3 pages) and Dolphin Cleaner page (2 page) (Cleaner seen at a show circa Oct. 2009) Exact Date Unknown.
Dolphin D×2 Hybrid Advertisement (dated 2009) (2 pages).
DX3 and DX4 Cleaners and Related Manuals (more than one year prior to Sep. 16, 2008) (17 pages) Exact Date Unknown.
Hayward Tiger Shark Series Owner's Manual (16 pages) (more than one year prior to Nov. 2, 2009).
Hexagone Cleaners (more than one year prior to Sep. 16, 2008) (8 pages).
Photo of Zodiac Pool Cleaner. www.zodiacpoolsystems.com.
Picture Sheet Showing Multiple Commercial Cleaners (more than one year prior to Sep. 16, 2008) (1 page) Exact Date Unknown.
Picture Sheet Showing Multiple Double-Wide Cleaners (more than one year prior to Sep. 16, 2008) (1 page) Exact Date Unknown.
Polaris 9300 and Vortex 3 Cleaners (manuals dated Copyright 2010 and V3 cleaner seen at a show circa Oct. 2009) (125 pages) Exact Date Unknown.
Smartpool Nitro Cleaner Manual (more than one year prior to Sep. 16, 2008) (56 pages) Exact Date Unknown.
Tiger Shark Owner's Manual (Mar. 2007) Exact Date Unknown.
Wave Cleaner (cleaner seen at show circa Oct./Nov. 2008) (25 pages) Exact Date Unknown.
YouTube Video of Mopper Cleaner, hftp://www.youtube.com/watch?v=d8NAUWH0QCk&feature=BFa&list=ULopZLfx7W4Po, e.g., attached screen shots (45 pages).
Zodiac Baracuda MX 8 Pool Cleaner Owner's Manual (2011) (32 pages).
Zodiac Cybernaut Manual (dated Sep. 3, 2006) (6 pages).
Notice of Allowance dated Jul. 21, 2017, issued in connection with U.S. Appl. No. 15/592,364 (8 pages).
Office Action dated Jun. 7, 2017, issued in connection with U.S. Appl. No. 15/592,398 (8 pages).
Office Action dated Aug. 8, 2017, issued in connection with U.S. Appl. No. 15/592,377 (8 pages).
Office Action dated Jul. 6, 2017, issued in connection with U.S. Appl. No. 15/592,384 (9 pages).
Invitation to Pay Additional Fees and, Where Applicable, Protest Fees issued by the International Searching Authority dated on Jul. 24, 2017, issued in connection with International Application No. PCT/US17/32131 (4 pages).
Hayes, et al., U.S. Appl. No. 15/592,364 entitled "Hydrocyclonic Pool Cleaner" filed with the United States Patent and Trademark Office on May 11, 2017 (445 pages).
Hayes, et al., U.S. Appl. No. 15/592,398 entitled "Pool Cleaner Power Coupling" filed with the United States Patent and Trademark Office on May 11, 2017 (442 pages).
Hayes, et al., U.S. Appl. No. 15/592,244 entitled "Pool Cleaner Canister Handle" filed with the United States Patent and Trademark Office on May 11, 2017 (445 pages).
Hayes, et al., U.S. Appl. No. 15/592,377 entitled "Pool Cleaner Impeller Subassembly" filed with the United States Patent and Trademark Office on May 11, 2017 (446 pages).
Hayes, et al., U.S. Appl. No. 15/592,254 entitled "Pool Cleaner Check Valve" filed with the United States Patent and Trademark Office on May 11, 2017 (443 pages).
Ortiz, et al., U.S. Appl. No. 15/592,266 entitled "Pool Cleaner Filter Medium" filed with the United States Patent and Trademark Office on May 11, 2017 (442 pages).
Ferrell, U.S. Appl. No. 15/592,285 entitled "Pool Cleaner Caddy with Retention Mechanism" filed with the United States Patent and Trademark Office on May 11, 2017 (449 pages).
Marciano, et al., U.S. Appl. No. 15/592,384 entitled "Pool Cleaner Modular Drivetrain" filed with the United States Patent and Trademark Office on May 11, 2017 (444 pages).
Osuna, et al., U.S. Appl. No. 15/592,277 entitled "Pool Cleaner Power Supply with Kickstand" filed with the United States Patent and Trademark Office on May 11, 2017 (445 pages).
Ortiz, et al., U.S. Appl. No. 15/592,307 entitled "Pool Cleaner Power Coupling" filed with the United States Patent and Trademark Office on May 11, 2017 (444 pages).
Teuscher, et al., U.S. Appl. No. 15/592,335 entitled "Pool Cleaner Roller Latch" filed with the United States Patent and Trademark Office on May 11, 2017 (443 pages).
Hayes, et al., U.S. Appl. No. 15/592,392 entitled "Pool Cleaner Roller Assembly" filed with the United States Patent and Trademark Office on May 11, 2017 (447 pages).
Peastrel, et al., U.S. Appl. No. 15/592,352 entitled "Pool Cleaner Power Supply" filed with the United States Patent and Trademark Office on May 11, 2017 (452 pages).
Ferrell, et al., U.S. Appl. No. 15/592,371 entitled "Pool Cleaner Caddy With Removable Wheel Assemblies" filed with the United States Patent and Trademark Office on May 11, 2017 (445 pages).
Hayward Industries, Inc., International Patent Application No. PCT/US17/32131 entitled "Swimming Pool cleaner and Associated Components" filed with the United States Patent and Trademark Office on May 11, 2017 (440 pages).

(56) References Cited

OTHER PUBLICATIONS

International Search Report and Written Opinion dated Sep. 28, 2017, issued in connection with International Application No. PCT/US17132131 (20 pages).
Interview Summary dated Sep. 5, 2017, issued in connection with U.S. Appl. No. 15/592,398 (3 pages).
Notice of Allowance dated Nov. 6, 2017, issued in connection with U.S. Appl. No. 15/592,364 (5 pages).
Notice of Allowance dated Oct. 17, 2017, issued in connection with U.S. Appl. No. 15/592,384 (5 pages).
Notice of Allowance dated Oct. 17, 2017, issued in connection with U.S. Appl. No. 15/592,398 (10 pages).
Notice of Allowance dated Oct. 24, 2017, issued in connection with U.S. Appl. No. 15/592,392 (9 pages).
Notice of Allowance dated Dec. 1, 2017, issued in connection with U.S. Appl. No. 15/592,377 (7 pages).

* cited by examiner

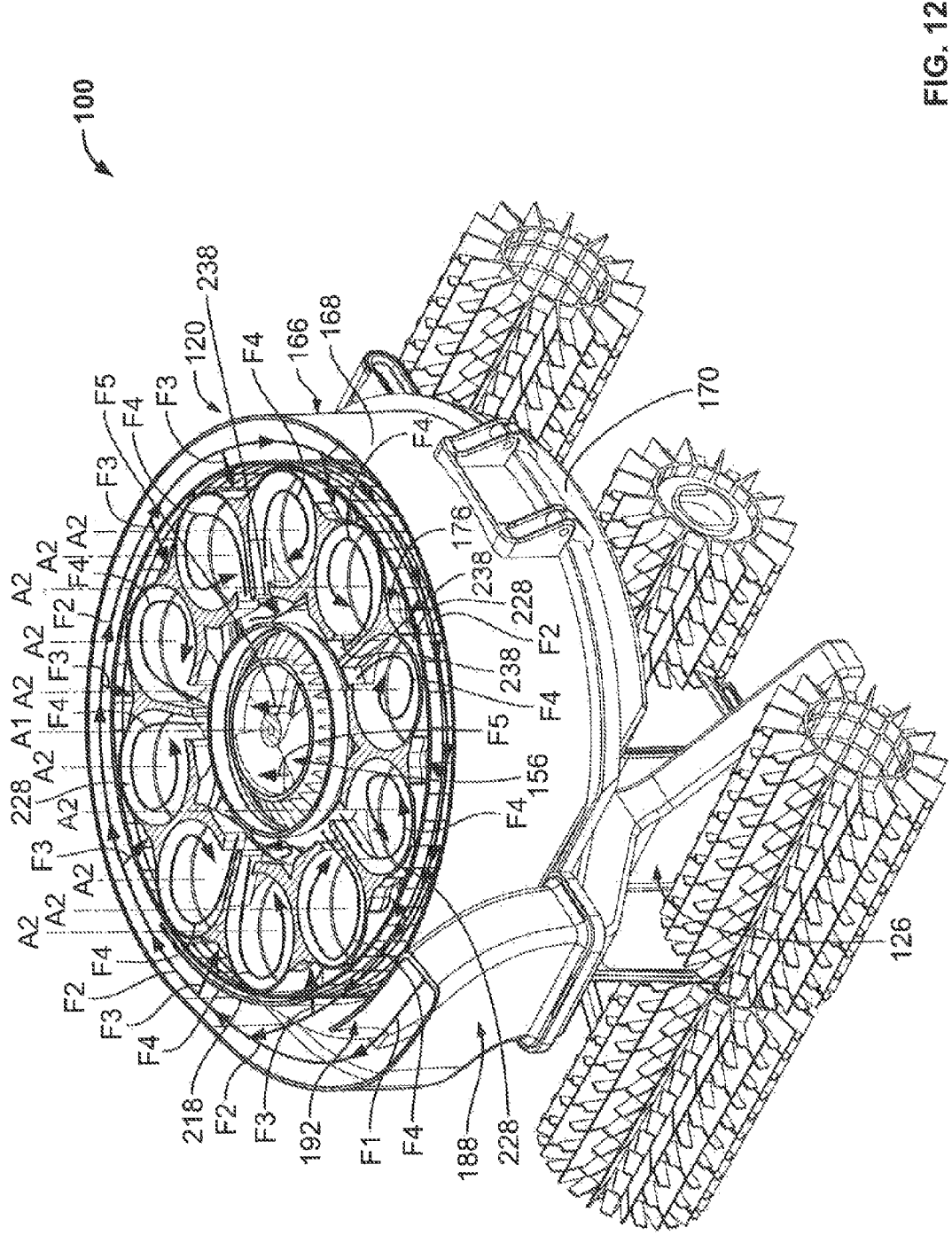

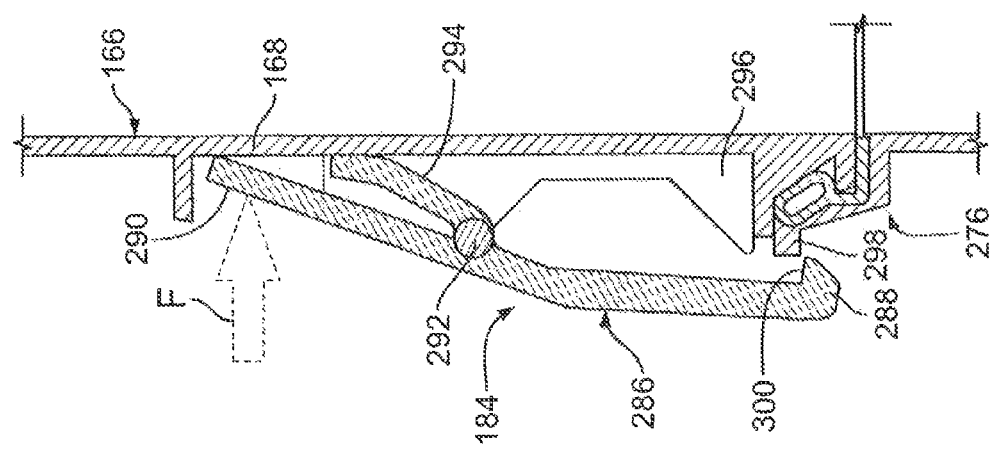
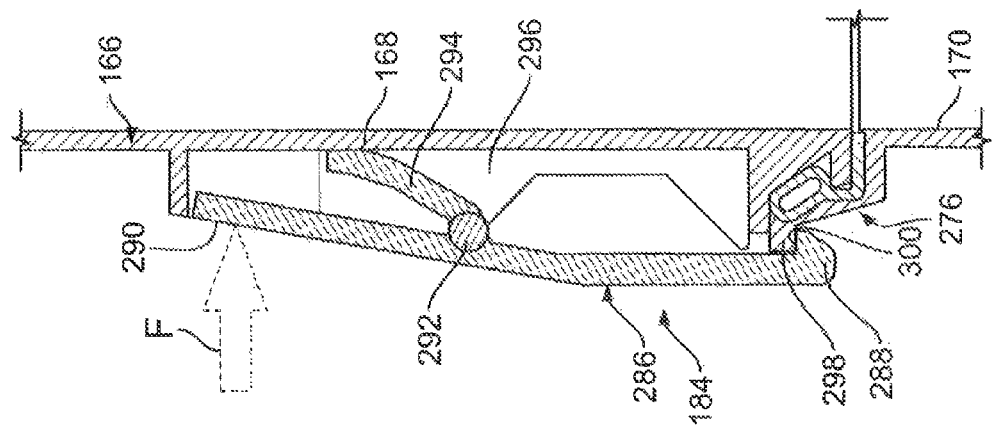

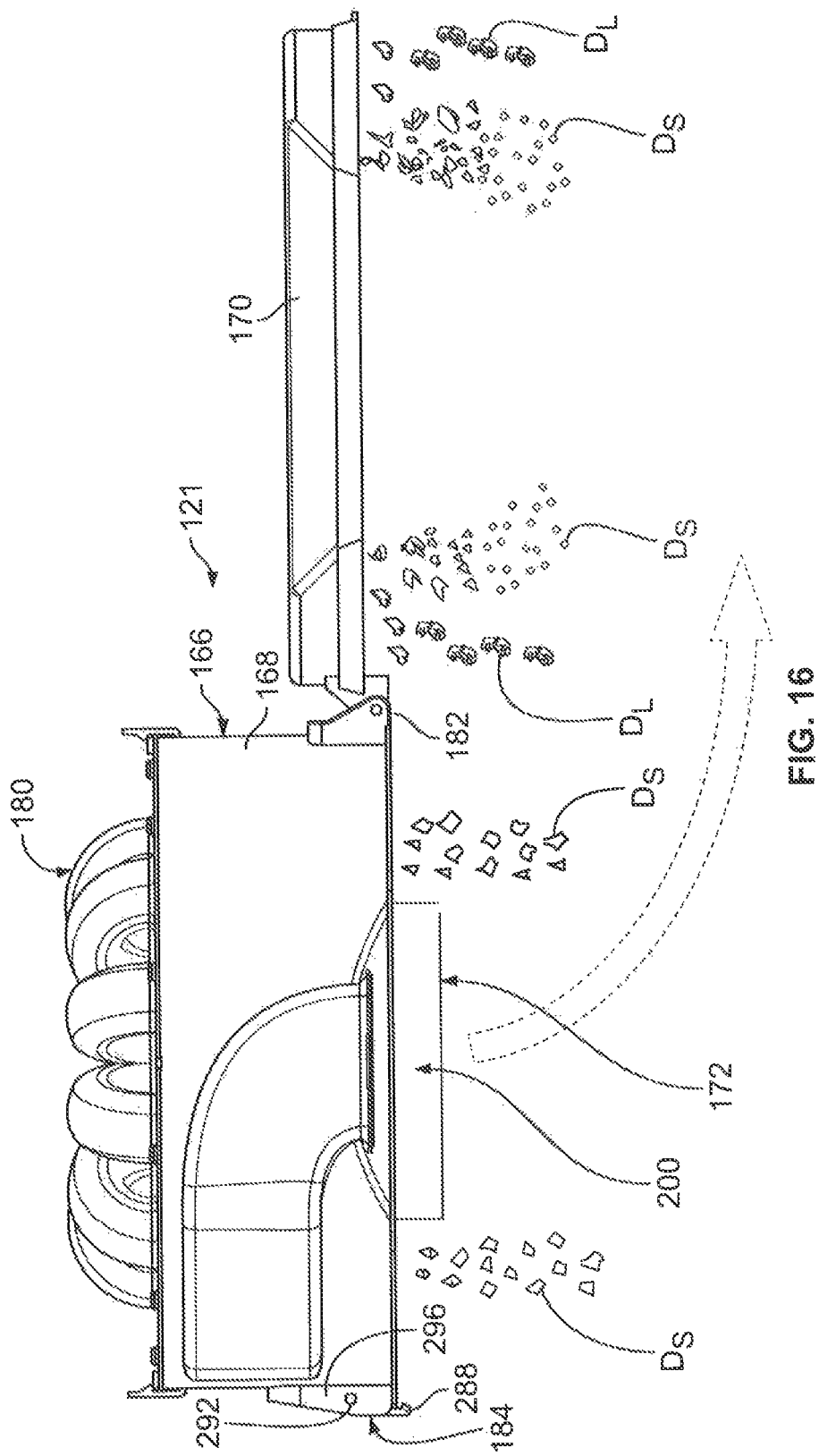

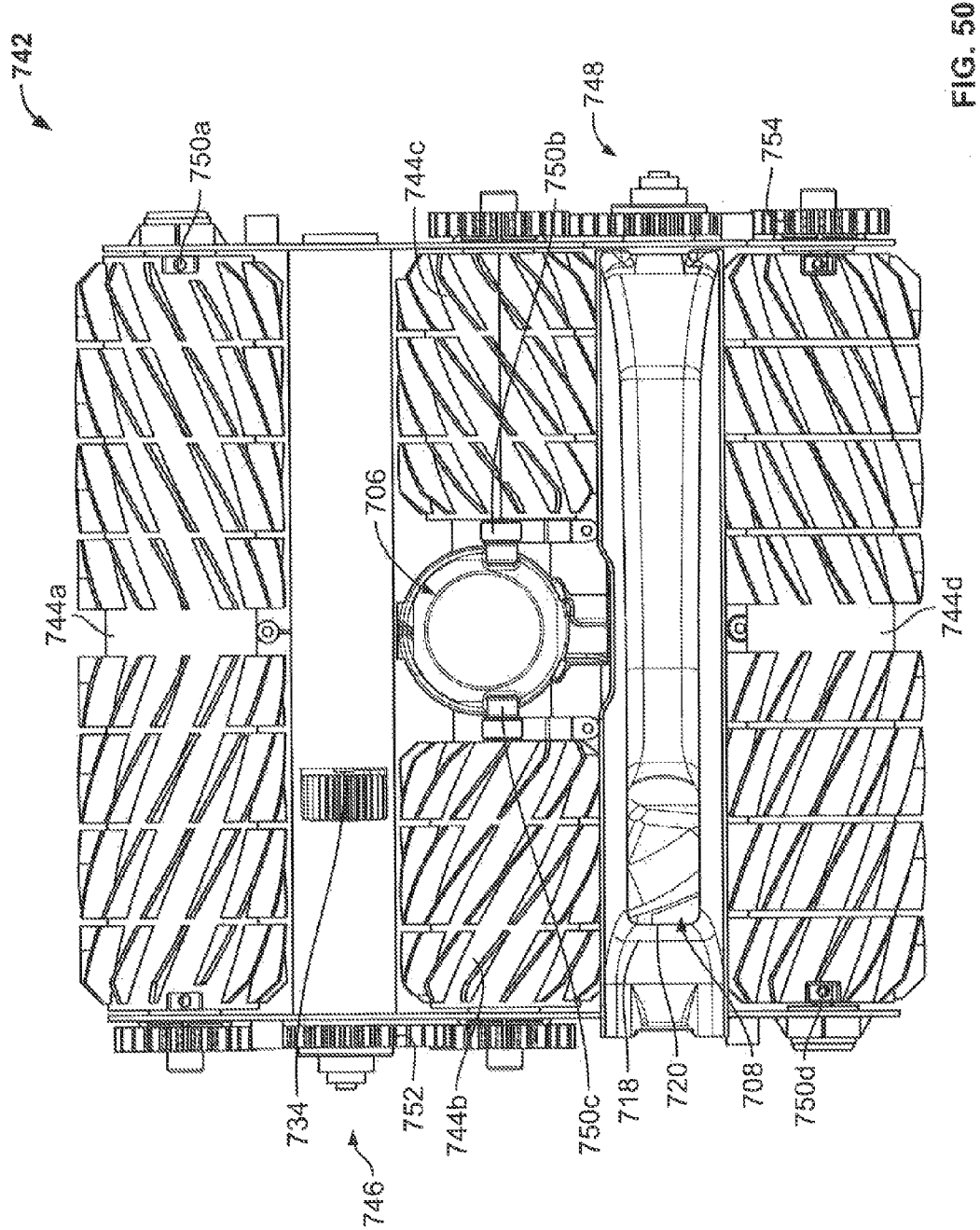

SWIMMING POOL CLEANER WITH HYDROCYCLONIC PARTICLE SEPARATOR AND/OR SIX-ROLLER DRIVE SYSTEM

CROSS-REFERENCE TO RELATED APPLICATIONS

This application claims the benefit of U.S. Patent Application No. 62/107,565, filed on Jan. 26, 2015. The entire content of the foregoing provisional patent application is incorporated herein by reference.

FIELD OF THE PRESENT DISCLOSURE

Embodiments of the present disclosure relate to swimming pool cleaners and, more particularly, to automatic swimming pool cleaners movable along all pool surfaces including a pool waterline or water surface for purposes of cleaning debris therefrom, associated apparatus for separating debris from a fluid stream traveling through the swimming pool cleaner, and apparatus for facilitating maintenance of a swimming pool cleaner and associated apparatus.

BACKGROUND OF THE PRESENT DISCLOSURE

Swimming pools commonly require a significant amount of maintenance. Beyond the treatment and filtration of pool water, the bottom wall (the "floor") and side walls of a pool (the floor and the side walls collectively, the "walls" of the pool) are scrubbed regularly. Additionally, leaves and other debris often times elude a pool filtration system and settle on the bottom of the pool, get stuck at the pool waterline, or float on the pool water surface.

Automated pool cleaning devices, e.g., swimming pool cleaners, have been developed to routinely navigate about the pool walls, cleaning as they go. A rotating cylindrical roller (formed of foam and/or provided with a brush) can be included on the bottom of the pool cleaner to scrub the pool walls, while a pump system continuously circulates water through a filter assembly of the pool cleaner capturing debris and any suspended particulate therein. The pool cleaner lengthens the life of the main pool filter (e.g., a sand, diatomaceous earth (D.E.), or cartridge filter) in fluid communication with the fluid circulation line of the swimming pool, and reduces the time between changes or backwash cycles of the main filter.

The pool cleaner's filter assembly often includes traditional filter elements, such as bags, mesh, baskets, etc., that are utilized to trap any debris and particulate removed from a pool surface by the cleaner. These traditional filter elements generally have limited surface area that can quickly become clogged or occluded by the debris and particulate that they are utilized to contain. As the filter elements become clogged the cleaner can start to operate improperly, for example, the cleaner may lose suction performance. Once the filter elements have become sufficiently clogged, or have been occluded to a point that cleaner performance has been reduced below a desired level, the filter elements have to be cleaned or replaced. This can often occur prior to the debris retention area of a pool cleaner being completely full. That is, the surface of the bag, mesh, or basket can become clogged prior to the debris retention volume thereof being filled to capacity. Further, to rinse or replace the filter elements, or empty the basket, a user will often have to directly handle the filter element and subsequently debris, and in the case of a basket, will have to open a lid of the cleaner to retrieve the basket from within the unit and spray the basket with water which may result in debris and water getting on them.

During cleaning, the pool cleaner will traverse the pool surfaces brushing or scrubbing the debris therefrom, often encountering obstacles, such as lights, drains, etc., along the way. These obstacles can cause the cleaner to get stuck for the duration of a cleaning period, resulting in the pool being only partially cleaned.

What is needed in the art is an automatic swimming pool cleaner that debris is easily cleaned from, enhances filtering operation, and/or traversal through the pool. These and other needs are addressed by the swimming pool cleaner of the present disclosure.

SUMMARY OF THE DISCLOSURE

Example embodiments of the present disclosure relate to swimming pool cleaners having improved filters and drive systems.

More particularly, an improved swimming pool cleaning is provided, according to the present disclosure. In some example embodiments, the swimming pool cleaner includes a hydrocyclonic particle separator assembly and/or a drive assembly having six driven brushed rollers.

In some example embodiments, the hydrocyclonic particle separator assembly is interconnected with an intake of the pool cleaner and generally includes a fluid turbine subassembly and a canister subassembly. For example, the canister subassembly is connectable with the intake of the pool cleaner and includes a canister body having a tangential outlet to an inner chamber thereof, a filtering medium (which can be, for example, a coarsely perforated surface or mesh), a fine debris container, one or more cyclone containers, and a central outlet in fluidic communication with the tangential outlet. Continuing with discussion of example embodiments, the filtering medium is positioned within the canister, the one or more cyclone containers are positioned within the filtering medium, and the fine debris container is positioned below the one more cyclone containers. The cyclone containers each include a body having a tangential inlet, a fine debris underflow nozzle, and an overflow opening. The fluid turbine subassembly is positioned within the canister subassembly and configured to permit acceleration of fluid through the central outlet of the canister subassembly and pulling of fluid through the entirety of the canister subassembly and the intake. A motor housing includes a pump motor operatively connected to an impeller for same. Fluid being pulled through the canister subassembly and intake enters the canister body at the tangential inlet forming a cyclonic flow (e.g., a first cyclonic flow) about a first axis within the canister body and between the canister body and the filtering medium. The example first cyclonic flow includes debris-laden fluid having small and large debris, with the large debris being separated from the flow through cyclonic action and contact with the canister body and the filtering medium. The separated large debris falls to a lower portion of the canister body where it is retained. A portion of the first cyclonic flow is pulled across the filtering medium and into one or more cyclones containers. Continuing with discussions of some example embodiments, the fluid (e.g., the now once-filtered debris-laden fluid) enters the one or more cyclone containers at the respective tangential inlet, forming a cyclonic flow (e.g., a second cyclonic flow) about a second axis within each cyclone container. The second cyclonic flow includes once-filtered debris laden fluid having small debris that is separated from the fluid through contact with the cyclone container body. The debris separated in the cyclone container body falls through the underflow nozzle of each cyclone container where it is captured by the fine debris container. The fluid is then pulled out from the overflow opening of the one or more cyclone containers and ejected from the canister subassembly through the central outlet by the fluid turbine subassembly.

In some aspects of the present disclosure, the canister subassembly can include a vortex finder positioned within the overflow opening of each of the one or more cyclone containers that focuses slow-moving fluid so that it can be evacuated from each cyclone container.

In some aspects of the present disclosure, the cyclone container body can be tapered or include a tapered end that reduces the radius of the second cyclonic flow to separate decreasingly smaller particles therefrom.

The swimming pool cleaner can include a latch for removably retaining the hydrocyclonic particle separator in connection with the motor housing, and the hydrocyclonic particle separator can include a quick-release latch for allowing easy opening of the canister subassembly. The canister body can include a lower portion and an upper portion engaged by a hinge. The latch includes a resiliently-flexible body and a slanted head having an engagement surface, while the hydrocyclonic particle separator includes a locking interface configured to be engaged by the engagement surface of the latch. The quick-release latch can include a body having a shaped head including a latching surface at one end, a user-engageable tab at an opposite end of the shaped head, a spring, and a pivot positioned between the shaped head and the user-engageable tab. The quick-release latch is mounted to a bracket on the upper portion of the canister body by the pivot, with the spring between the user-engageable tab and the canister body. The spring biases the quick-release latch into a first latched position where the latching surface of the shaped head is adjacent and in engagement with a ridge that extends radially from the lower portion of the canister body, preventing the upper and lower portions of the canister body from being separated. Pressing the user-engageable tab compresses the spring and moves the quick-release latch into a second released position where there is clearance between the latching surface of the shaped head and the ridge, allowing the upper and lower portions of the canister body to be separated through rotation about the hinge.

In some embodiments of the present disclosure, a pool cleaner is provided with six rollers for enhanced control when driven over surfaces, such as convex or concave surfaces with high local curvature, such as step edges, main drain covers, walls, and surfaces with low friction coefficients, for example. In preferred embodiments of the present disclosure, the motor housing, which can house a pump motor, houses a first drive motor and a second drive motor. In some embodiments, a first gear train operatively connects the first drive motor with a first roller set of three rollers, such that each one of the three rollers of the first roller set turn at the same rate as each other one thereof (first rate), and a second gear train operatively connects the second drive motor with a second set of three rollers, such that each one of the three rollers of the second roller set turn at the same rate as each other one thereof (the second rate). Depending upon the desired navigational outcome, for example, the first rate can be less than, greater than, and/or substantially equal to the second rate. Additionally and/or alternatively, the first set of rollers can rotate in a first direction, while the second roller set can rotate in a second direction opposite the first direction.

In accordance with embodiments of the present disclosure, an exemplary pool cleaner is provided that includes a canister body, a filtering medium assembly and a cyclone block. The canister body includes an inner chamber within inner walls of the canister body. The filtering medium assembly can be disposed within the inner chamber of the canister body. The cyclone block can be disposed within the inner chamber of the canister body. In some embodiments, the cyclone block can be at least partially surrounded by the filtering medium assembly. The cyclone block includes a plurality of cyclone containers. A first cyclonic flow can be generated between the inner walls of the canister body and the filtering medium assembly. A second cyclonic flow can be generated within each of the plurality of cyclone containers.

In some embodiments, the canister body can define a cylindrical configuration. The canister body includes a tangential inlet. The filtering medium assembly includes a filtering medium support and a filtering medium. The filtering medium assembly can be configured and dimensioned to separate large debris particles from a fluid flow during the first cyclonic flow.

Each of the cyclone containers includes a cylindrical cyclone chamber with a tangential inlet and a debris underflow nozzle. The cyclone containers can be radially disposed around a central axis. In some embodiments, each of the cyclone containers includes a cylindrical top portion, a frustoconical bottom portion and a debris underflow nozzle at a distal end of the cyclone container. In some embodiments, the plurality of cyclone containers can include a first set of radially disposed cyclone containers and a second set of radially disposed cyclone containers positioned around the first set of radially disposed cyclone containers. Each of the plurality of cyclone containers can be configured and dimensioned to separate small debris particles from a fluid flow during the second cyclonic flow.

The pool cleaner includes a large debris container hingedly connected to a bottom edge of the canister body. The large debris container can include a dish including upwardly angled side walls. The pool cleaner includes a debris separator ring disposed between the filtering medium assembly and the large debris container. The debris separator ring includes a mesh ring configured and dimensioned to maintain large debris particles within the large debris container.

The pool cleaner includes a fine debris container disposed within the inner chamber of the canister body. In some embodiments, the fine debris container can include a rounded dish including a central hub. In some embodiments, the fine debris container includes a dish and a central radial extension protruding from a bottom surface of the fine debris container. The central radial extension can define an inner chamber configured and dimensioned to maintain small debris particles separated from a fluid flow during the second cyclonic flow. The central radial extension can be disposed against the dish of the large debris container. The central radial extension can maintain a separation between the small debris particles within the inner chamber and large debris particles collected in the large debris container. The pool cleaner can include a gasket disposed between the dish of the large debris container and the central radial extension. The gasket can maintain separation between the small debris particles within the inner chamber and the large debris particles collected in the large debris container. Positioning the large debris container in an open position relative to the canister body simultaneously empties the large debris container and the inner chamber of the fine debris container, thereby simultaneously removing the large and small debris particles from the pool cleaner.

The pool cleaner can include a ring of vortex finders. Each of the vortex finders can be positioned within respective cyclone containers of the plurality of cyclone containers. The ring of vortex finders can include a central portion and a plurality of perimeter flaps Each of the perimeter flaps can include a vortex finder. In some embodiments, a top surface of the central portion can be recessed relative to surfaces of the plurality of perimeter flaps. Each of the plurality of perimeter flaps can be hingedly connected to a polygonal perimeter of the central portion.

The pool cleaner includes a top cap disposed over the canister body. In some embodiments, the top cap includes a plurality of radially arched tubes defining a chamber extending to an outlet of the pool cleaner. In some embodiments, the top cap includes a plurality of rounded lobes defining a chamber extending to an outlet of the pool cleaner.

In some embodiments, the pool cleaner includes a drive assembly including one front roller, one rear roller, and two middle rollers. In some embodiments, the pool cleaner includes a drive assembly including two front rollers, two middle rollers, and two rear rollers.

In accordance with embodiments of the present disclosure, an exemplary pool cleaner is provided that includes a drive assembly, a motor housing and a hydrocyclonic particle separator assembly. In some embodiments, the drive assembly can include one single front roller, one single rear roller, a first middle roller and a second middle roller. The first and second middle rollers can be disposed adjacent to each other. The motor housing can be mounted relative to the drive assembly. The motor housing includes a first drive motor and a second drive motor. The hydrocyclonic particle separator assembly can be mounted to the motor housing. The first drive motor can drive rotation of the one single front roller and the first middle roller. The second drive motor can drive rotation of the one single rear roller and the second middle roller. The first drive motor can drive the one single front roller and the first middle roller at the same rate. The second drive motor can drive the one single rear roller and the second middle roller at the same rate.

In accordance with embodiments of the present disclosure, an exemplary pool cleaner is provided that includes a drive assembly, a motor housing and a hydrocyclonic particle separator. The drive assembly includes a first front roller, a second front roller, a first middle roller, a second middle roller, a first rear roller, and a second rear roller. The first and second front rollers can be disposed adjacent to each other. The first and second middle rollers can be disposed adjacent to each other. The first and second rear rollers can be disposed adjacent to each other. The motor housing can be mounted relative to the drive assembly. The motor housing includes a first drive motor and a second drive motor. The hydrocyclonic particle separator assembly can be mounted to the motor housing. The first drive motor can drive rotation of the first front roller, the first middle roller and the first rear roller. The second drive motor can drive rotation of the second front roller, the second middle roller and the second rear roller. The first drive motor can drive the first front roller, the first middle roller and the first rear roller at the same rate. The second drive motor can drive the second front roller, the second middle roller and the second rear roller at the same rate.

Additional features, functions and benefits of the disclosed swimming pool cleaner and methods in connection therewith will be apparent from the detailed description which follows, particularly when read in conjunction with the accompanying figures.

BRIEF DESCRIPTION OF THE DRAWINGS

For a more complete understanding of the present disclosure, reference is made to the following detailed description of an exemplary embodiment considered in conjunction with the accompanying drawings, in which:

FIG. 12 is a sectional view of the pool cleaner taken along line 12-12 of FIG. 3;

FIG. 15A is an enlarged view of the area 15A of FIG. 11 showing a first embodiment of a quick-release latch;

FIG. 15B is an enlarged view of the quick-release latch of FIG. 15A deformed by a force;

FIG. 16 is front elevational view of a portion of the canister subassembly opened and debris being removed;

FIG. 50 is a bottom view of a third embodiment of a pool cleaner including a motor assembly and a drive assembly, an outer housing or skin of the pool cleaner having been removed for clarity.

DETAILED DESCRIPTION OF THE PRESENT DISCLOSURE

According to the present disclosure, advantageous apparatus are provided for facilitating maintenance of pool or spa, as well as for facilitating maintenance of a pool or spa cleaning device. More particularly, the present disclosure includes, but is not limited to, discussion of a pool cleaner including a hydrocyclonic particle separator assembly, a quick-release latch for the hydrocyclonic particle separator assembly, and a pool cleaner having six rollers.

Figure 1:
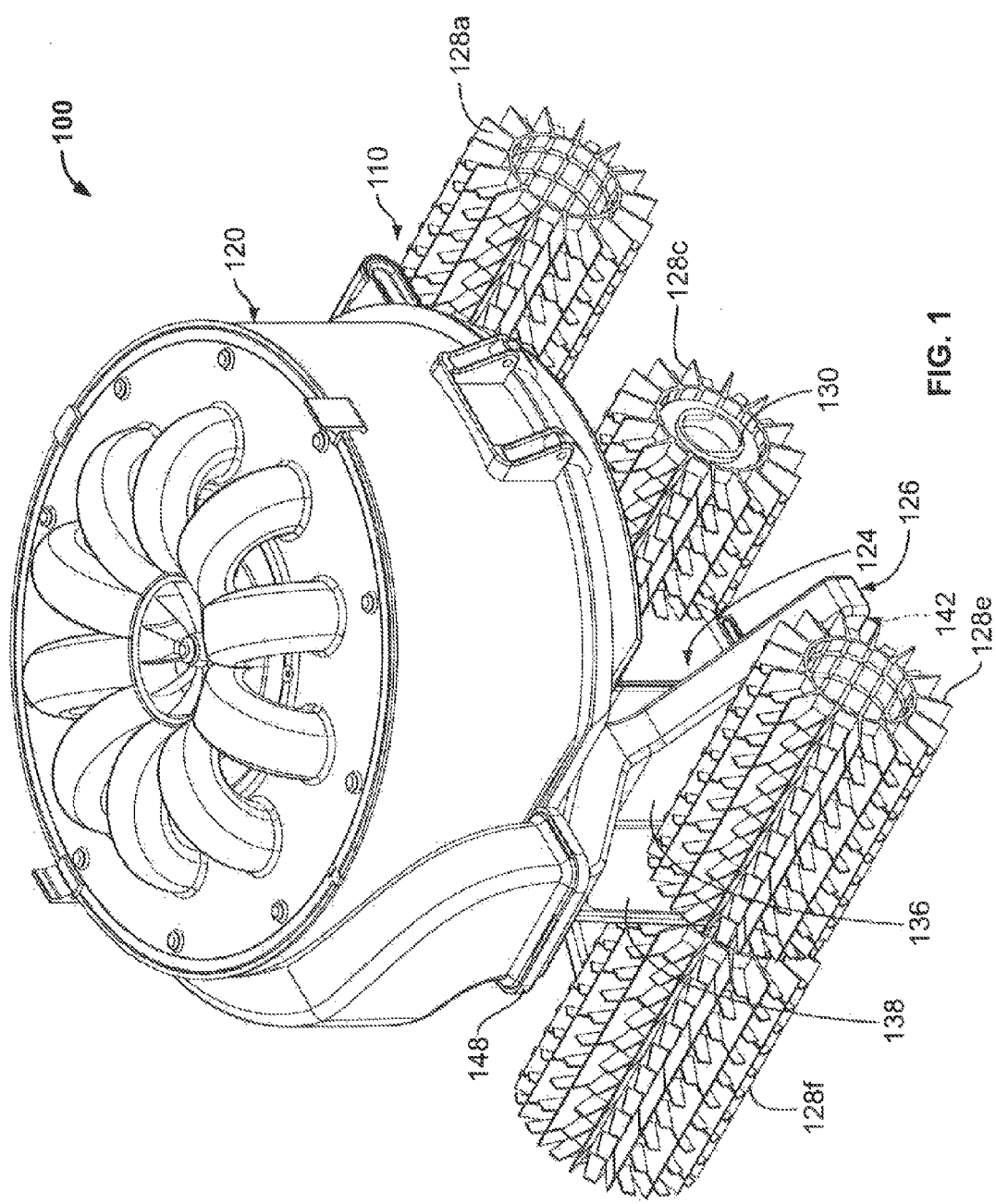
FIG. 1 is a rear perspective view of a first embodiment of a pool cleaner.
Figure 2:
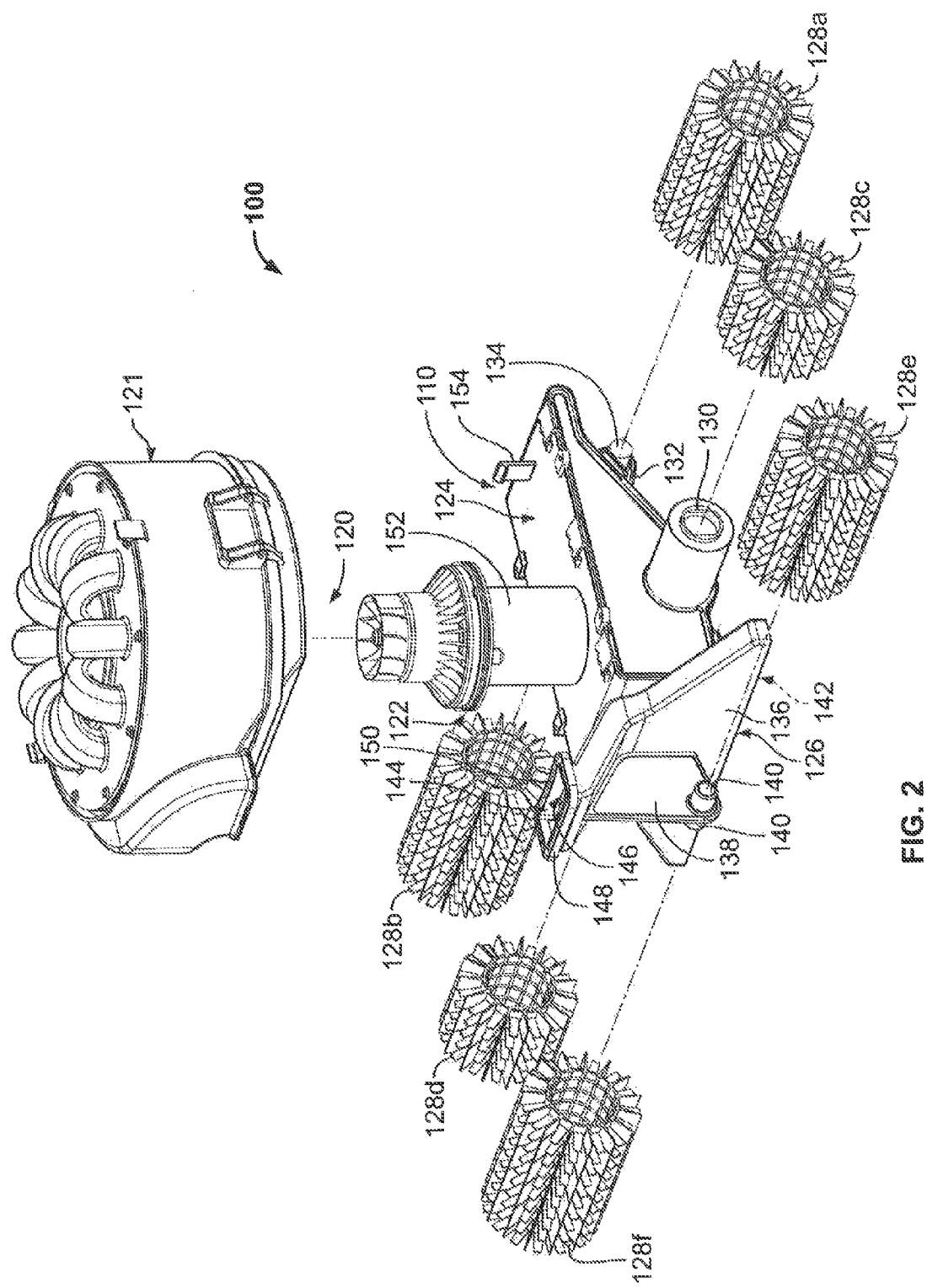
FIG. 2 is a rear perspective exploded view of the pool cleaner of FIG. 1 with a first embodiment of a canister subassembly of a hydrocyclonic particle separator assembly separated from a motor housing thereof.
Figure 3:
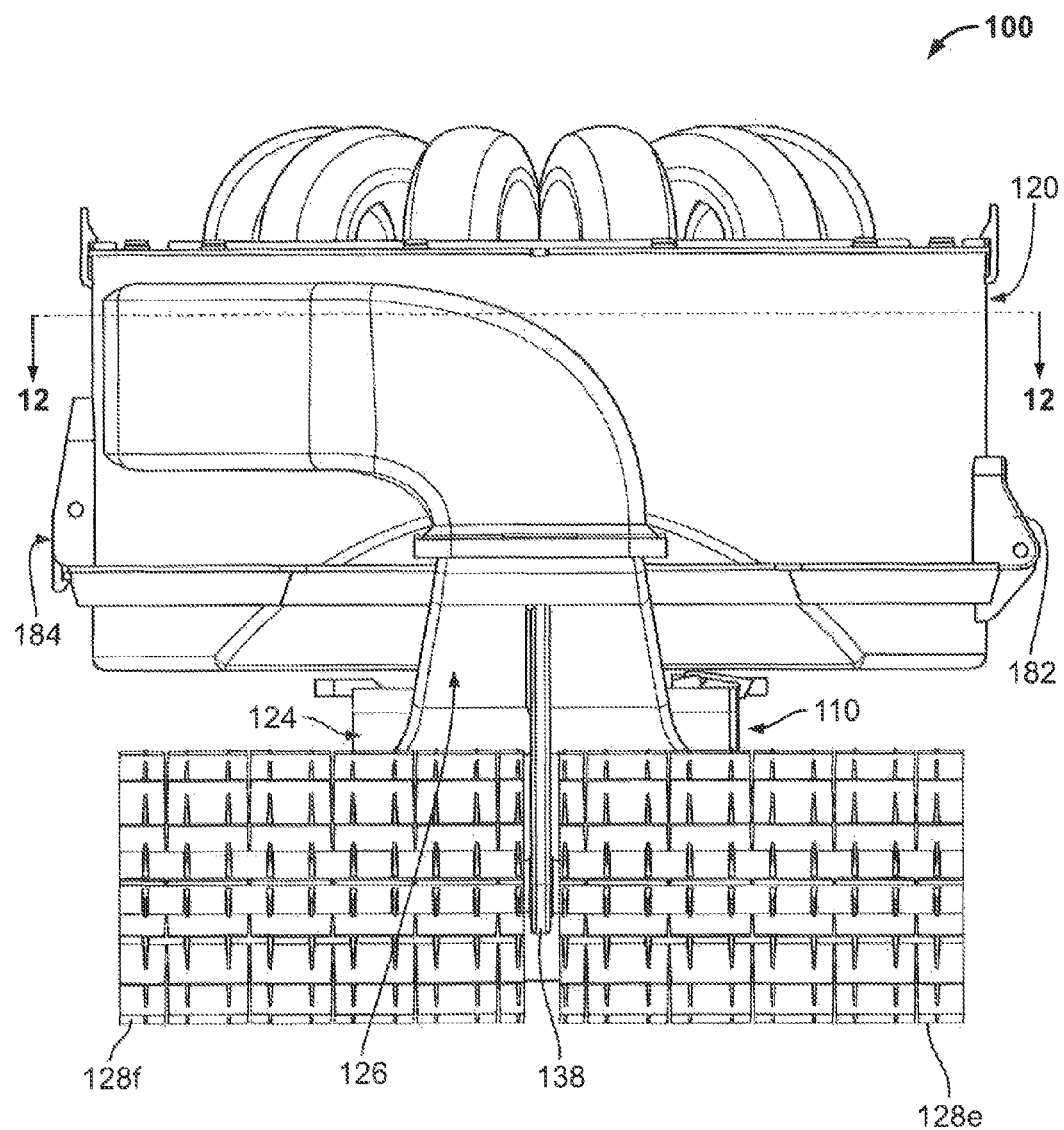
FIG. 3 is a rear elevational view of the pool cleaner of FIG. 1.
Figure 4:
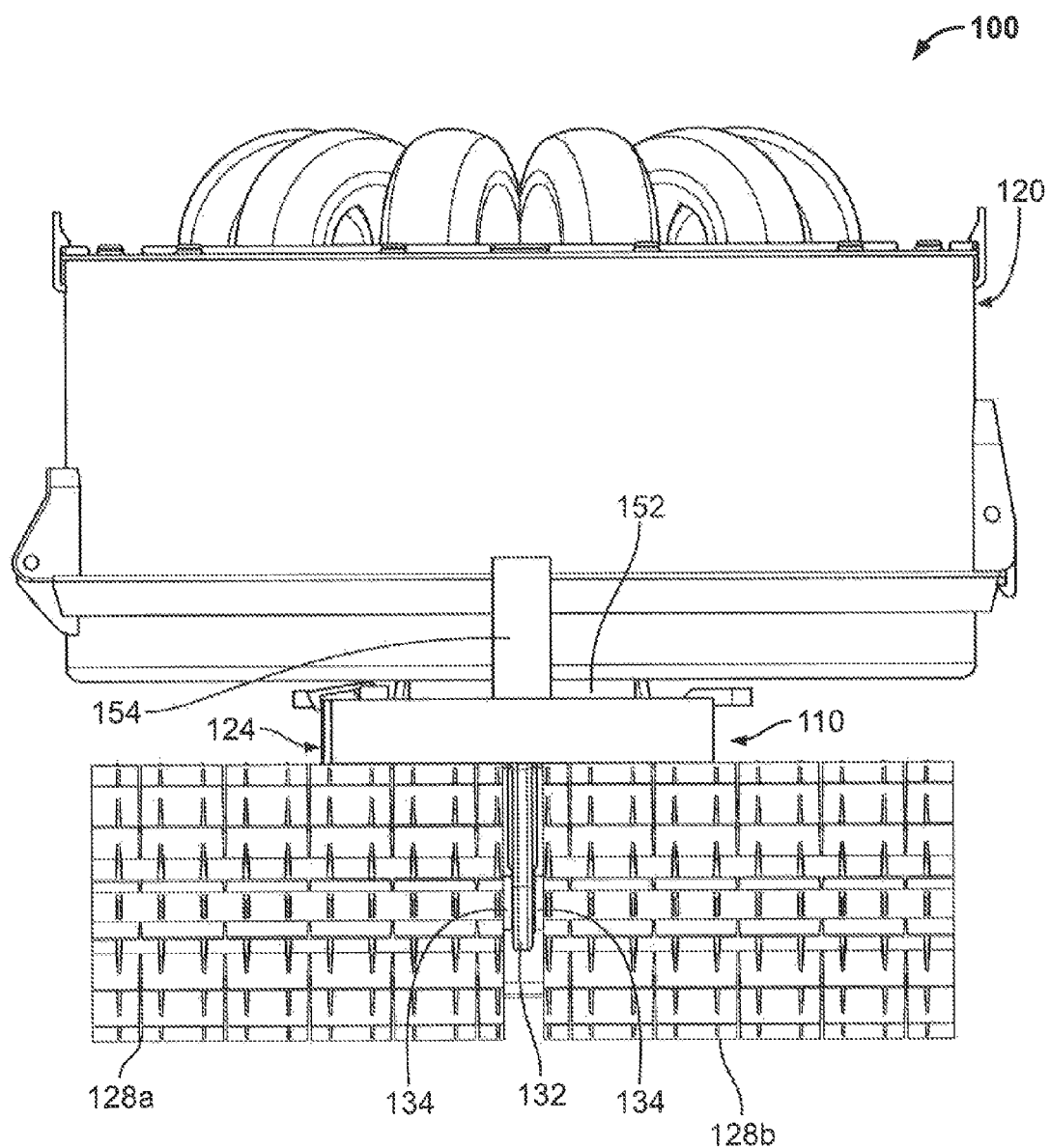
FIG. 4 is a front elevational view of the pool cleaner of FIG. 1.

With initial reference to FIGS. 1-8, a pool cleaner 100 generally includes a drive assembly 110 and a hydrocyclonic particle separator assembly 120 including a canister subassembly 121 and a fluid turbine subassembly 122 (see FIG. 2). In an exemplary embodiment, pool cleaner 100 is an electric pool cleaner that includes six rollers and hydrocyclonic particle separation capability. The motors can be powered by an electric cable (not shown) extending to a power source at the surface, a battery, and/or inductive coupling, for example. The drive assembly 110 includes a motor housing 124, an intake 126, and six brushed rollers 128a-128f. Two roller drives 130 (see FIGS. 1, 2, 5, and 6) extend from opposite sides of the motor housing 124. Each of the two roller drives 130 are respectively in operative communication with a first and second motor (not shown) positioned within the motor housing 124. A first roller set (rollers 128a, 128c, and 128e) is in mechanical communication with a first one of the roller drives 130 (e.g., on the left side of the cleaner), which is in communication with the first drive motor so each one of the rollers of the first roller set (e.g., roller 128a, 128c, and 128e) turn at the same first rate. A second roller set (rollers 128b, 128d, and 128f) is in mechanical communication with a second one of the roller drives 130 (e.g., on the right side of the cleaner), which is in communication with the second drive motor, so each one of rollers of the second roller set (e.g., roller 128b, 128b, and 128f) turn at the same second rate.

A front support mount 132 extends from a front portion of the motor housing 124, and includes front roller mounts 134. Two of the brushed rollers 128e, 128f are connected with the front roller mounts 134, and are rotatable therewith. The intake 126 includes a body 136 having a rear support mount 138 extending therefrom. The intake 126 is interconnected with the motor housing 124 by an engagement means 139 (see FIG. 5). The engagement means 139 can be a mating connection, e.g., dovetail connection, between the intake 126 and the motor housing 124, a snap fit connection, or any other connection means known to one of ordinary skill in the art. The rear support mount 138 extends from the body 136 and includes rear roller mounts 140. Two of the brushed rollers 128a, 128b are connected with the rear roller mounts 140, and are rotatable therewith.

Although electric sources are contemplated, other power sources are also contemplated. For example, the power source can be positive water pressure, as in what is commonly referred to in the pool industry as a "pressure cleaner." As another example, the power source can be negative water pressure, as in what is commonly referred to in the pool industry as a "suction cleaner." Any power source and/or combinations thereof are contemplated.

The intake 126 further includes an inlet opening 142 (see FIG. 8) and an outlet opening 144 (see FIG. 2) defined by the body 136. A channel 146 extends between the inlet opening 142 and the outlet opening 144. A rim 148 extends about the perimeter of the outlet opening 144, and defines a channel 150 that cooperates with a portion of the hydrocyclonic particle separator assembly 120, discussed in greater detail below.

The motor housing 124 further includes a mounting boss 152 and a front latch 154, both extending from a top of the motor housing 124. As shown in FIG. 2, which is a partially exploded view of the cleaner 100, the fluid turbine subassembly 122 of the hydrocyclonic particle separator assembly 120 is mounted to the mounting boss 152 while the canister subassembly 121 is removable therefrom. The mounting boss 152 houses a third motor (not shown) that drives the fluid turbine subassembly 122. The front latch 154 is configured to releasably engage the canister subassembly 121 to secure the hydrocyclonic particle separator assembly 120 to the motor housing 124, this engagement is discussed in greater detail below in connection with FIGS. 13A and 13B.

Figure 9:
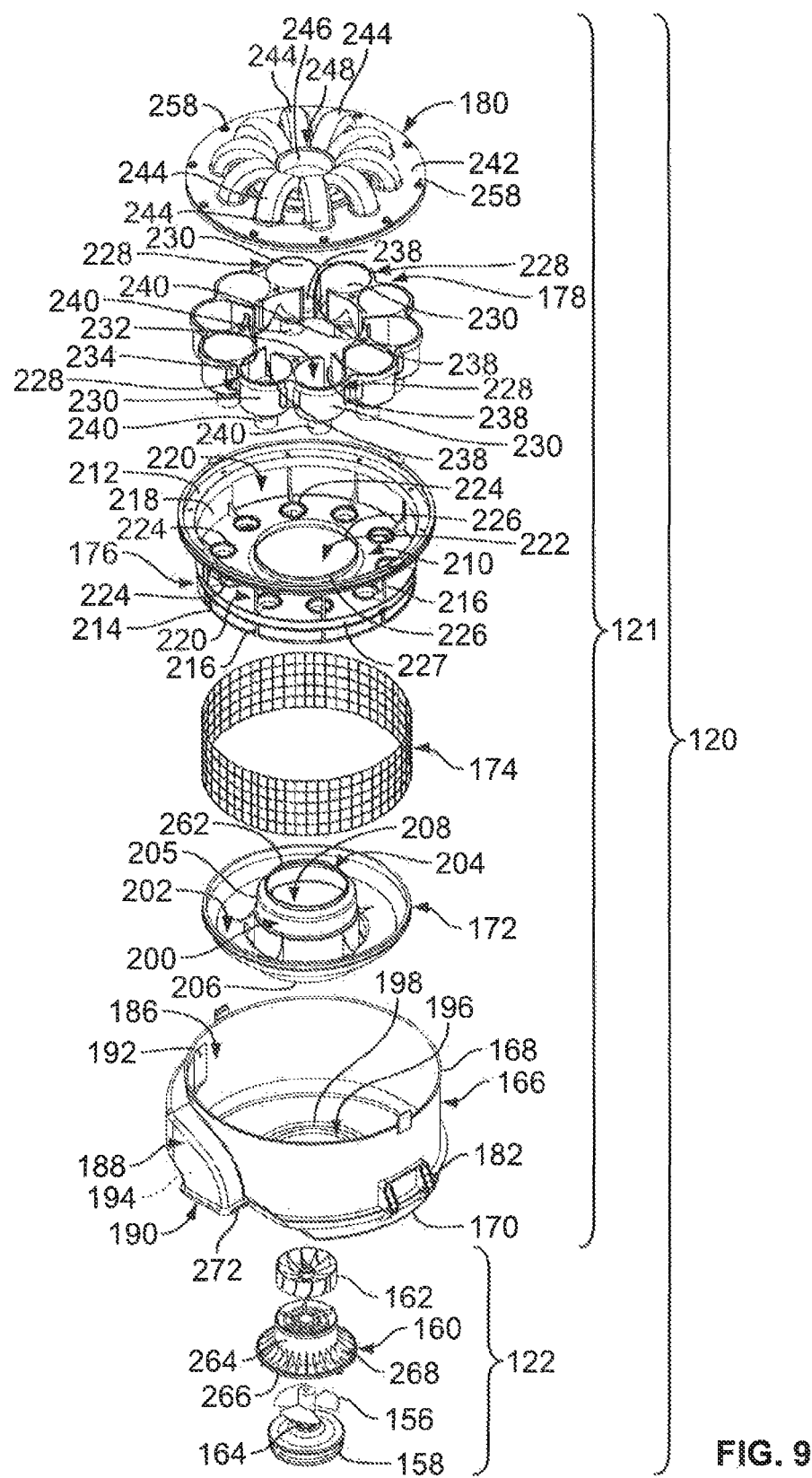
FIG. 9 is an exploded perspective view of the hydrocyclonic particle separator assembly of FIG. 2.

FIG. 9 is an exploded perspective view of the hydrocyclonic particle separator assembly 120 of FIG. 2, including the canister subassembly 121 and the fluid turbine subassembly 122. The fluid turbine subassembly 122 includes an impeller 156, a grommet 158, a finger guard 160, and a diffuser 162. The impeller 156 includes a shaft 164 that extends through the grommet 158 and engages the third motor (not shown), which can be positioned within the mounting boss 152 of the motor housing 124. The finger guard 160 is mounted over the impeller 156, and diverts flow through the hydrocyclonic particle separator assembly 120, which is discussed in greater detail below in connection with FIGS. 10A, 10B, 11, and 12. The diffuser 162 is positioned over the finger guard 160 and utilized to normalize the flow generated by the impeller 156, which is driven by the third motor (not shown). The canister subassembly 121 includes a canister body 166 having a top 168 and a bottom 170, a fine debris container 172, a filtering medium 174 (e.g., a coarsely perforated mesh) mounted to a cyclone manifold 176, a ring of cyclone containers 178, and a top cap 180.

Figure 5:
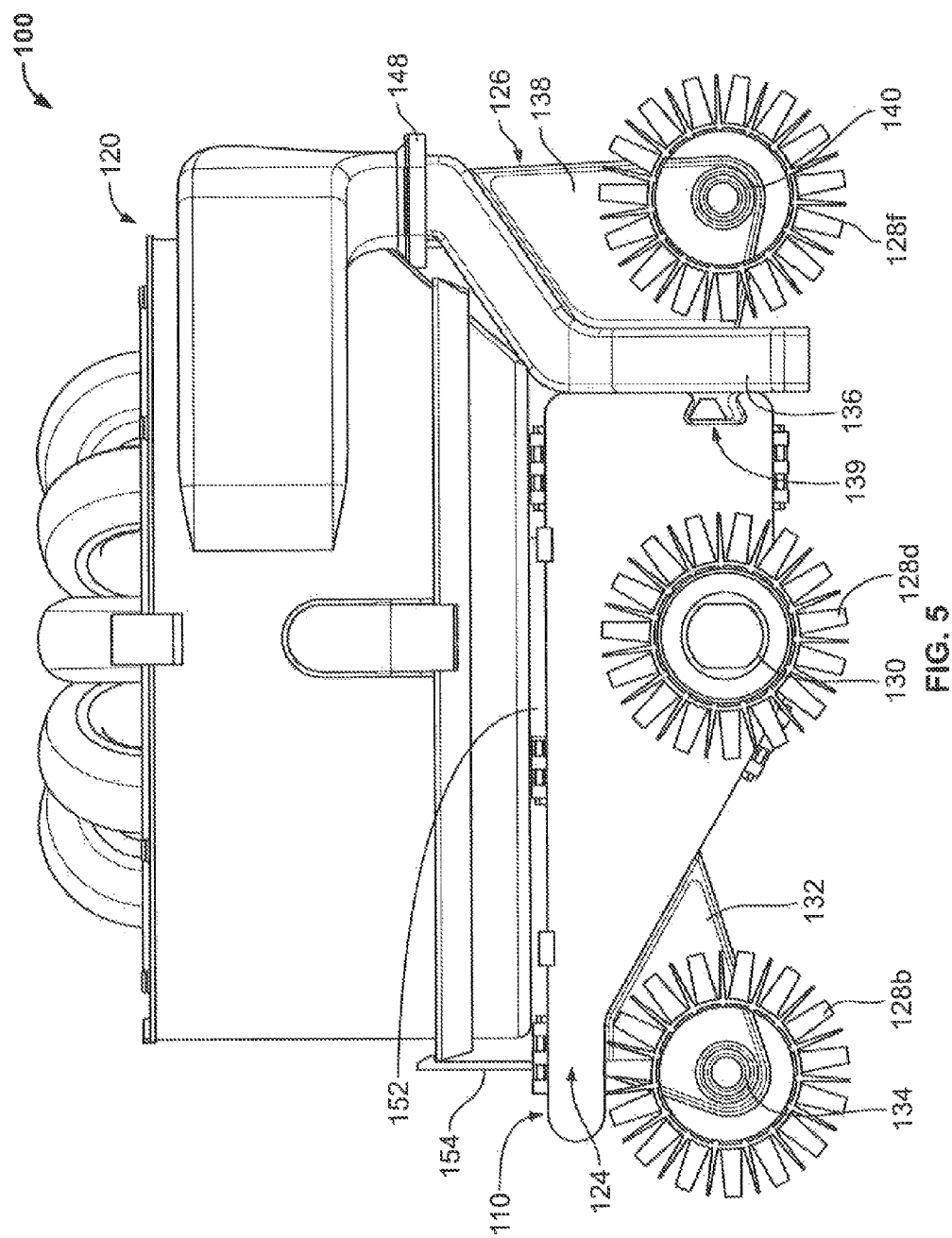
FIG. 5 is a right side elevational view of the pool cleaner of FIG. 1.

As referenced previously, the canister body 166 includes upper and lower portions 168, 170, which are engaged to one another by a hinge 182 and releasably secured to one another by a release means 184 (e.g., a quick-release latch 184) (see, e.g., FIG. 5). The canister body 166 generally defines an inner chamber 186, and includes a canister intake 188 generally positioned on the upper portion 168 of the canister body 166. The canister intake 188 includes an inlet 190, a tangential outlet 192, and a canister intake 194 extending between the inlet 190 and the tangential outlet 192. The tangential outlet 192 is positioned in a wall of the upper portion 168 of the canister body 166 and at a tangent to the canister body 166, such that fluid flowing through the canister intake channel 194 enters the inner chamber 186 of the canister body 166 at a tangent thereto. This configuration results in the generation of a cyclonic flow within the inner chamber 186 of the canister body 166, as fluid tangentially enters the inner chamber 186. The lower portion 170 of the canister body 166 includes a central aperture 196 encircled by a mounting ridge 198, the central aperture 196 receives the fluid turbine subassembly 122 and the mounting boss 152 of the motor housing 124. Accordingly, the fluid turbine subassembly 122 and the mounting boss 152 generally extend through the central aperture 196 and into the inner chamber 186 of the canister body 166.

The fine debris container 172 includes a central hub 200 surrounded by a dish 202 extending radially from the central hub 200. The dish 202 generally has an upwardly-curving shape such that it catches any debris that falls into the dish 202 and can form a static area where falling debris can land. The central hub 200 includes a top opening 204, a top mounting shoulder 205, and a bottom mount 206. A chamber 208 extends between the top opening 204 and the bottom mount 206. The chamber 208 is configured to receive the fluid turbine assembly 124 and the mounting boss 152, which extend through the bottom mount 206 and into the chamber 208. The fine debris container 172 is positioned within the inner chamber 186 of the canister body 166 with the bottom mount 206 of the fine debris container 172 engaging the mounting ridge 198 of the canister body 166.

The cyclone manifold 176 includes a discoid body 210 connected with an upper mounting rim 212 and a lower rim 214 by a plurality of supports 216 and a flow director 218. The upper mounting rim 212, lower rim 214, and the plurality of supports 216 form a plurality of windows 220 that allow fluid to flow from the exterior of the cyclone manifold 176 to the interior thereof. The discoid body 210 includes a central opening 222, a plurality of cyclone container mounts 224, a mounting ring 226 about the central opening 222, and an annular sealing ring 227 about the periphery thereof. The cyclone manifold 176 is positioned over the fine debris container 172 with the mounting rim 226 of the discoid body 210 engaging the top mounting shoulder 205 of the fine debris container's central hub 200 and the annular sealing ring 227 encircling and in engagement with an upper portion of the dish 202. The filtering medium 174 is mounted to the cyclone manifold 176 and extends about the perimeter of the cyclone manifold 176 covering the plurality of windows 220. Accordingly, fluid flowing from the exterior of the cyclone manifold 176 to the interior flows across the filtering medium 174 and the windows 220. The filtering medium 174 is sized such that debris of a first size, e.g., larger debris, cannot pass through the filtering medium 174. Instead, the larger debris contacts the filtering medium 174, or the interior wall of the canister body 166, and is knocked down out of the fluid flow and does not enter the interior of the cyclone manifold 176.

The ring of cyclone containers 178 includes a plurality of individual cyclone containers 228, e.g., ten cyclone containers. It should be noted that for clarity of FIG. 9 only four of the individual cyclone containers 228 are more fully labeled with reference numbers, but one of ordinary skill in the art shall understand that each individual cyclone container 228 can include the same parts and elements. Thus, it should be understood that the description of a single cyclone container 228 holds true for all of the cyclone containers 228 that make up the ring of cyclone containers 178. Each individual cyclone container 228 includes a circular and tapered cyclone container body 230 that defines a cyclone chamber 232 and includes an overflow opening 234, a debris underflow nozzle 236 (see FIG. 10B), and a tangential inlet 238 generally positioned on a radially inward portion of each individual cyclone container 228. Each individual cyclone container 228 also includes a mounting nozzle 240 surrounding the debris underflow nozzle 236 and configured to engage one of the plurality of cyclone container mounts 224 of the cyclone manifold 176. The cyclone manifold 176 can include the same number of cyclone container mounts 224 as there are individual cyclone containers 228. As such, the ring of cyclone containers 178 is positioned within the cyclone manifold 176 and within the filtering medium 174. When the ring of cyclone containers 178 is mounted to the cyclone manifold 176, each debris underflow nozzle 236 and mounting nozzle 240 is positioned within a respective cyclone container mount 224 wherein each extends through the respective cyclone container mount 224 and therefore through the discoid body 210 of the cyclone manifold 176. Accordingly, debris that falls out of the debris-laden water within each individual cyclone container 228, e.g., due to contact with the wall of the cyclone container body 230, can fall through the debris underflow nozzle 236 and into the dish 202 of the fine debris container 172, which is positioned below and adjacent the cyclone manifold 176.

Figure 10A:
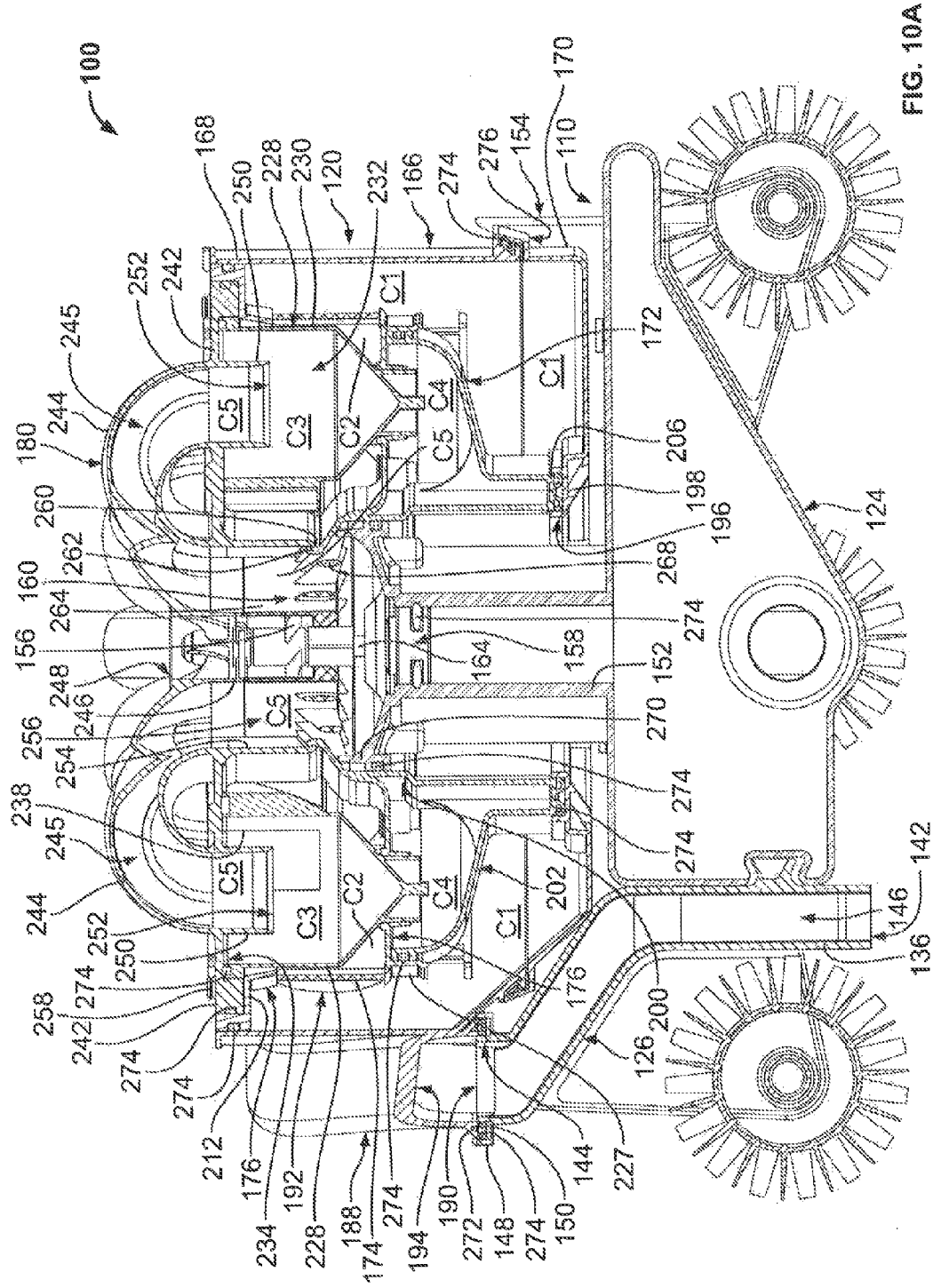
FIG. 10A is a sectional view of the pool cleaner taken along line 10A-10A of FIG. 7 showing, among other things, the chambers of the pool cleaner.

The top cap 180 includes a top plate 242 and a plurality of arched tubes 244, e.g., ten. Each of the plurality of arched tubes 244 extends through the top plate 242 and arch from a radially outward portion of the top plate 242 to a radially central portion where they converge to form a first tubular wall 246 defining an outlet 248. One of ordinary skill in the art would appreciate that the plurality of arched tubes 244 can be replaced with a single open area that is not segmented by arched tubes. Reference is now made to FIG. 10A in further describing the top cap 180, which is a sectional view of the pool cleaner 100 taken along line 10A-10A of FIG. 7. As can be seen from FIG. 10A, each of the arched tubes 244 defines an inner chamber 245 and extends through the top plate 242 to form a vortex finder 250 having an opening 252 to the inner chamber 245. Each of the plurality of arched tubes 244 arches radially inward to converge and form the first tubular wall 246, and further converge to form a second tubular wall 254 that is spaced radially outward from, but concentric with, the first tubular wall 246, e.g., the second tubular wall 254 has a greater radius than the first tubular wall 246. The first and second tubular walls 246, 254 form a tubular chamber 256. The vortex finder opening 252 and the inner chamber 245 of each arched tube 244 is in fluidic communication with the tubular chamber 256, such that fluid can flow from each vortex finder opening 252, across each inner chamber 245, and into the tubular chamber 256 where the individual flows merge. The top cap 180 is placed over the cyclone manifold 176 and in engagement with the upper mounting rim 212 of the cyclone manifold 176 and the overflow opening 234 of each cyclone body 232. The top cap 180 can be secured to the cyclone manifold 176 by a plurality of screws or bolts 258. Additionally, the second tubular wall 254 includes a clasp 260 that releasably engages an upper mounting projection 262 of the fine debris container 172. When the top cap 180 is engaged with the cyclone manifold 176, the vortex finder 250 of each of the plurality of arched tubes 244 is inserted into the overflow opening 234 of a respective cyclone container 228 and positioned within the respective cyclone container body 230.

When the top cap 180 is mounted to the cyclone manifold 176, the tubular chamber 256 of the top cap 180 is positioned adjacent the finger guard 160 of the fluid turbine subassembly 122 so that the fluid flowing through the tubular chamber 256 is directed into the finger guard 160. As shown at least in FIG. 9, the finger guard 160 includes an inner cylindrical wall 264, an outer ring 266 surrounding the inner cylindrical wall 264 and concentric therewith, and a plurality of fins 268 extending between the outer ring 266 and the inner cylindrical wall 264. The finger guard 160 is generally positioned over the impeller 156 and the grommet 158 with the grommet 158 being inserted into the mounting boss 152 of the motor housing 124. The finger guard 160 is mounted to a flange 270 that extends radially from the mounting boss 152.

When the top cap 180, ring of cyclone containers 178, cyclone manifold 176, filtering medium 174, fine debris container 172, and canister body 166 are interconnected they are placed over the fluid turbine assembly 124 and the mounting boss 152 with the inner cylindrical wall 264 of the finger guard 160 abutting the first tubular wall 246 of the top cap 180. Additionally, the inlet 190 of the canister intake 188 is positioned adjacent the outlet opening 144 of the intake 126, with a sealing rim 272 extending radially from the inlet 190 engaged with the channel 150 that encircles the intake outlet 126.

Figure 6:
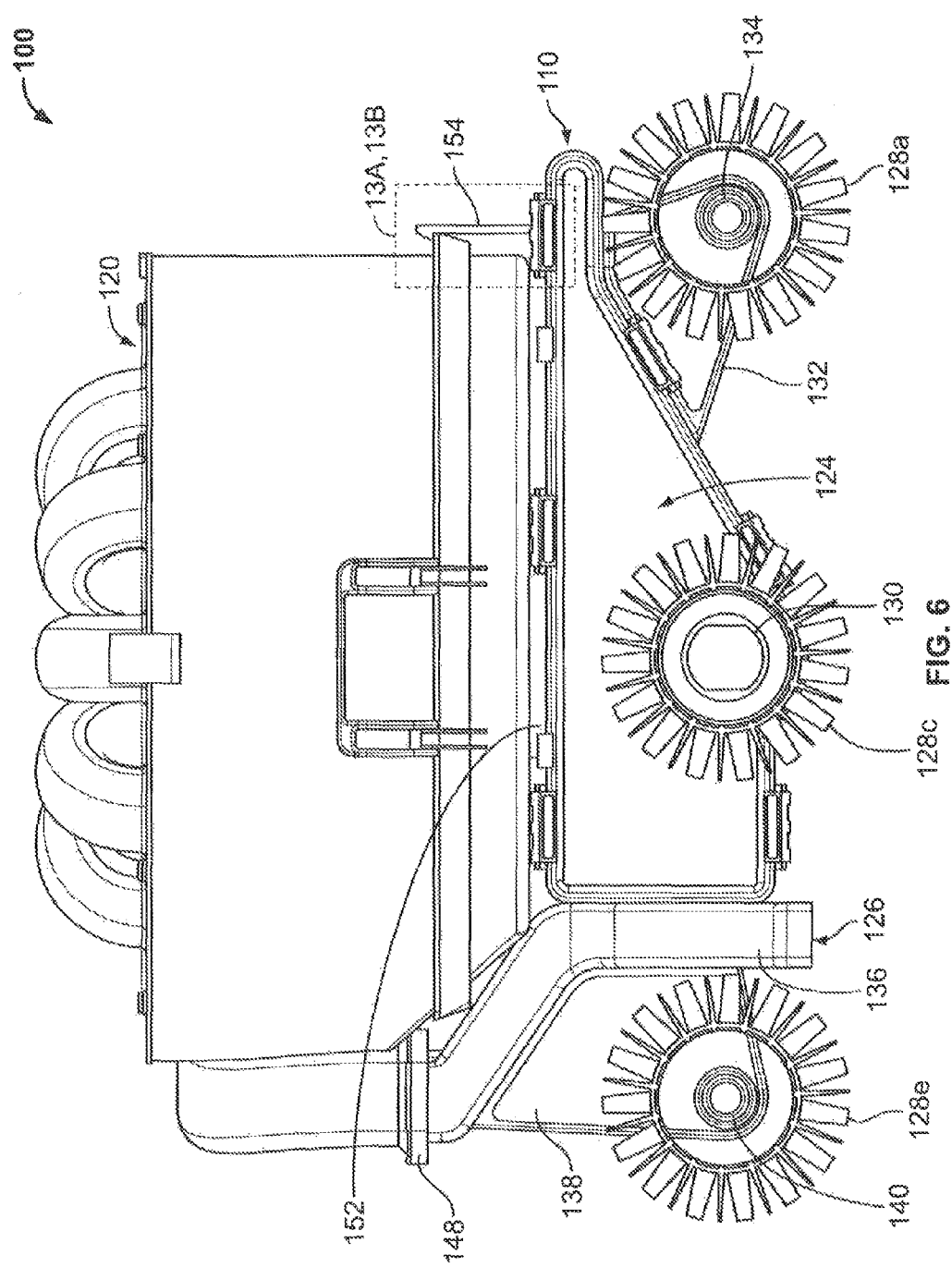
FIG. 6 is a left side elevational view of the pool cleaner of FIG. 1.
Figure 13B:
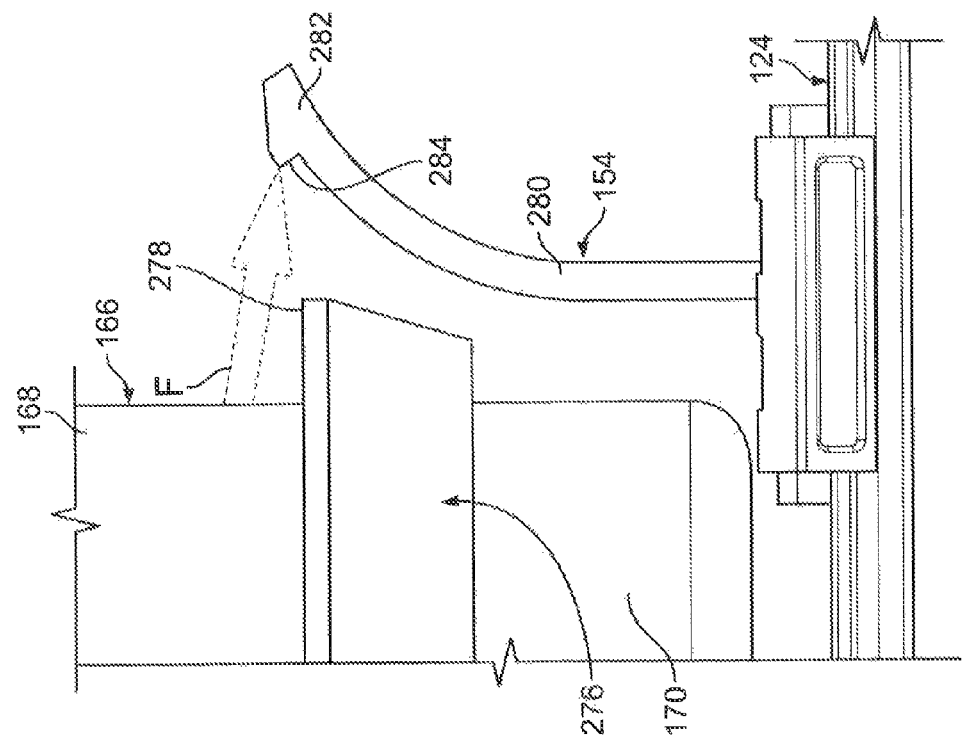
FIG. 13B is an enlarged view of the retention latch of FIG. 13A deformed by a force.
Figure 13A:
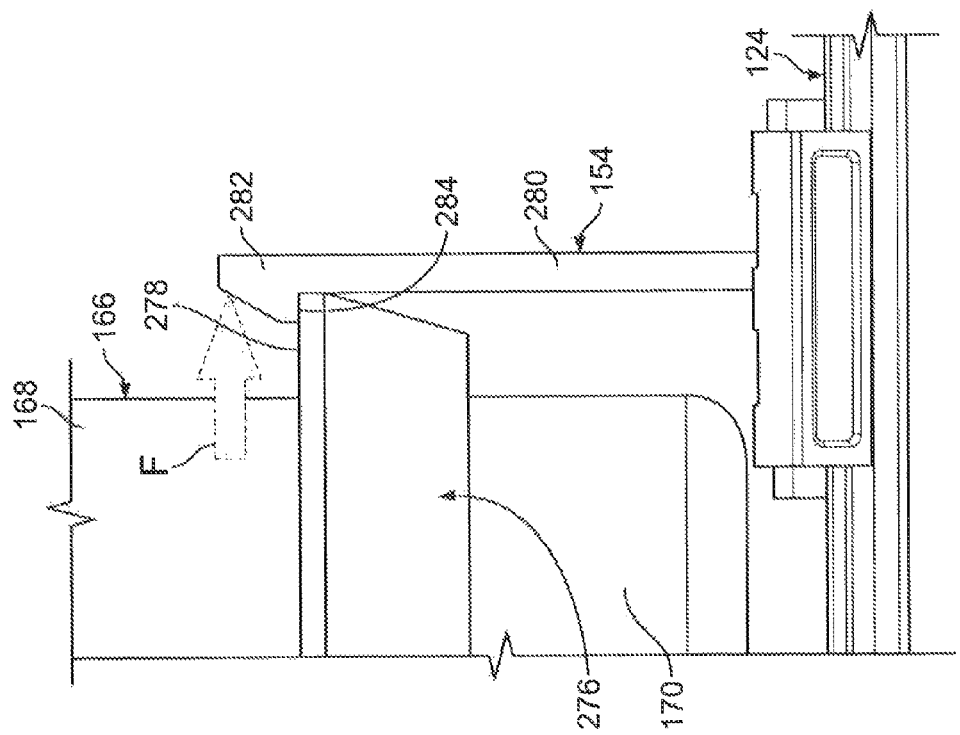
FIG. 13A is an enlarged view of the area 13A of FIG. 6 showing a first embodiment of a retention latch.

Further, the canister subassembly 121 is secured to the motor housing 124 through the engagement of the front latch 154 with the canister body 166. Reference is made to FIGS. 13A and 13B in discussing this attachment, which are enlarged view of the area 13A of FIG. 6 showing the front latch 154 in greater detail. Particularly, the canister body 166 includes a locking interface 276 between the upper and lower portions 168, 170 of the canister body 166. The locking interface 276 is generally an annular ring extending about the periphery of the canister body 166, and radially therefrom, that defines an upper ridge 278. The front latch 154 is generally a flag-shaped resiliently flexible member, e.g., a compliant mechanism or a spring-biased component. The front latch 154 includes a body 280 connected with the motor housing 124 and a slanted head 282 forming an engagement surface 284. When the canister subassembly 121 is placed over the mounting boss 152, a downward force thereon results in the locking interface 276 contacting the slanted head 282 of the front latch 154 and forcing the front latch 154 to slightly bend at the body 280 forcing the slanted head 282 forward. Once the canister subassembly 121 is forced completely down, so that the entirety of the locking interface 276 is lower than slanted head 282, the front latch 154 snaps back to its original up-right position and the canister subassembly 121 is removably "locked" in position. In this "locked" position, the engagement surface 284 of the front latch 154 is adjacent and engages the upper ridge 278 of the locking interface 276, such that an attempt to remove the canister subassembly 121 from the motor housing 124 is prevented through the engagement of the engagement surface 284 and the upper ridge 278. Accordingly, in the "locked" position, the canister subassembly 121 can not be removed from the motor housing 124 without first disengaging the front latch 154. To disengage the front latch 154, and, thus, to remove the canister subassembly 121, a user must bias the front latch 154 forward so that there is clearance between the engagement surface 284 and the upper ridge 278. Removal of the canister subassembly 121 from the motor housing 124 is shown in FIG. 13B, which is an enlarged view of the retention latch of FIG. 13A deformed by a force F. As can be seen in FIG. 13B, to remove the canister subassembly 121, a user can exert a force F against the slanted head 282 of the front latch 154, forcing the slanted head 282 forward and bending the body 280. This results in the engagement surface 284 of the front latch 154 disengaging the upper ridge 278 of the locking interface 276, thus providing clearance therebetween and permitting the canister subassembly 121 to be removed from engagement with the motor housing 124.

The hydrocyclonic particle separator assembly 120 can include a plurality of sealing members 274, e.g., O-rings, disposed between adjacent parts to create a fluid-tight seal therebetween. For example, sealing members 274 can be positioned in the channel 150 of the intake 126, in the mounting ridge 198 of the canister body 166, between the annular sealing ring 227 of the cyclone manifold 176 and the dish 202 of the fine debris container 172, between the top plate 242 and the overflow opening 234 of each cyclone body 232, between the top plate 242 and the upper mounting rim 212 of the cyclone manifold 176, between the upper mounting rim 212 of the cyclone manifold 176 and the canister body 166, between the mounting flange 270 of the mounting boss 152 and the central hub 200 of the fine debris container 172, between the grommet 158 and the mounting boss 152, and within the locking interface 276. The sealing members 274 form a generally fluid-tight seal between the various components of the hydrocyclonic particle separator assembly 120 as well as between the hydrocyclonic particle separator assembly 120, the motor housing 124, and the intake 126.

Figure 7:
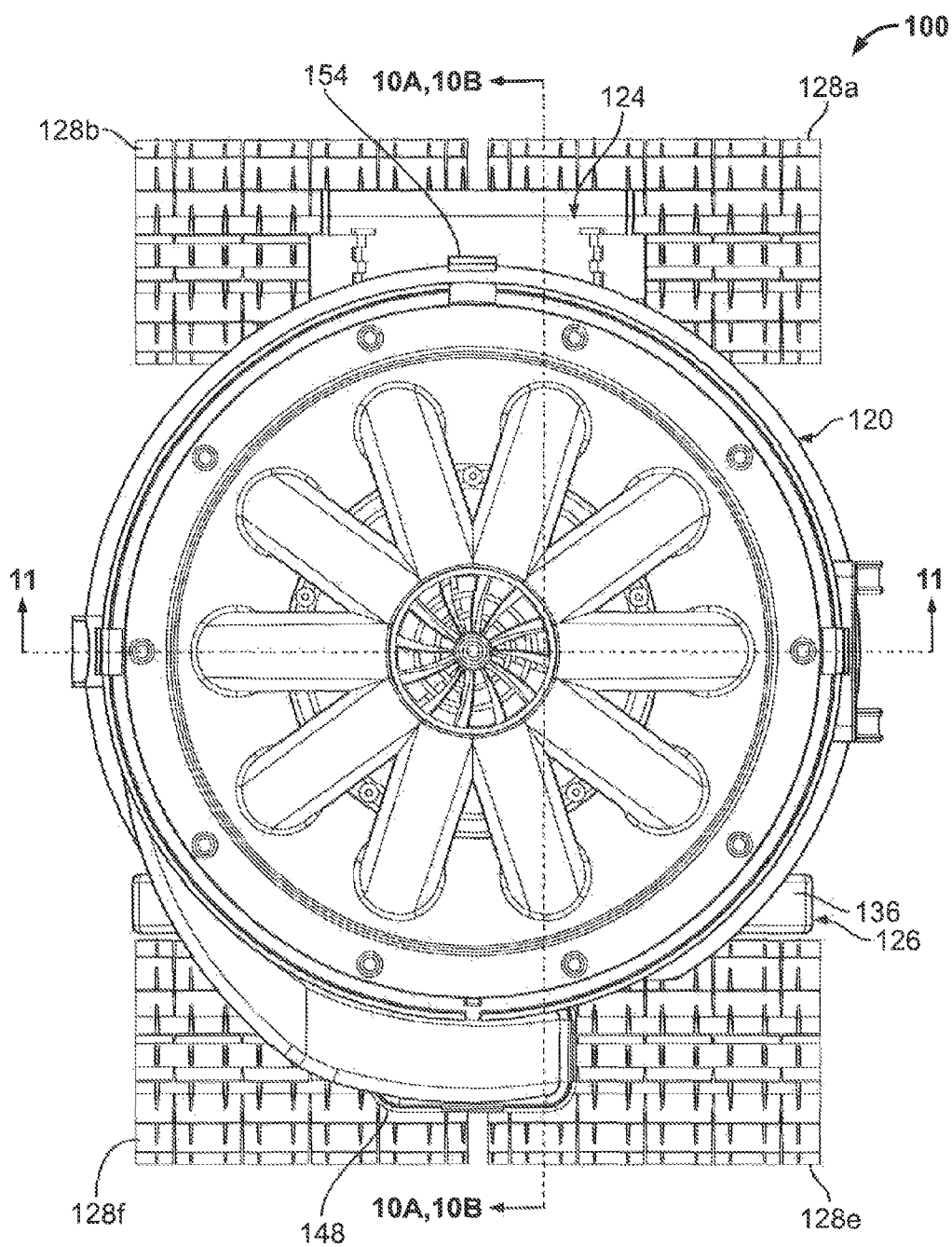
FIG. 7 is a top plan view of the pool cleaner of FIG. 1.
Figure 8:
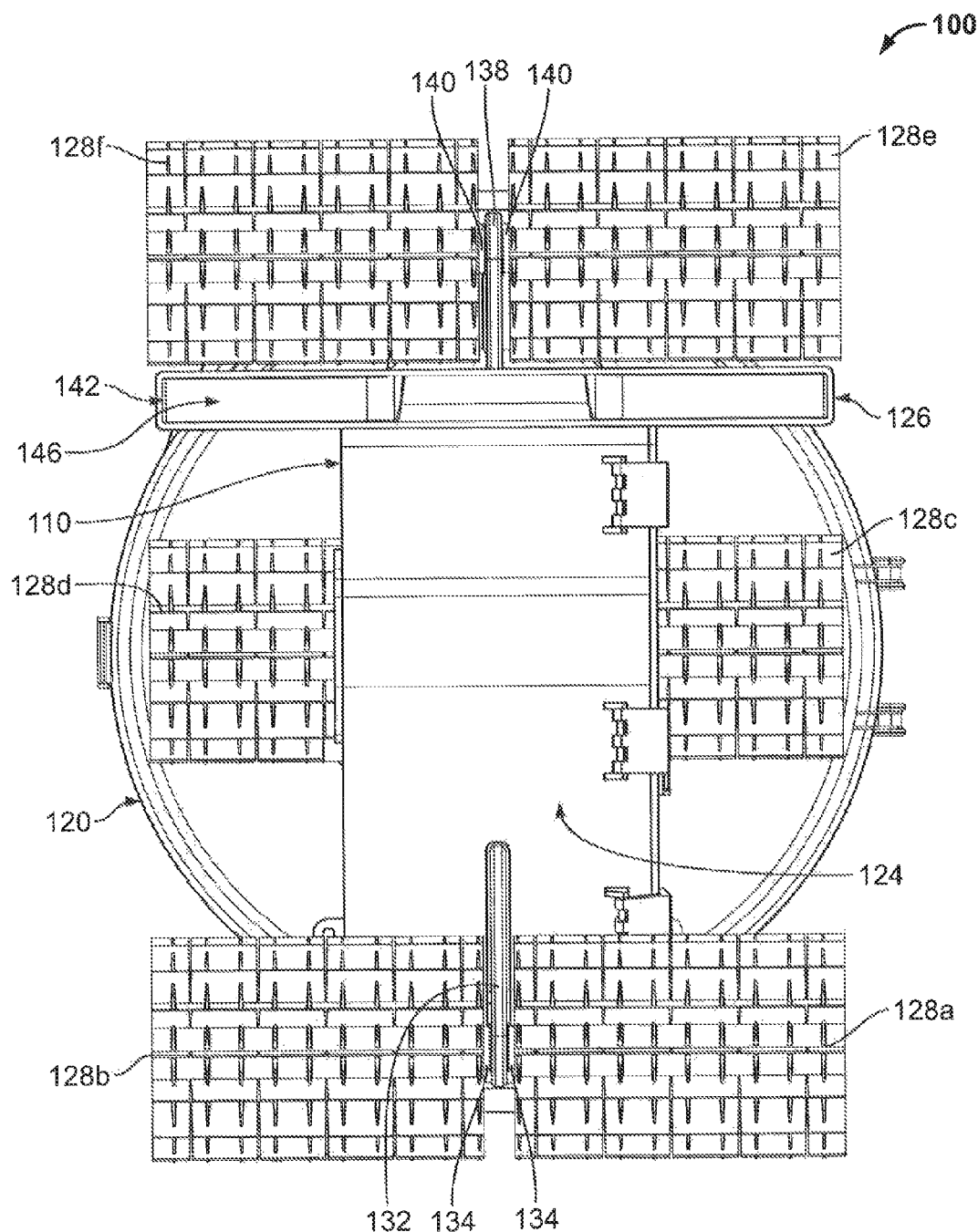
FIG. 8 is a bottom view of the pool cleaner of FIG. 1.
Figure 10B:
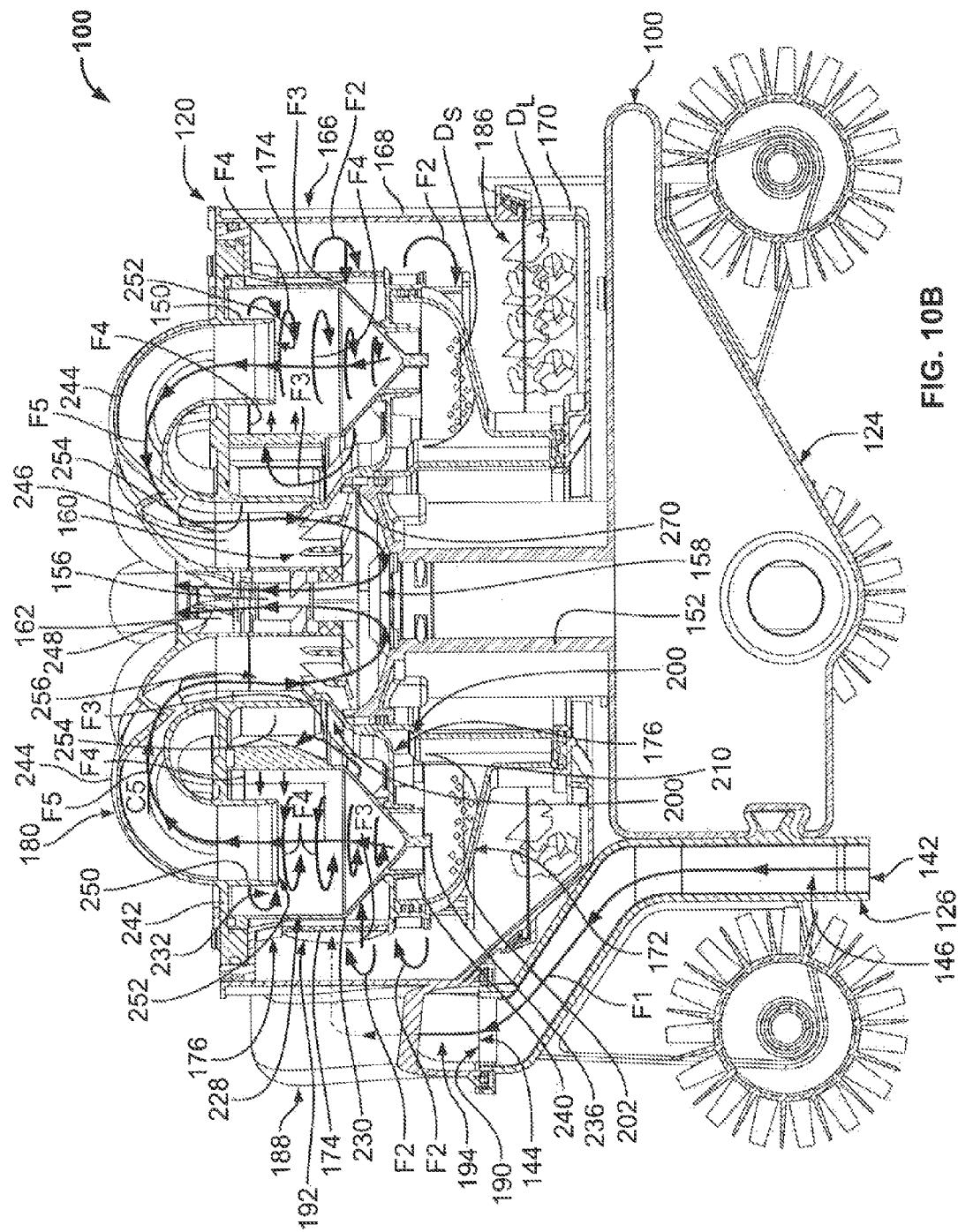
FIG. 10B is a sectional view of the pool cleaner taken along line 10B-10B of FIG. 7 showing, among other things, the flow paths of the pool cleaner.
Figure 10C:
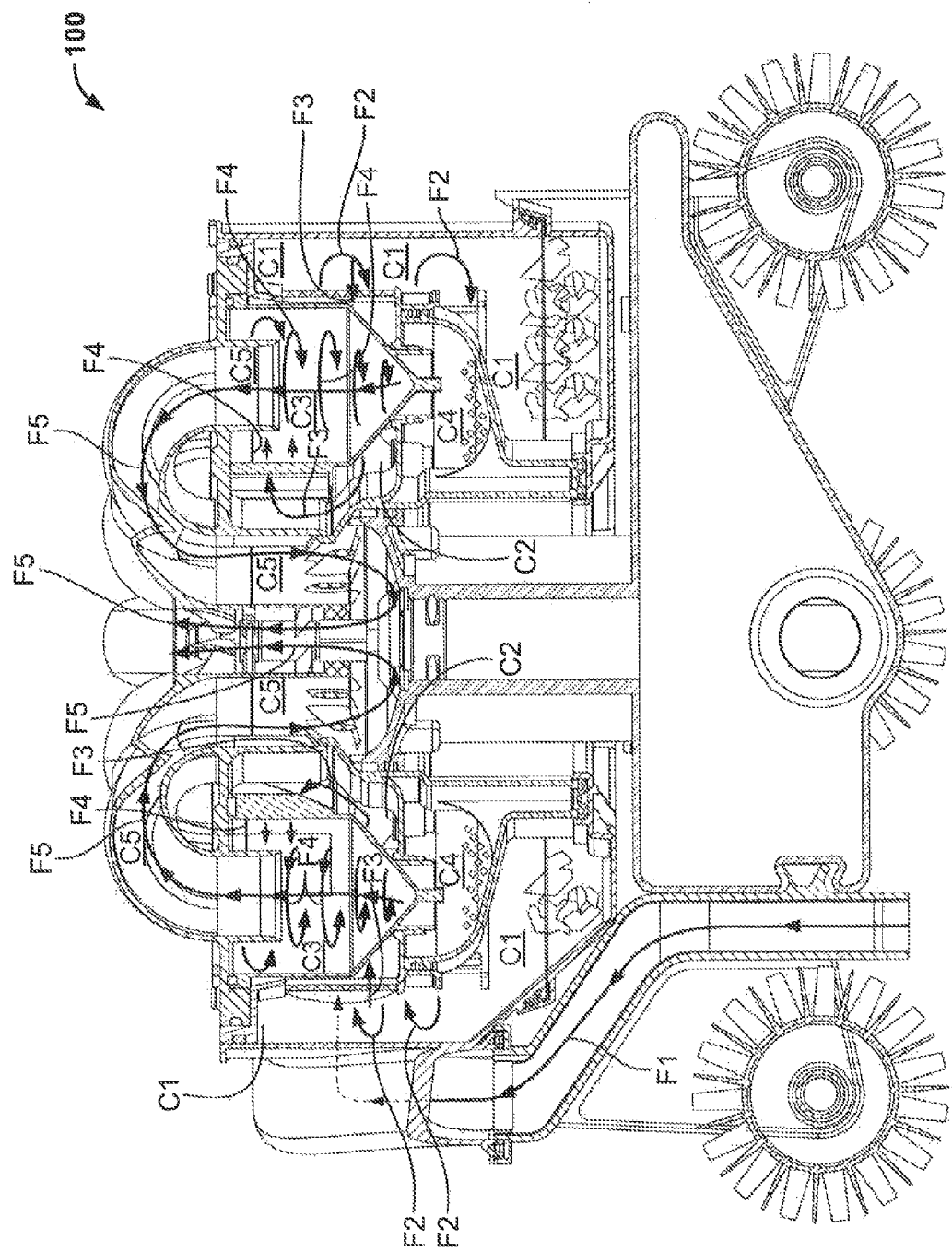
FIG. 10C is a sectional view of the pool cleaner taken along line 10C-10C of FIG. 7 showing, among other things, the chambers and flow paths of the pool cleaner.

When the hydrocyclonic particle separator assembly 120 is fully assembled and attached to the motor housing 124 and intake 126, a plurality of different chambers and flow paths are formed. FIG. 10A is a sectional view of the pool cleaner taken along line 10A-10A of FIG. 7 showing, among other things, reference numbers for the chambers of the pool cleaner, FIG. 10B is a sectional view of the pool cleaner taken along line 10B-10B of FIG. 7 showing, among other things, reference numbers for the flow paths within the pool cleaner, and FIG. 10C is a sectional view of the pool cleaner taken along line 10C-10C of FIG. 7 showing, among other things, reference numbers for certain chambers and flow paths of the pool cleaner. A first chamber C1 is generally formed at the interior of the canister body 166 and as a portion of the inner chamber 186 of the canister body 166. The first chamber C1 is generally delineated as being between the inside of the canister body 166, the outside of the fine debris container 172, the outside of the cyclone manifold 176, and the outside of the filtering medium 174. The first chamber C1 receives debris-laden water having large and small debris contained therein. Flow of the debris-laden water within the first chamber C1 is discussed in greater detail below in connection with the flow paths through the cleaner 100. A second chamber C2 is generally formed at the interior of the cyclone manifold 176, and generally delineated as being between the inside of the filtering medium 174, the inside of the cyclone manifold 176, the outside of the second tubular wall 254 of the top cap 180, the bottom of the top plate 242 of the top cap 180, the central hub 200 of the fine debris container 172, and the exterior cyclone container body 230 of each individual cyclone container 228. The second chamber C2 receives once-filtered debris-laden water from the first chamber C1, e.g., water that has small debris contained therein with the large debris filtered out. A third chamber C3 is generally formed at the cyclone chamber 232 of each individual cyclone container 228. The third chamber C3 is generally delineated as being between the interior of a cyclone container body 230, a vortex finder 250, and the bottom of the top plate 242. As such, the third chamber C3 is at least one third chamber C3 that is preferably comprised of a plurality of smaller, individual, radially-staggered chambers, e.g., each cyclone chamber 232 of each individual cyclone container 228, but for ease/clarity of description is referred to simply as a third chamber C3 and/or as at least one third chamber. The third chamber C3 receives the once-filtered debris-laden water from the second chamber C2. Flow of the once-filtered debris laden water is discussed in greater detail below. A fourth chamber C4 is generally formed at the interior of the dish 202 of the fine debris container 172, and generally delineated as being between the interior of the dish 202, the central hub 200, the bottom of the discoid body 210 of the cyclone manifold 176, the outlet nozzle of each individual cyclone container 228, and the mounting nozzle 240 of each individual cyclone container 228. The fourth chamber C4 is a static flow area that receives small debris that is separated out from the once-filtered debris-laden water that passes through the third chamber C3. The once-filtered debris-laden water is filtered a second time in the third chamber C3, where small debris "falls out" from the water and passes through the debris underflow nozzle 236 of each respective individual cyclone container 228 and into the fourth chamber C4. A fifth chamber C5 extends from the opening 252 of each vortex finder 250 to the central outlet 248 of the top cap 180. The fifth chamber C5 is generally delineated by the interior of the plurality of vortex finders 150, the inner chamber 245 of each of the plurality of arched tubes 244, the tubular chamber formed by the first and second tubular walls 246, 254, the finger guard 160, the mounting flange 270 of the mounting boss 152, the grommet 158, and the interior of the first tubular wall 246. Accordingly, the fifth chamber C5 is a serpentine-like chamber that originates at the opening 252 to each individual vortex finder 250 and extends to the central outlet 248 of the top cap 180, with the impeller 156, finger guard 160, and diffuser 162 being positioned in the fifth chamber C5. The fifth chamber C5 receives twice-filtered water, e.g., water having minimal debris therein, from the third chamber C3, and expels the water from the central outlet 248.

Turning now to a description of the flow paths through the cleaner 100, FIGS. 10B, 10C, 11, and 12 are sectional views of the cleaner 100 that illustrate the flow paths therethrough. A first flow path F1 extends from the inlet opening 142 of the intake 126, across the channel 146, out the outlet opening 144, into the inlet 190 of the canister intake 188, across the canister intake channel 194, and out of the tangential outlet 192 where the fluid enters the canister body 166. Water flowing through the first flow path F1 is unfiltered water that is laden with large and small debris $D_L$, $D_S$.

The second flow path F2 starts at the end of the first flow path F1, e.g., at the tangential outlet 192, entering the inner chamber 186 of the canister body 166 at the tangential outlet 192. The second flow path F2 enters the inner chamber 186 at a tangent to the canister body 166, the inner chamber 186, and the first chamber C1 and is partially directed by the flow director 218 of the cyclone manifold 176 to flow along the inner wall of the canister body 166. The combination of the tangential entrance of the second flow path F2 and the flow director 218 results in the generation of a cyclonic/rotational flow within the first chamber C1 that circles about a central axis A1 of the hydrocyclonic particle separator assembly 120. The cyclonic flow of the second flow path F2 within the first chamber C1 results in large debris particles $D_L$, e.g., debris having an aggregate size (e.g., each dimension) of up to about 1.25 inches, for example, such as, sticks, leaves, grass, coarse sand, fine sand, stones, pebbles, insects, small animals, etc., striking the interior surface of the canister body 166 and the filtering medium 174 and losing velocity, resulting in the large debris particles $D_L$ falling to the bottom of the canister body 166 where they are collected and stored until the canister subassembly 121 is removed from the cleaner 100 and emptied.

A third flow path F3 extends radially inward from the second flow path F2, flowing across the filtering medium 174 and the windows 220 of the cyclone manifold 176 into the second chamber C2. Fluid and smaller debris $D_S$ are contained in the third flow path F3, but the larger debris $D_L$ has been separated out. Accordingly, the fluid in the third flow path F3 is once-filtered fluid. The third flow path F3 connects with a fourth flow path F4 at the tangential inlet 238 to each individual cyclone container 228.

The fourth flow path F4 enters each individual cyclone container 228 at the respective tangential inlet 238 where it proceeds to the respective cyclone chamber 232, e.g., third chamber C3. The placement of the individual cyclone container's tangential inlet 238, e.g., at a tangent to the respective cyclone chamber 232, results in the fourth flow path F4 being a cyclonic/rotational flow within each cyclone chamber 232 about a secondary axis A2 of each individual cyclone container 228. The fourth flow path F4 rotates within each individual cyclone container 228 to separate smaller debris $D_S$, e.g., debris having an aggregate size (e.g., each dimension) of up to about 0.080 inches, for example, such as, coarse sand, fine sand, silt, dirt, insects, etc., based on the ratio of the smaller debris' $D_S$ centripetal force to fluid resistance from the fluid stream of the fourth flow path F4. More specifically, the fourth flow path F4 travels along the interior wall of the respective cyclone container body 230 and travels downward along the cyclone container body 230 toward the debris underflow nozzle 236 where the cyclone container body 230 beings to taper. As the fourth flow path F4 travels toward the tapered end of the cyclone container body 230, the rotational radius of the fourth flow path F4 is reduced. As the rotational radius of the fourth flow path F4 is reduced, the larger and denser particles of the smaller debris particles $D_S$ within the fourth flow path F4 have too much inertia to follow the continually reducing rotational radius of the fourth flow path F4 causing the smaller debris particles $D_S$ to contact the cyclone container body 230 and fall to the bottom where the small debris particles $D_S$ falls through the respective debris underflow nozzle 236 and into the fourth chamber C4 where it is collected and stored by the fine debris container 172 until the canister subassembly 121 is removed from the cleaner 100 and emptied. The fine debris container 172 can include holes or slots in the dish 202 thereof that allow the small debris particles $D_S$ to fall into the lower portion 170 of the canister body 166 or fall out from the fine debris container 172 when the canister body 166 is opened. The result of the above description is that smaller and smaller debris is separated from the fluid flowing in the fourth flow path F4 as the fourth flow path F4 proceeds down the tapered portion of the cyclone container body 230 forming an inner vortex. Additionally, as the fluid within the fourth flow path F4 reaches the bottom of the tapered portion of the cyclone container body 230, and the inner vortex, it slows down causing the fluid therein to be pulled upward through the respective vortex finder 250 as twice-filtered fluid and enter the fifth chamber C5 where it merges with the fifth flow path F5.

The fifth flow path F5 connects with the fourth flow path F4 at the opening 252 to each vortex finder 250 where twice-filtered fluid enters the fifth chamber C5. The fifth flow path F5 extends from the opening 252 of each vortex finder 250, across each inner chamber 245, into and across the tubular chamber 256, across the plurality of fins 268 of the finger guard 160, underneath the inner cylindrical wall 264, through the center of the inner cylindrical wall 264, out from the finger guard 160, through the diffuser 162, through the center of the first annular wall 246 of the top cap 180, and exits through the central outlet 248 of the top cap 180. That is, the fifth flow path F5 completely traverses the fifth chamber C5.

Accordingly, the larger cyclonic/rotational flow of the second flow path F2 flows about the central axis A1, while the smaller cyclonic/rotational flows of the fourth flow path F4 are formed and flow about the secondary axis A2 of each individual cyclone container 228, thus resulting in a plurality of smaller cyclonic/rotational flows within a larger cyclonic/rotational flow.

The flow of fluid through the cleaner 100, e.g., the five flow paths F1, F2, F3, F4, F5, is generated by the impeller 156 that is driven by the third motor (not shown) and positioned inline with the central outlet 248 of the top cap 180. The impeller 156 functions to discharge fluid through the central outlet 248 of the top cap 180, thus pulling fluid in reverse sequence through the cleaner 100. More specifically, the impeller 156 accelerates fluid through the central outlet 248 resulting in fluid being pulled sequentially through the fifth flow path F5, the fourth flow path F4, the third flow path F3, the second flow path F2, and then the first flow path F1 where the debris-laden fluid enters the cleaner 100 at the intake 126 through a suction effect generated at the inlet opening 142 of the intake 126.

As such, debris-laden fluid flowing through the cleaner 100 is filtered twice by particle separation due to the cyclones generated in the first chamber C1 and the third chamber C4. Utilizing the cyclonic flows within the cleaner 100 to separate the particles and drop the particles out of the flow path results in the retention of suction performance throughout the cleaner, as there is no opportunity for the debris particles to clog the filtering elements. This allows for optimum fluid flow performance through entire cleaning cycles, longer cleaner run times between debris removal, and the collection of more debris before needing to empty the canister subassembly 121. As is known in the art, the outward flow of clean fluid results in an opposing force, which, as is also known in the art, can be relied upon in navigation of the pool cleaner for the purpose of forcing a pool cleaner downward against the floor when the pool cleaner is traversing the floor and sideways against a wall, when the pool cleaner is traversing a wall of the pool.

Figure 11:
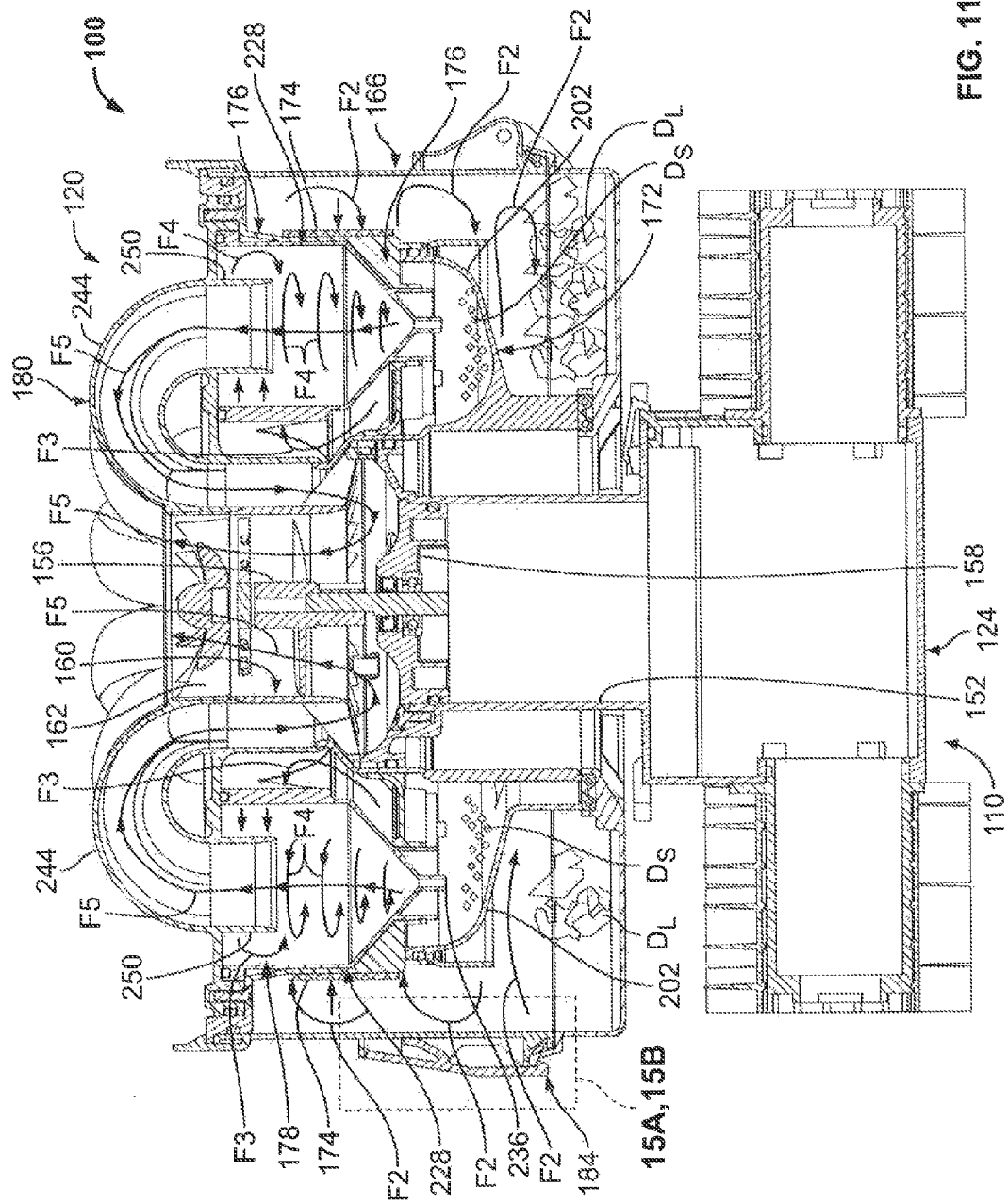
FIG. 11 is a sectional view of the pool cleaner taken along line 11-11 of FIG. 7.

Turning now to the release means 184 for disengaging the upper and lower portions 168, 170 of the canister body 166 (e.g., quick-release latch), FIG. 15A is an enlarged view of the area 15A of FIG. 11 showing the quick-release latch 184 of the present disclosure in greater detail. The quick-release latch 184 includes a generally flag-shaped body 286 having a shaped head 288 at a first end and a user-engageable tab 290 at a second end opposite the first end, a pivot 292 disposed between the shaped head 288 and the user-engageable tab 290, and a spring 294 extending from the body 286. The spring 294 can be a resiliently flexible member integral with the body 286, e.g., a compliant mechanism, or it can be a torsion spring, compression spring, or any other spring mechanism known to one of skill in the art. The body 286 is mounted to a bracket 296 extending from the top portion 168 of the canister body 166 by the pivot 292 such that the body 286 is rotatable about the pivot 292. When the body 286 is interconnected with the bracket 296 the spring 294 is positioned between the body 286 and the canister body 166. The quick-release latch 184 is configured to engage a ridge 298 that extends radially outwardly from the lower portion 170 of the canister body 166. Particularly, the shaped head 288 includes a latching surface 300 that is configured to overlap the ridge 298 when the quick-release latch 184 is in a first position, e.g., a "locked" or "engaged" position. When in the first position, the spring 294 engages the canister body 166 biasing the user-engageable tab 290 away from the canister body 166 and the shaped head 288 toward the canister body 166, e.g., the spring 294 biases the quick-release latch 184 rotationally about the pivot 292. In this first position, the latching surface 300 overlaps the ridge 298 preventing the upper portion 168 and the lower portion 170 of the canister body 166 from being separated. However, a user can apply a force in the direction of arrow F against the user-engageable tab 290 to place the quick-release latch 184 in a second position, e.g., an "unlocked" or "disengaged" position. FIG. 15B is an enlarged view of the quick-release latch 184 in the second position. As can be seen in FIG. 15B, as a force is applied to the user-engageable tab 290 in the direction of arrow F the spring 294 is compressed between the user-engageable tab 290 and the canister body 166, resulting in the user-engageable tab 290 moving toward the canister body 166 and the shaped head 288 away from the canister body 166 and the ridge 298. Movement of the shaped head 288 away from the canister body 166 and the ridge 298 results in clearance between the shaped head 288 (and the latching surface 300) and the ridge 298 so that the upper and lower portions 168, 170 of the canister body 166 can be rotated apart from one another about the hinge 182, as shown in FIG. 16, which is a front elevational view of the canister body 166 opened. Removing the force from the user-engageable tab 290 results in the spring 294 pushing the quick-release latch 184 back into the first position, e.g., the user-engageable tab 290 is rotated away from the canister body 166 and the shaped head 288 is rotated toward the canister body 166.

As can be seen in FIG. 16, when the quick-release latch 184 is moved into the second position, the lower portion 170 and the upper portion 168 of the canister body 166 are permitted to rotate away from one other about the hinge 182. Accordingly, as the lower portion 170 is rotated, any large and small debris $D_L$, $D_S$ retained in the lower portion 170 can fall out or be removed therefrom, and any small debris $D_S$ retained by the fine debris container 172 can fall through the holes/slots thereof or be removed therefrom, as illustrated in FIG. 16. Additionally, the canister subassembly 121 is configured to retain water during cleaning, which can be swirled around the inside of the canister subassembly 121 during cleaning to ensure that all debris is in suspension and thus assist with flushing out the large and small debris $D_L$, $D_S$. This configuration allows a user to remove the debris $D_L$, $D_S$ from the canister body 166 without having to touch the debris $D_L$, $D_S$.

One of ordinary skill in the art should appreciate that the release means 184 could be any suitable means for engaging the upper and lower portions 168, 170 of the canister body 166. For example, the release means 184 could be a mating component arrangement, a sliding spring latch, a rotatable spring latch, or any other known latching assemblies.

Figure 14:
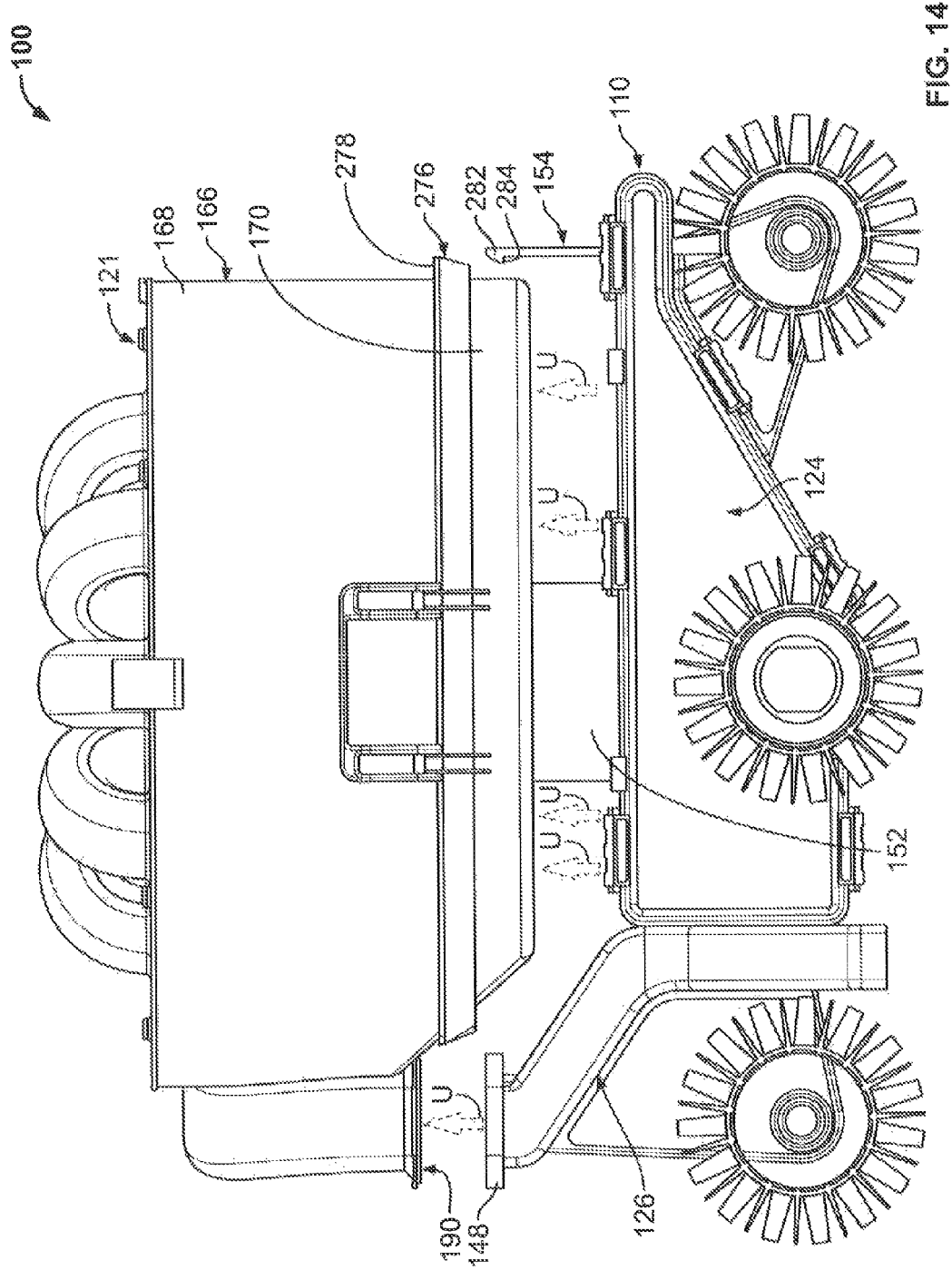
FIG. 14 is a partially exploded view of the cleaner of FIG. 1 showing removal of the canister subassembly from the motor housing.

In operation, to empty the canister body 166 a user would first disconnect the canister subassembly 121 from the motor housing 124 by pressing forward against the front latch 154, as shown in FIG. 13B, to disengage the front latch 154 from the locking interface 276, and then removing the canister subassembly 121 from the motor housing 124 by pulling in the direction of arrows U shown in FIG. 14. Once removed, the user would then press the user-engageable tab 290 of the quick-release latch 184 in the direction of arrow F of FIG. 15A to disengage the shaped head 288 of the quick-release latch 184 from the ridge 298, as shown in FIG. 15B. Upon disengagement of the shaped head 288 from the ridge 298 the upper and lower portions 168, 170 of the canister body 166 are permitted to rotate away from one another about the hinge 182, thus opening the canister subassembly 121. The user would then further separate the upper and lower portions 168, 170, and turn the lower portion 170 upside down allowing the large and small debris $D_L$ and $D_S$ to fall from the lower portion 170, and the small debris $D_S$ to fall from the fine debris container 172, e.g., through the holes/slots thereof. To close the canister subassembly 121 a user would rotate the upper and lower portions 168, 170 toward one another about the hinge 182 until the ridge 298 engages the shaped head 288. Continued force by the user will cause for the ridge 298 to push the shaped head 288 away from the canister body 166, that is, the spring 294 will become compressed, until the canister body 166 is closed with the ridge 298 clearing the shaped head 288. Once the ridge 298 clears the shaped head 288, the shaped head 288 is biased by the spring 294 toward the canister body 166 placing the latching surface 300 adjacent the ridge 298 and thus locking the canister body 166. The user then places the canister subassembly 121 over the mounting boss 152 and aligns the inlet 190 of the canister intake 188 with outlet 144 of the intake 126. Next, the user exerts a downward force on the canister subassembly 121 so that the locking interface 276 contacts the slanted head 282 of the front latch 154 and forces the front latch 154 to slightly bend at the body 280 such that the slanted head 282 is forced forward. Once the canister subassembly 121 is forced completely down so that the entirety of the locking interface 276 is lower than slanted head 282, the front latch 154 snaps back to its original up-right position and the canister subassembly 121 is removably "locked" in position, as shown in FIG. 13B.

In other aspects of the present disclosure, the canister subassembly 121 can be provided with a handle to facilitate handling thereof by a user.

Further discussion shall now be had with respect to example embodiments of a drive system 110. As discussed above with reference to FIG. 2, for example, a first one of the drive rollers 130 is operatively connected to a first drive motor (not shown) inside the motor housing 124 and a first roller set (rollers 128a, 128c, and 128e) for mechanical communication of the driving force thereto, and such that the rollers 128a, 128c, and 128e rotate at the same first rate. As also discussed above with reference to FIG. 2, for example, a second one of the drive rollers 130 is operatively connected to a second drive motor (not shown) inside the motor housing 124 and a second roller set (rollers 128b, 128d, and 128f) for mechanical communication of the driving force thereto, and such that the rollers 128b, 128d, and 128f rotate at the same second rate.

In the disclosure of the embodiments of FIGS. 1-16, gear trains can be provided that are not shown, but can be internal of the other components and/or positioned centrally proximal the ends of the rollers 128a-f that are proximate to the motor housing 124. For example, a first gear train can be provided for mechanical linkage and translation of drive from the first roller drive 130 to the rollers 128a, 128c, and 128e of the first roller set, and a second gear train can be provided for mechanical linkage and translation of drive from the second roller drive 130 to the rollers 128b, 128d, and 128f of the second roller set.

Figure 17:
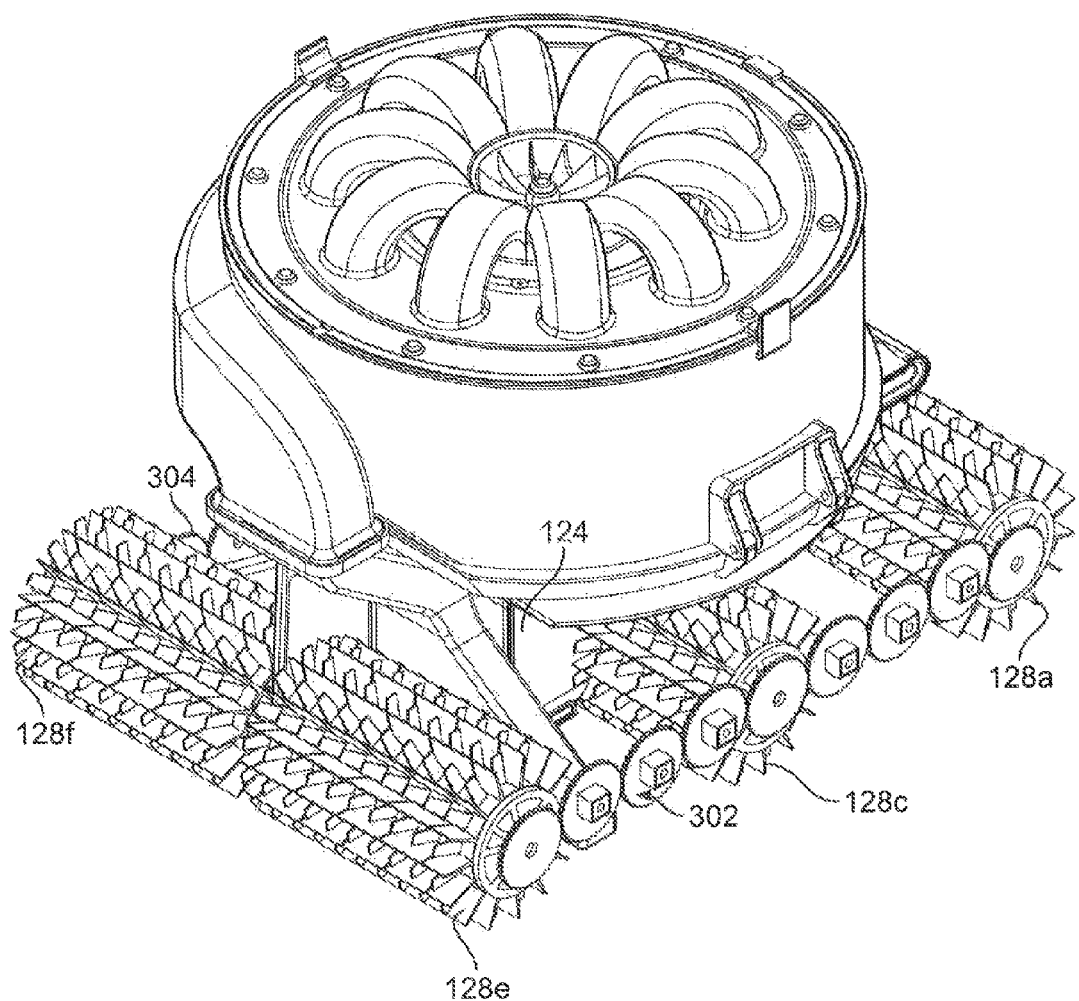
FIG. 17 is a perspective view of a second embodiment of a pool cleaner with gears thereof shown schematically distal of the motor housing.
Figure 18:
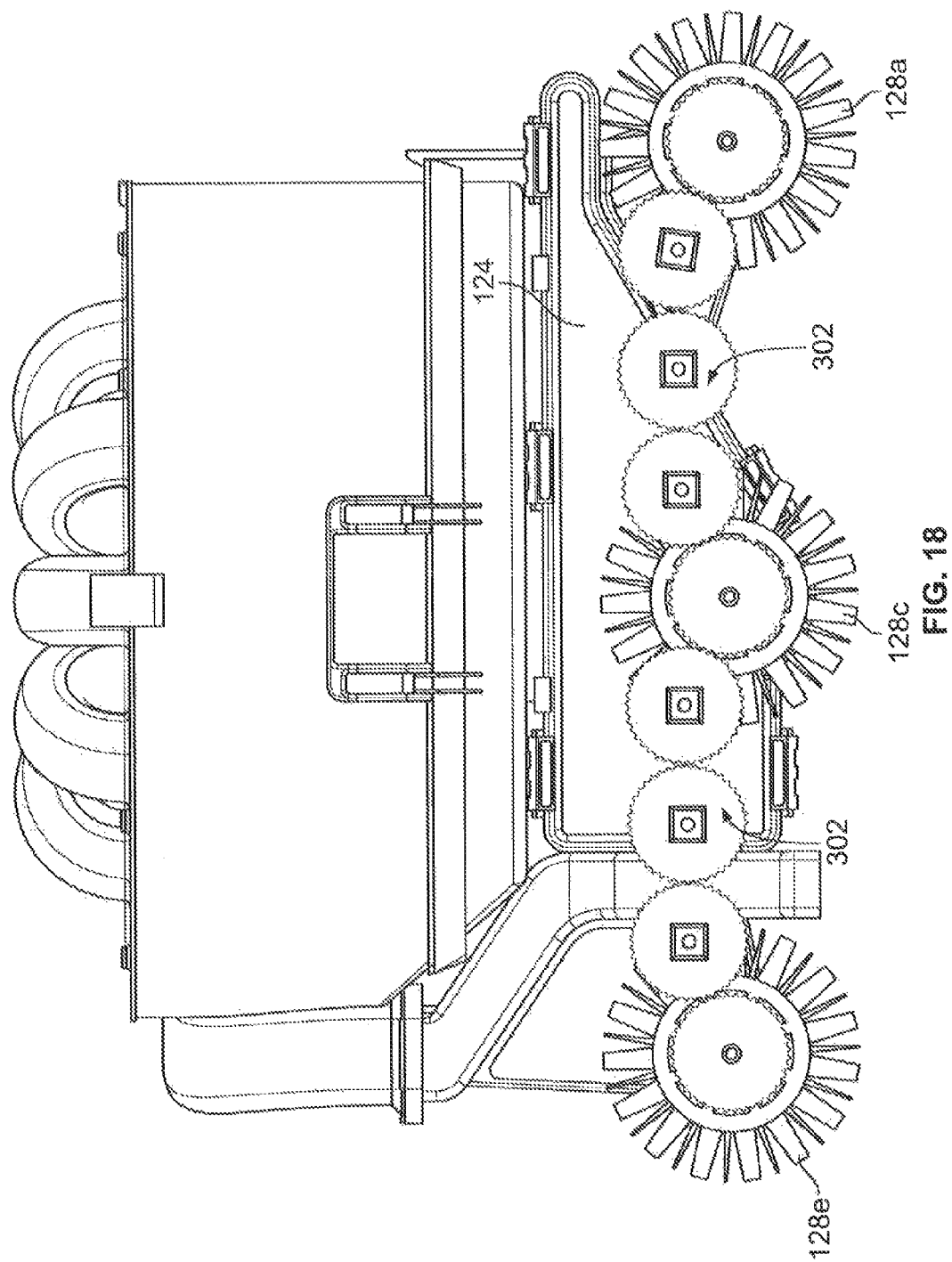
FIG. 18 is a right side elevational view of the pool cleaner of FIG. 17.
Figure 19:
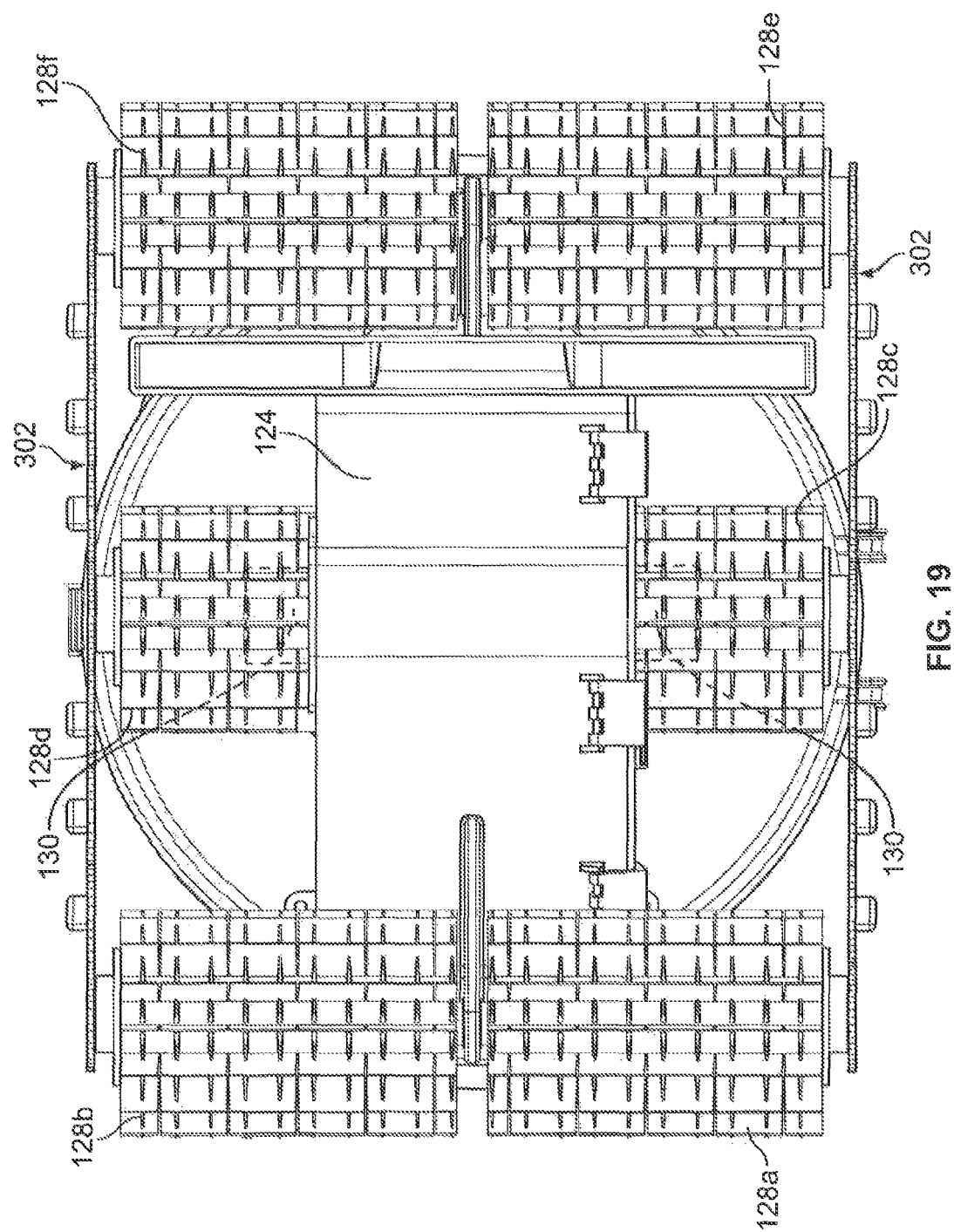
FIG. 19 is a bottom view of the pool cleaner of FIG. 17.
Figure 20:
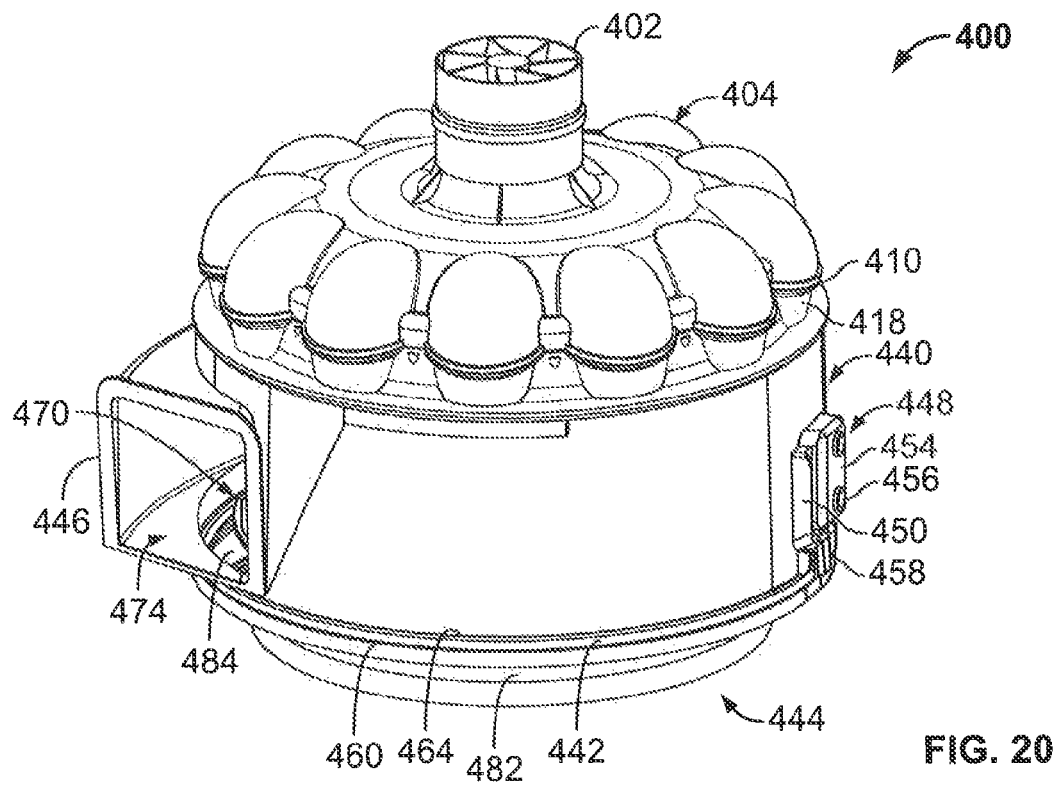
FIG. 20 is a perspective view of a second embodiment of a hydrocyclonic particle separator assembly.
Figure 21:
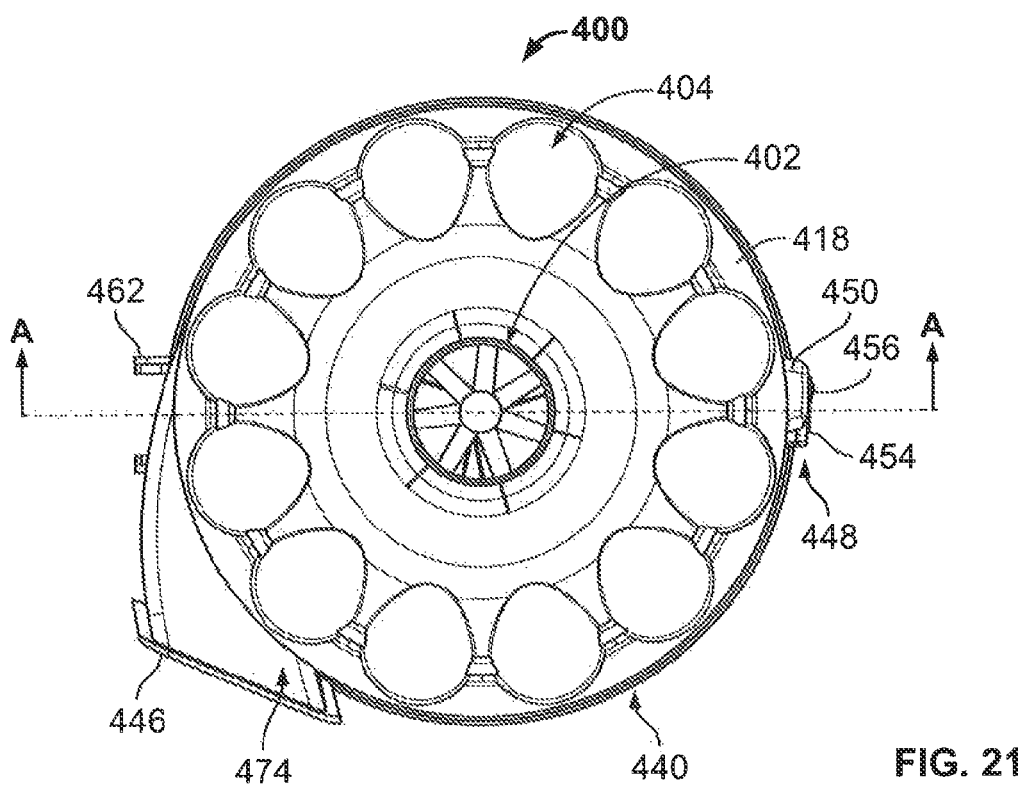
FIG. 21 is a top view of the hydrocyclonic particle separator assembly of FIG. 20.
Figure 22:
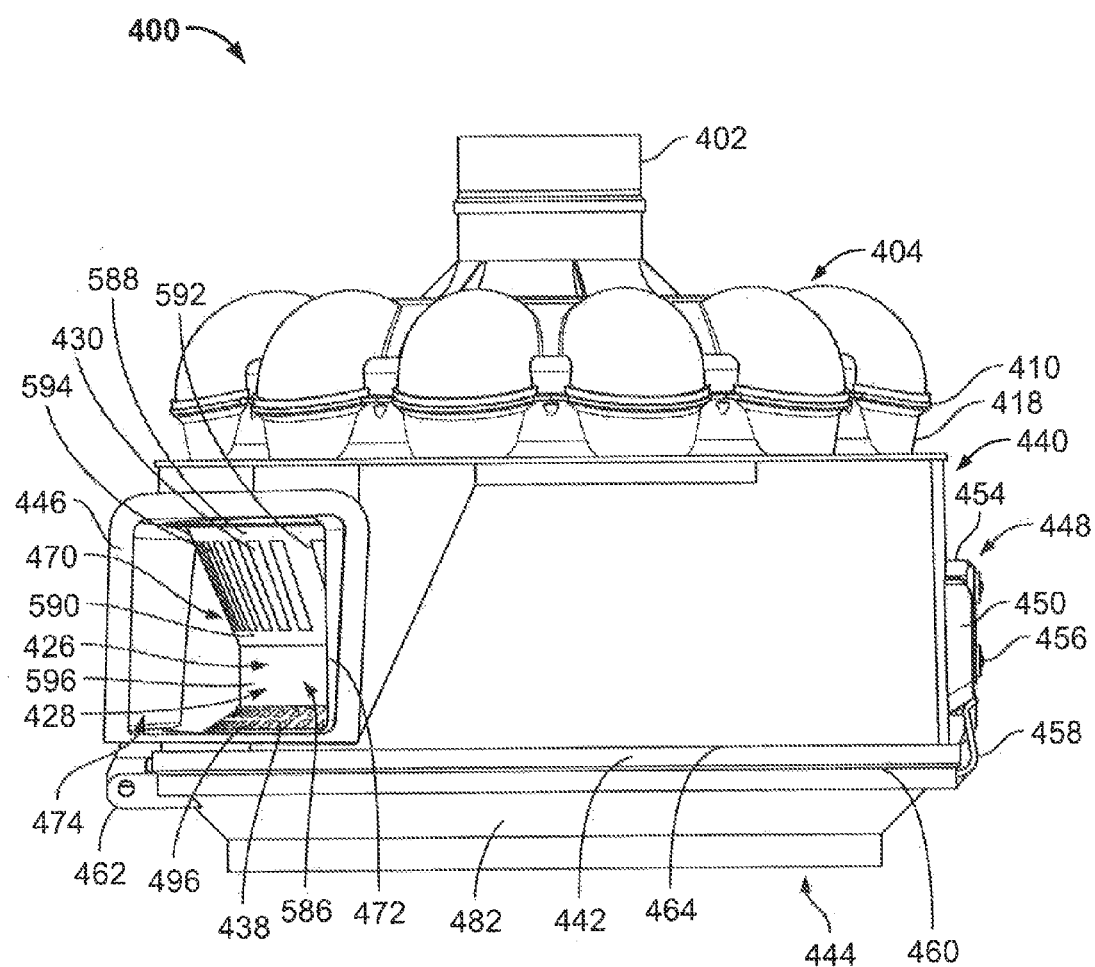
FIG. 22 is a side view of the hydrocyclonic particle separator assembly of FIG. 20.
Figure 23:
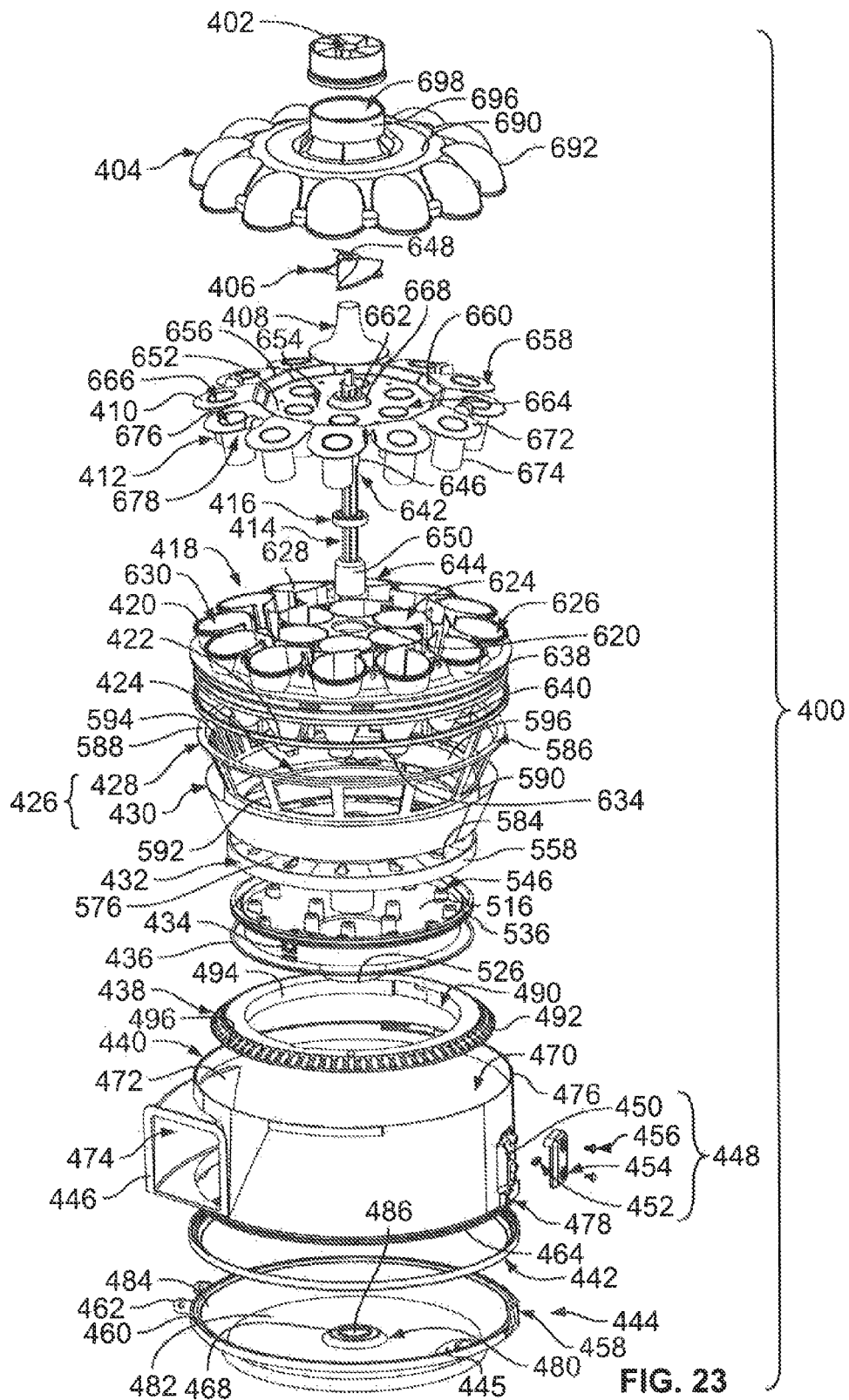
FIG. 23 is an exploded perspective view of the hydrocyclonic particle separator assembly of FIG. 20.
Figure 24:
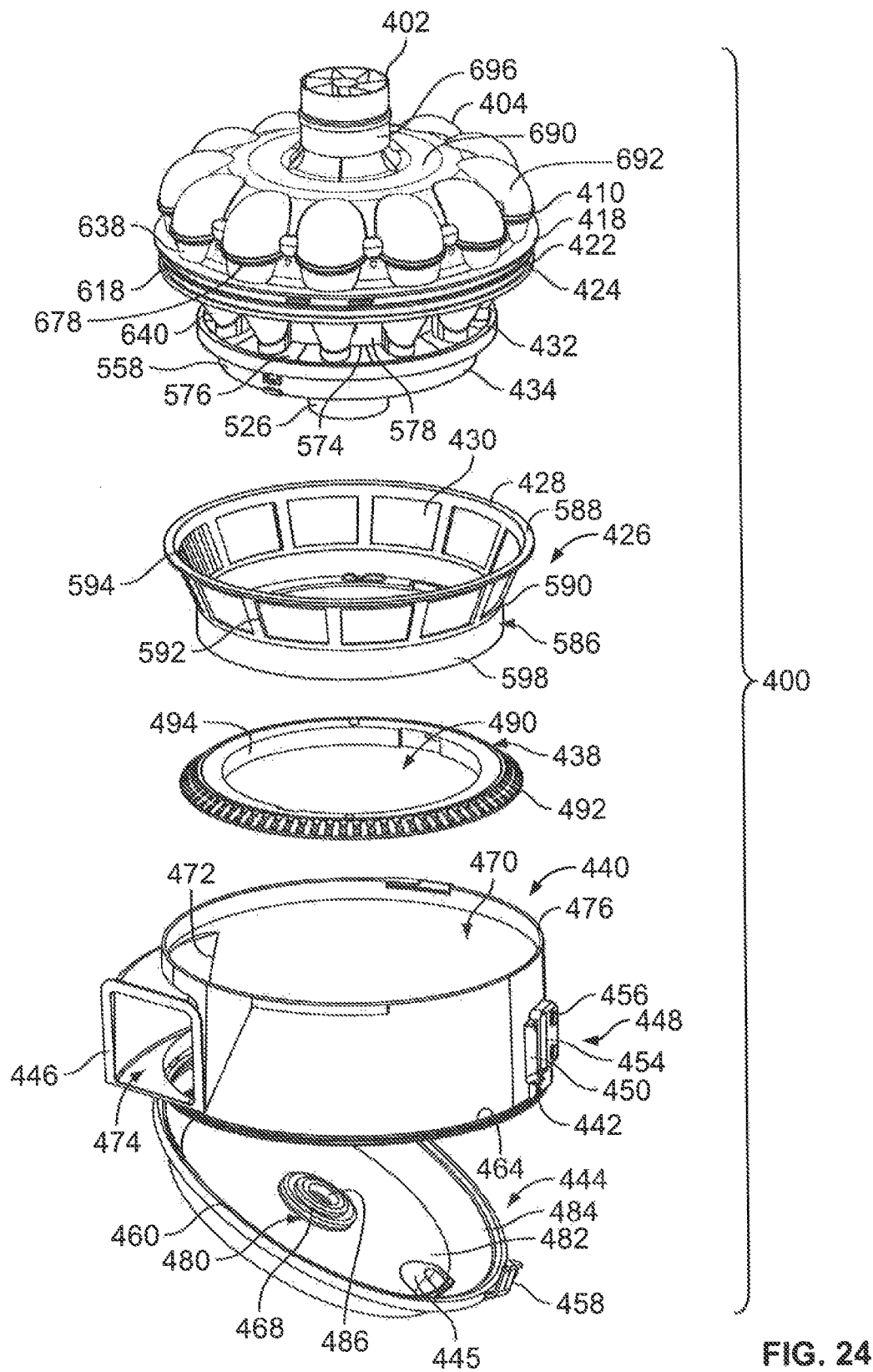
FIG. 24 is a partially exploded perspective view of the hydrocyclonic particle separator assembly of FIG. 20.

Referring to FIGS. 17-19, it is not required for the first gear train and/or the second gear train to be positioned internally of other components and/or to be positioned at ends of the rollers 128a-f that are proximate the motor housing 124. Indeed, as shown in FIGS. 17-19, an example first gear train 302 and an example second gear train 304 can be positioned external of other components and/or at ends of the rollers 128a-f that are distal the motor housing 125.

Although electric sources are contemplated, other power sources are also contemplated. For example, the power source can be positive water pressure, as in what is commonly referred to in the pool industry as a "pressure cleaner." As another example, the power source can negative water pressure, as in what is commonly referred to in the pool industry as a "suction cleaner." Any power source and/or combinations thereof are contemplated.

The first rate and the second rate can be the same or different, depending on the circumstances. For example, where the cleaner desires to move in a straight trajectory, the first rate and the second rate may generally be the same, except whether the pool cleaner detects that other relevant parameters are unequal, such as uneven traction, in which case the first rate and the second rate may be different for a straight trajectory. Where it is desired for the pool cleaner to turn, for example, the first rate and the second rate may be different. Additionally and/or alternatively, the first set of rollers (rollers 128a, 128c, and 128e) can rotate in a first direction, while the second roller set (rollers 128b, 128d, and 128f) can rotate in a second direction opposite the first direction.

With reference to FIGS. 20-28, perspective, top, side, exploded and sectional views of a second embodiment of a hydrocyclonic particle separator assembly 400 are provided. It should be understood that the hydrocyclonic particle separator assembly 400 can be substantially similar in structure and function to the hydrocyclonic particle separator 120 and can be implemented with the pool cleaner 100 when suitable, as understood by one of ordinary skill in the art.

The hydrocyclonic particle separator assembly 400 includes a canister subassembly and a fluid turbine subassembly. In particular, the hydrocyclonic particle separator assembly 400 includes a diffuser 402 (e.g., a stator), a top cap 404, an impeller 406, an impeller skirt 408, an impeller retaining ring 466, a ring 410 of vortex finders 412, a vortex finder gasket 678, a shaft 414, and a ball bearing 416 disposed around the shaft 414. The hydrocyclonic particle separator assembly 400 further includes a cyclone block 418 with a plurality of circumferentially disposed cyclone containers 420, a first gasket 422, a second gasket 424, a filtering assembly 426 including a filtering medium support 428 and a filtering medium 430, and a fine debris container top 432, and a fine debris container 434. The hydrocyclonic particle separator assembly 400 further includes an O-ring 436, a debris separator ring 438, a canister body 440, a gasket 442, a large debris container 444 that defines the bottom of the hydrocyclonic particle separator assembly 400, and a gasket 468 disposed between the large debris container 444 and the fine debris container 434.

The canister body 440 includes an inlet 446 that tangentially introduces fluid into the hydrocyclonic particle separator assembly 400. The canister body 440 further includes a locking assembly 448, the locking assembly 448 including a snap plate 450 disposed on the canister body 440, a snap spring 452, a slide cover 454 and screws 456. The locking assembly 448 can interlock with a complementary extension 458 protruding from a top edge 460 of the large debris container 444. The large debris container 444 includes a hinge 462 connected to a complementary hinge at a bottom edge 464 of the canister body 440. The large debris container 444 can thereby pivot at the hinge 462 between an open and a closed position, and the locking assembly 448 can be used to lock the large debris container 444 relative to the canister body 440 to maintain the large debris container 444 in a closed position.

Figure 29:
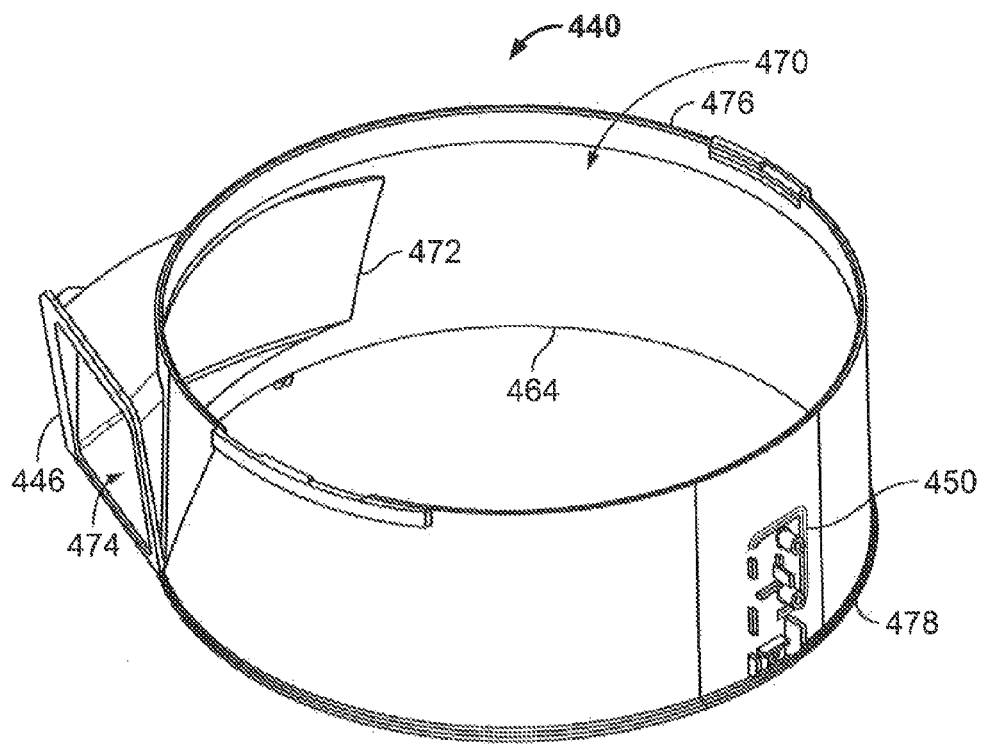
FIG. 29 is a perspective view of a canister body of the hydrocyclonic particle separator assembly of FIG. 20.

The impeller 406 can engaged with the shaft 414 such that rotation of the shaft 414 simultaneously rotates the impeller 406. The shaft 414 can engage the third motor (not shown), which can be positioned within the mounting boss 152 of the motor housing 124 (see, e.g., FIG. 2). The bottom edge 464 of the canister body 440 can be hingedly engaged with the large debris container 444 by the hinge 462 and releasably secured to each other by the locking assembly 448 (e.g., a quick-release latch). The gasket 442 can separate the bottom edge 464 of the canister body 440 from the top edge 460 of the large debris container 444. With additional reference to FIG. 29, the canister body 440 generally defines an inner chamber 470 and includes the intake or inlet 446 positioned such that fluid is introduced tangentially into the inner chamber 470. In particular, the inlet 446 includes a tangential outlet 472 and an intake channel 474 extending between the inlet 446 and the tangential outlet 472. The tangential intake of fluid through the intake channel 474 results in the generation of a first cyclonic flow within the inner chamber 470. The canister body 440 defines a substantially cylindrical configuration with substantially similar top and bottom edge openings 476, 478. In some embodiments, the hydrocyclonic particle separator assembly 400 can include a check valve (not shown) for regulating the amount of fluid flow passing through the hydrocyclonic particle separator assembly 400. In some embodiments, the check valve can be disposed at or near the inlet 446 of the canister body 440.

Figure 30:
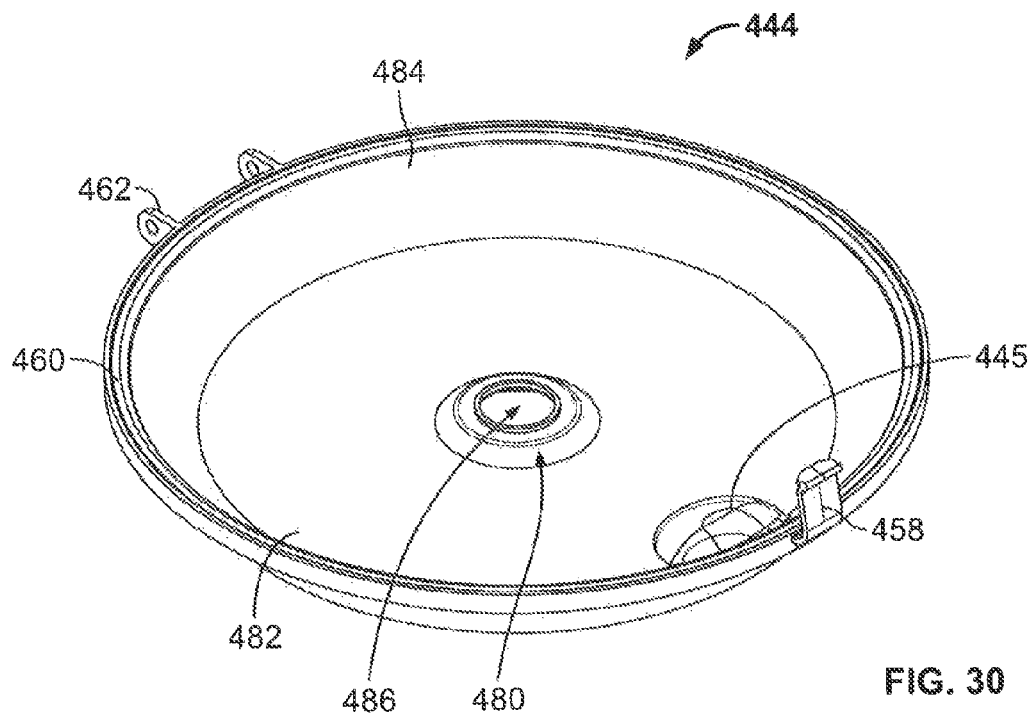
FIG. 30 is a perspective view of a large debris container of the hydrocyclonic particle separator assembly of FIG. 20.

With additional reference to FIG. 30, the large debris container 444 includes a central hub 480 surrounded by a dish 482 extending radially from the central hub 480. In some embodiments, the dish 482 can have an upwardly-curving shape such that the dish 482 catches any debris that falls into the dish 482 and forms a static area where falling debris can land. In some embodiments, the dish 482 can include a substantially planar bottom surface with upwardly angled side walls 484. The central hub 480 includes a top opening 486 through which one end of the shaft 414 can pass to engage the third motor. In some embodiments, the bottom surface of the large debris container 444 can include a honeycomb pattern of ribs 488. The ribs 488 can reduce the overall weight of the large debris container 444 while providing structural support. The entire volume of the dish 482 can be disposed below the canister body 440.

Figure 31:
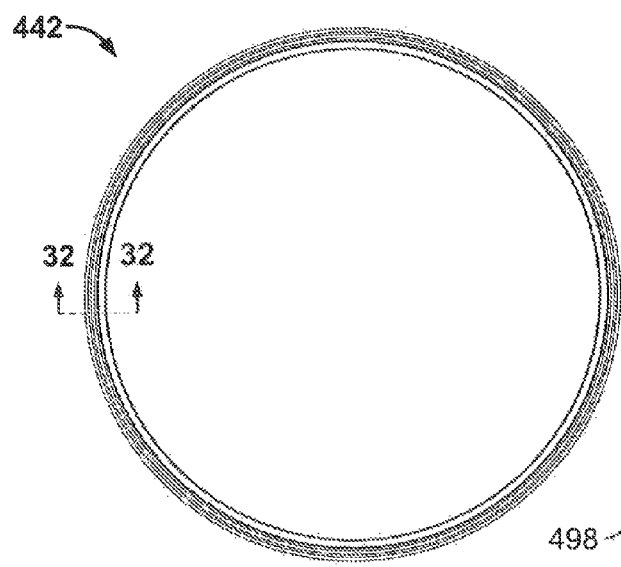
FIG. 31 is a top view of a gasket of the hydrocyclonic particle separator assembly of FIG. 20.
Figure 32:
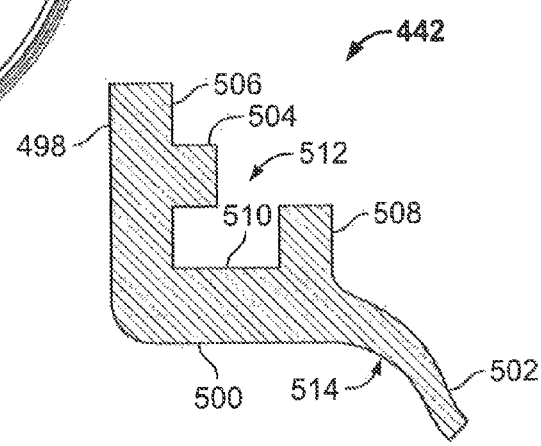
FIG. 32 is a sectional view of the gasket taken along line 32-32 of FIG. 31.

The gasket 442 separates the perimeter of the bottom edge 464 of the canister body 440 from the top edge 460 of the large debris container 444. With reference to FIGS. 31 and 32, the gasket 442 defines a substantially L-shaped cross-section including a vertical portion 498 extending perpendicularly from a horizontal portion 500. The proximal end of the horizontal portion 500 connects to the vertical portion 498 while an opposing distal end of the horizontal portion 500 includes a curved extension 502. The curved extension 502 bends downward and away from the vertical portion 498. The vertical portion 498 includes a perpendicular protrusion 504 extending from an inner surface 506. The horizontal portion 500 includes a perpendicular protrusion 508 extending from an inner surface 510. In some embodiments, the perpendicular protrusion 508 can be located at the distal end of the horizontal portion 500. The perpendicular protrusions 504, 508 form a channel 512 therebetween.

The channel 512 can be configured and dimensioned to receive the bottom edge 464 of the canister body 440. In some embodiments, the perpendicular protrusions 504, 508 create a friction fit between the gasket 442 and the canister body 440, thereby ensuring continued attachment of the gasket 442 relative to the canister body 440. The radius 514 of curvature of the curved extension 502 can be selected to be substantially complementary to the upwardly angled side walls 484 of the large debris container 444. Thus, when the large debris container 444 is positioned in a closed position, the gasket 442 can mate against the upwardly angled side walls 484 of the large debris container 444 to create a water-tight seal between the large debris container 444 and the canister body 440.

The debris separator ring 438 can be in the form of a cylindrical mesh ring including a central opening 490, and defining an outer circumferential edge 492 and an inner circumferential edge 494. The outer circumferential edge 492 can define a cross-sectional width dimensioned smaller than a cross-sectional width of the inner circumferential edge 494. In some embodiments, the cross-sectional width can gradually taper and increase in dimension from the outer circumferential edge 492 to the inner circumferential edge 494. A portion of the debris separator ring 438 extending radially from the outer circumferential edge 492 towards the inner circumferential edge 494 can include a plurality of radial apertures 496 (e.g., one or more rows of apertures 496) formed therein. In some embodiments, the apertures 496 can extend substantially halfway from the outer circumferential edge 492 to the inner circumferential edge 494.

Figure 25:
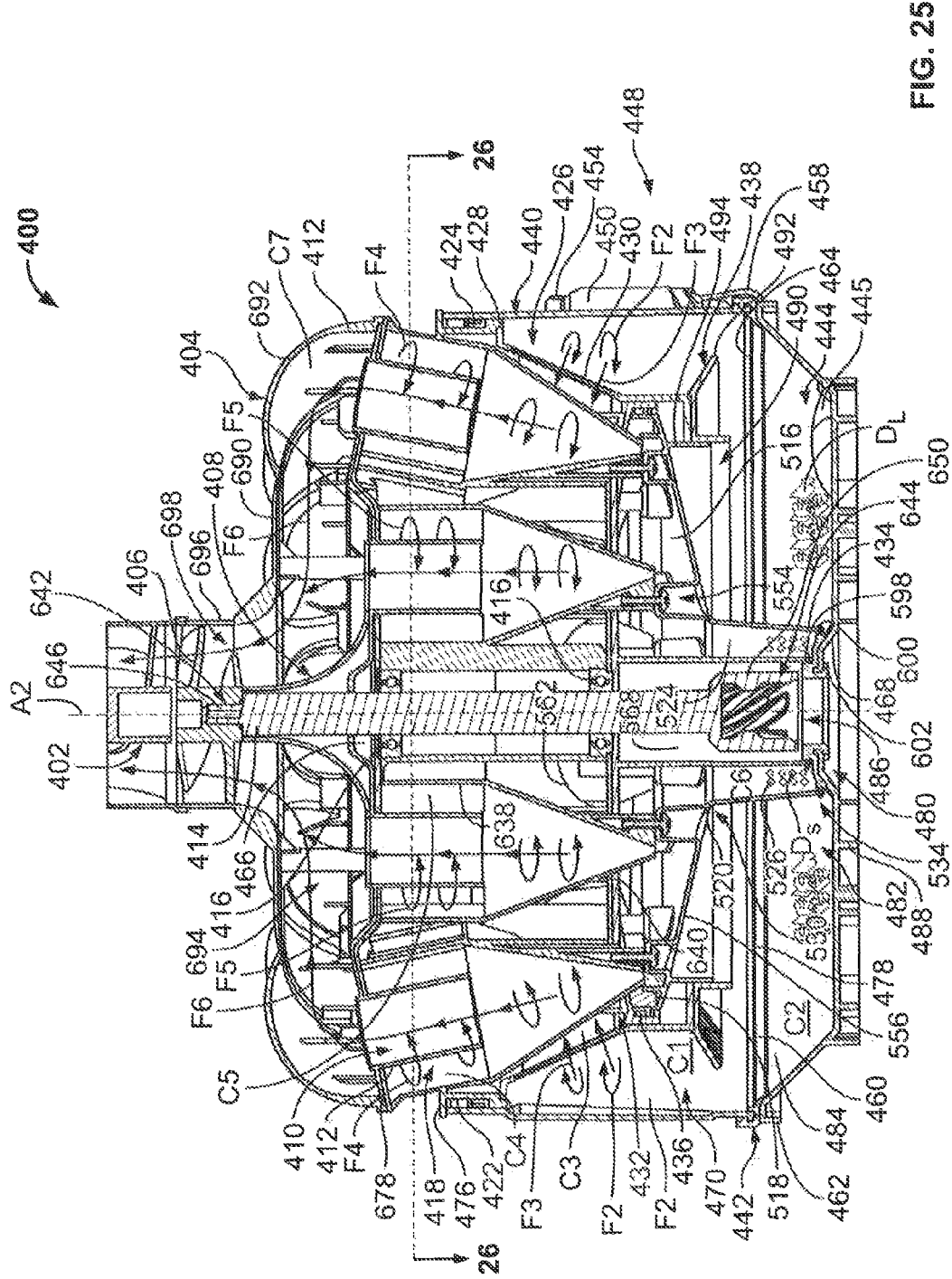
FIG. 25 is a sectional view of the hydrocyclonic particle separator assembly taken along line A-A of FIG. 21.
Figure 26:
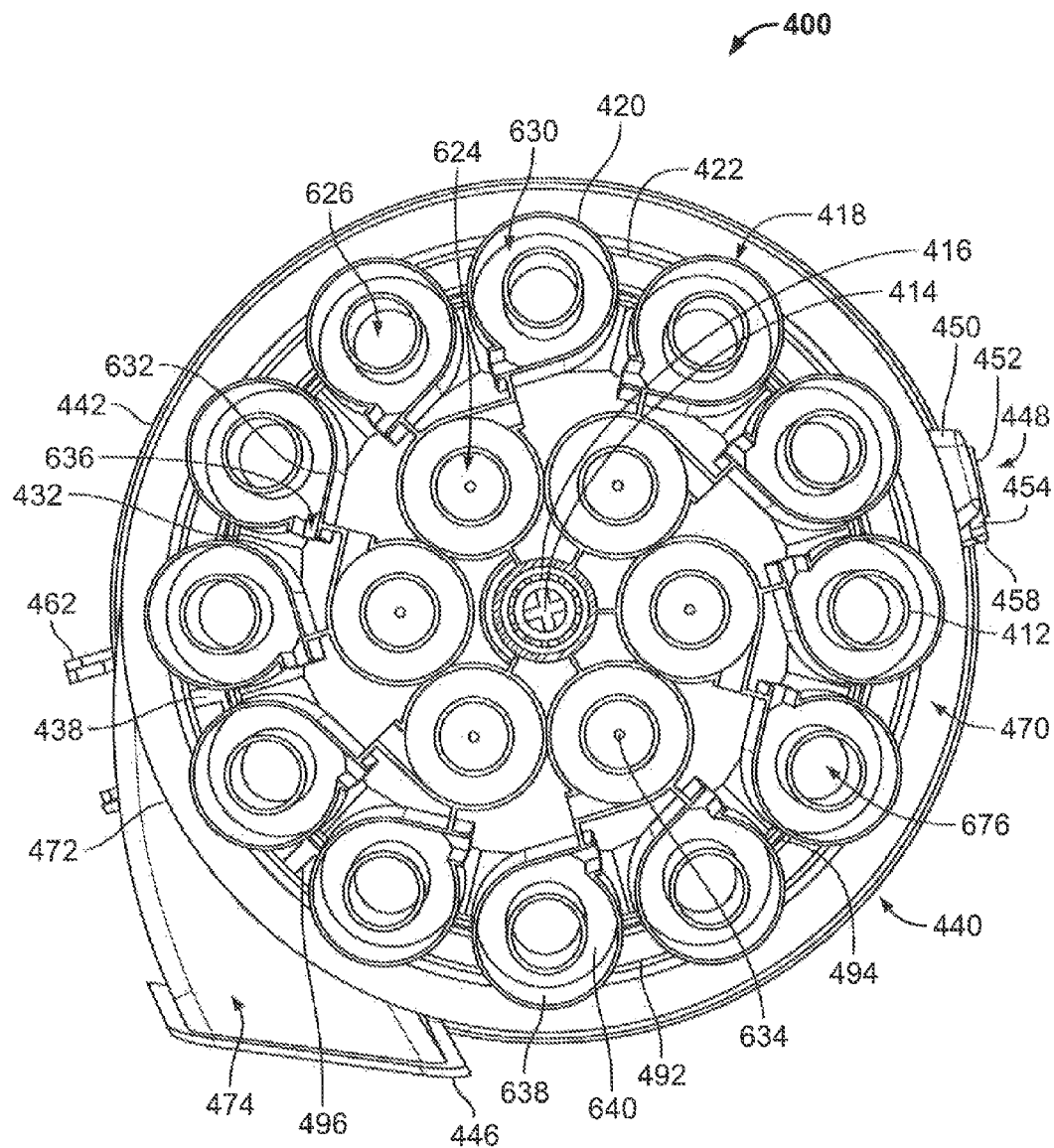
FIG. 26 is a sectional view of the hydrocyclonic particle separator assembly taken along line 26-26 of FIG. 25.
Figure 27:
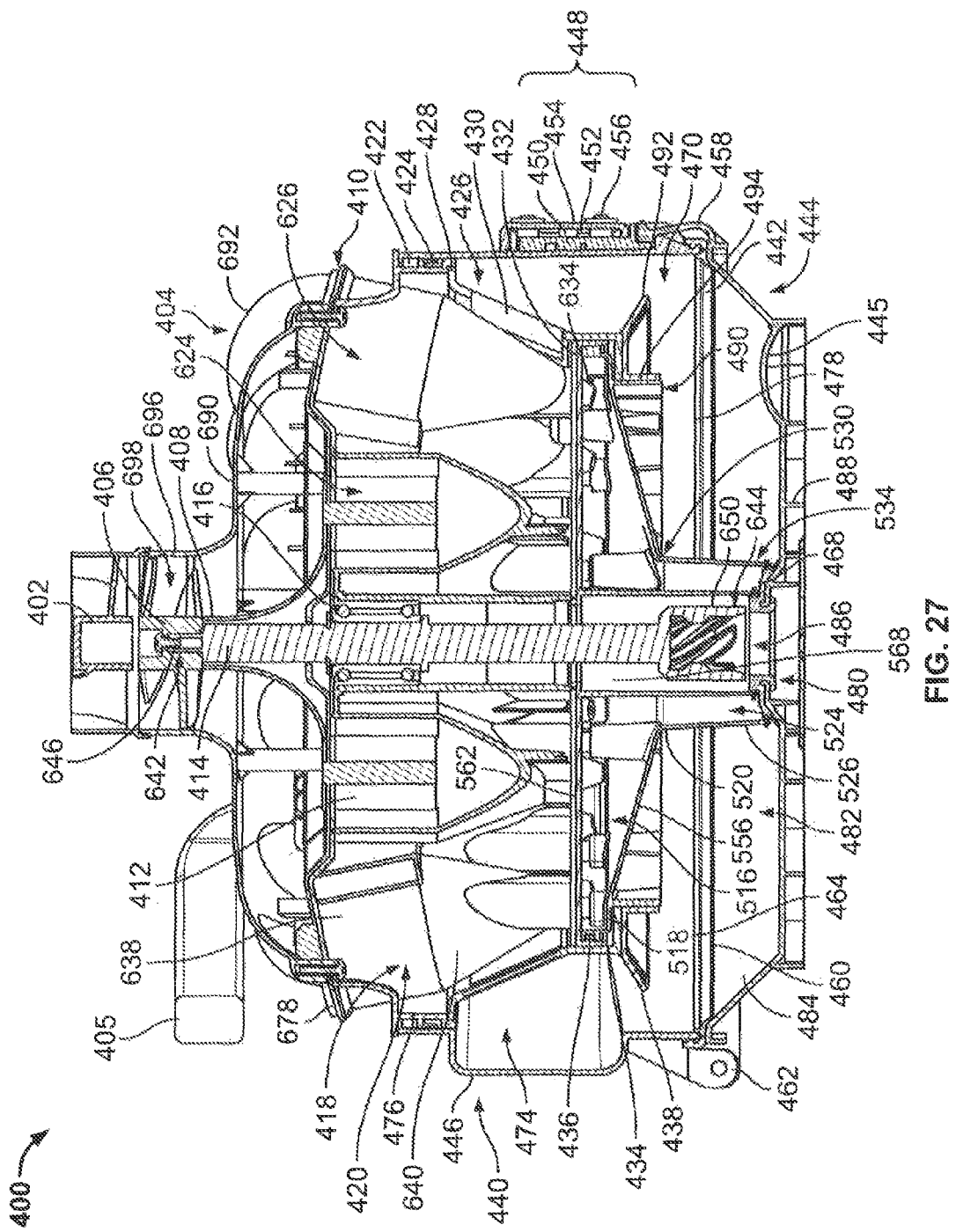
FIG. 27 is a sectional view of the hydrocyclonic particle separator assembly taken along line A-A of FIG. 21 with a canister bottom in a closed configuration.
Figure 28:
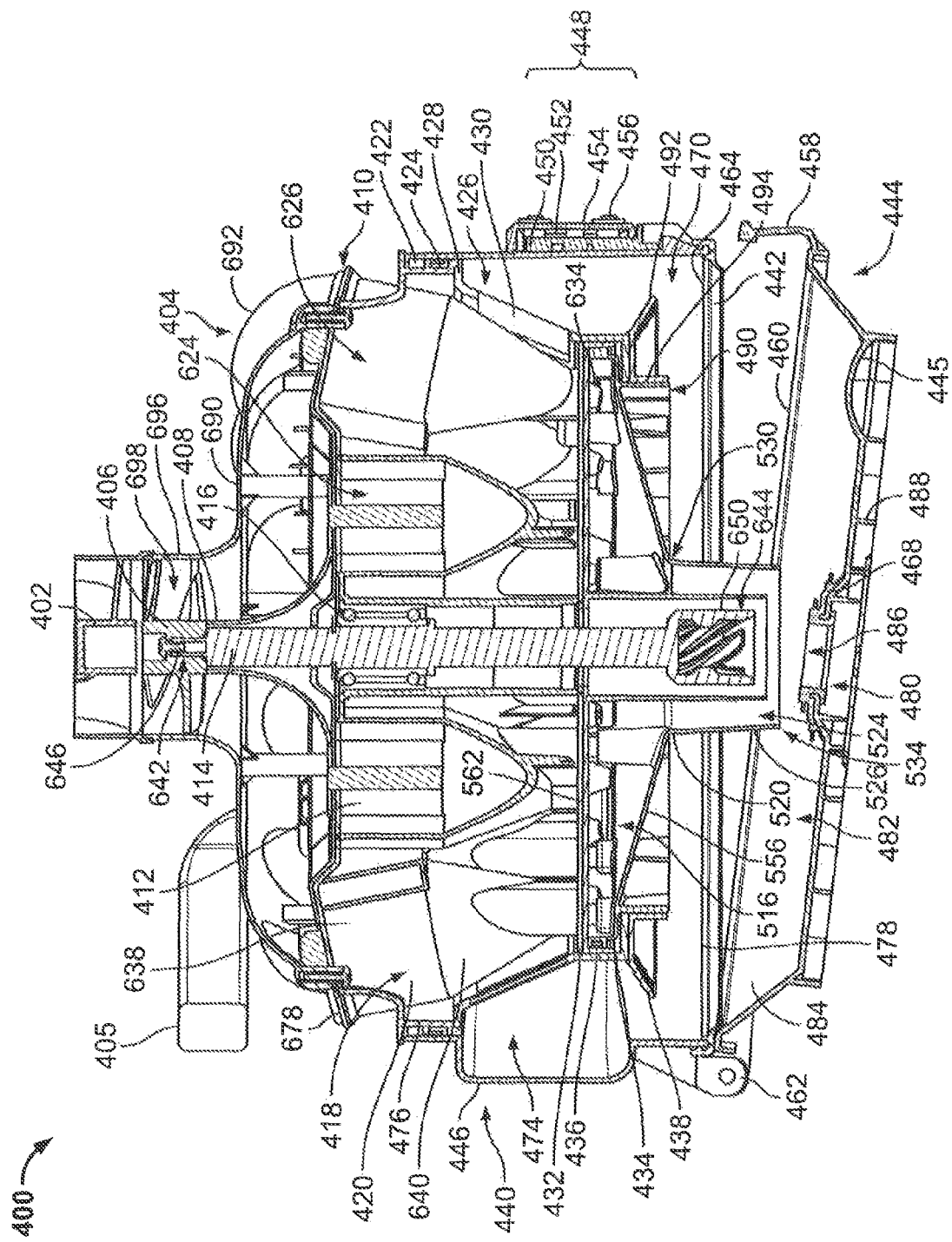
FIG. 28 is a sectional view of the hydrocyclonic particle separator assembly taken along line A-A of FIG. 21 with the canister bottom in an open configuration.

In the assembled configuration of the hydrocyclonic particle separator assembly 400, the debris separator ring 438 can be disposed spaced upward relative to the bottom edge 464 of the canister body and, therefore, spaced upward relative to the large debris container 444 (see, e.g., FIG. 25). The diameter of the outer circumferential edge 492 of the debris separator ring 438 is dimensioned smaller than the diameter of the canister body 440 and the top edge 460 of the large debris container 444. Therefore, during cyclonic separation of the fluid, large debris can pass between the outer circumferential edge 438 and the inner surface of the canister body 440, and further can be collected in the large debris container 444. The apertures 496 in the debris separator ring 438 allow fluid to travel therethrough, thereby not completely isolating the large debris container 444 from the fluid flow, while preventing the large debris from being removed from the large debris container 444 by the fluid flow. In particular, the debris separator ring 438 acts as a barrier for large debris, prevents the large debris collected in the large debris container 444 from reentering the fluid flow, and maintains the large debris collected in the large debris container 444.

Figure 33:
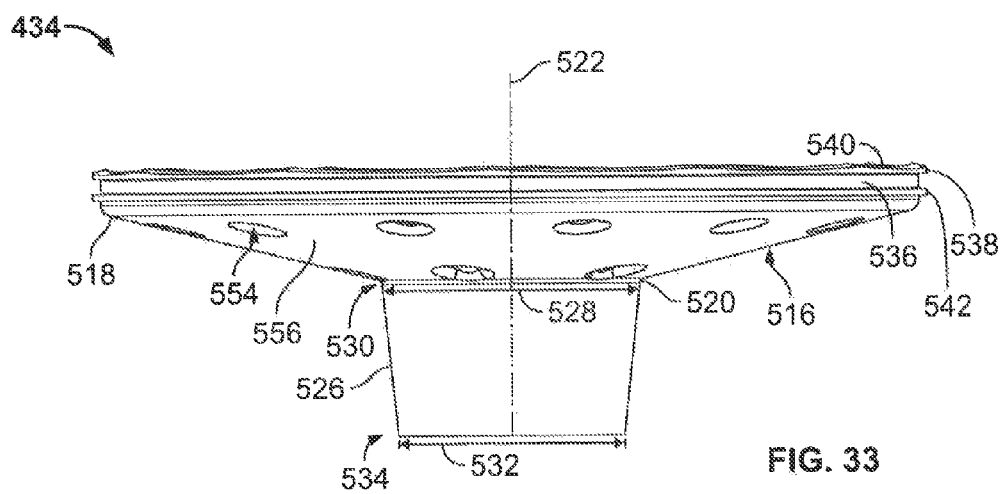
FIG. 33 is a side view of a fine debris container of the hydrocyclonic particle separator assembly of FIG. 20.
Figure 34:
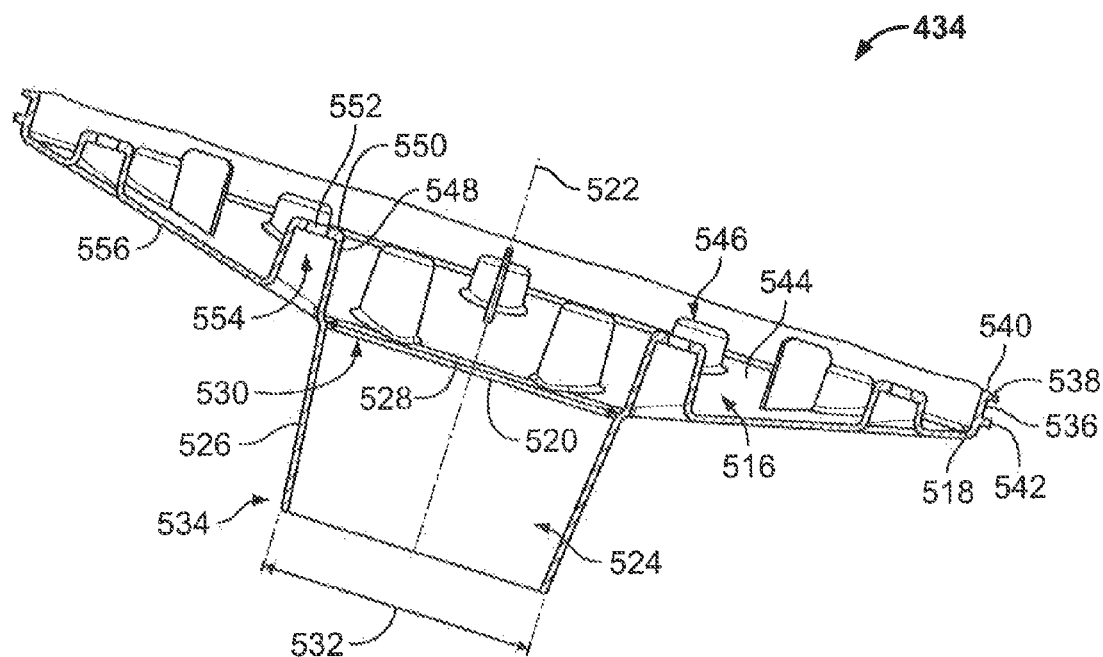
FIG. 34 is a sectional view of the fine debris container of FIG. 33.

With additional reference to FIGS. 33 and 34, side and sectional views of the fine debris container 434 are provided. The fine debris container 434 includes a dish 516 with an outer perimeter 518 and an inner perimeter 520, the surface of the dish 516 sloping downwardly towards a central vertical axis 522. The fine debris container 434 includes a central opening 524 formed at the inner perimeter 520. The central opening 524 extends through a central radial extension 526. The central opening 524 defines a first diameter 528 at or near a proximal end 530 of the central radial extension 526 and defines a second diameter 532 at a distal end 534 of the central radial extension 526. The radial wall of the central radial extension 526 can taper in the direction of the central vertical axis 522 such that the first diameter 528 is dimensioned greater than the second diameter 532. The tapered radial wall of the central radial extension 526 assists in transfer of fine debris from the dish 516 to an area near the distal end 534 of the central radial extension 526.

The fine debris container 434 includes a vertical circumferential flange 536 extending from the outer perimeter 518 of the dish 516. The vertical circumferential flange 536 includes a first horizontal lip 538 extending perpendicularly from a top surface 540 of the vertical circumferential flange 536. The vertical circumferential flange 536 includes a second horizontal lip 542 extending parallel to the first horizontal lip 538 and disposed between the first horizontal lip 538 and the outer perimeter 518. During assembly, the O-ring 436 can be positioned between the first and second horizontal lips 538, 542 to maintain a water-tight seal between the fine debris container 434 and the fine debris container top 432.

The inner surface 544 of the dish 516 includes a plurality of upwardly extending bulbs 546. The bulbs 546 can be radially formed on the inner surface 544. In some embodiments, the fine debris container 434 includes a first row of bulbs 546 radially disposed relative to the central vertical axis 522 near the outer perimeter 518 of the dish 516, and further includes a second row of bulbs 546 radially disposed relative to the central vertical axis 522 near the inner perimeter 520 of the dish 516. Each of the bulbs 546 near the outer perimeter 518 can define a first height relative to the inner surface 544, and each of the bulbs 546 near the inner perimeter 520 can define a second height relative to the inner surface 544, the first height being dimensioned smaller than the second height. Each of the bulbs 546 includes a radial wall 548, a top surface 550 and an opening 552 formed in the top surface 550. Each of the bulbs 546 further includes a cavity 554 formed within the radial wall 548 and connected with the opening 552, the cavity 554 extending to the outer surface 556 of dish 516.

Figure 35:
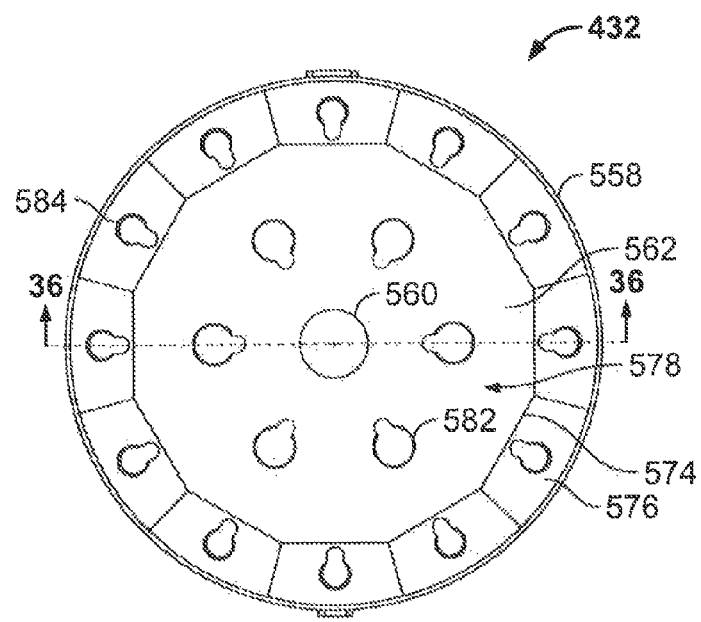
FIG. 35 is a top view of a fine debris container top of the hydrocyclonic particle separator assembly of FIG. 20.
Figure 36:
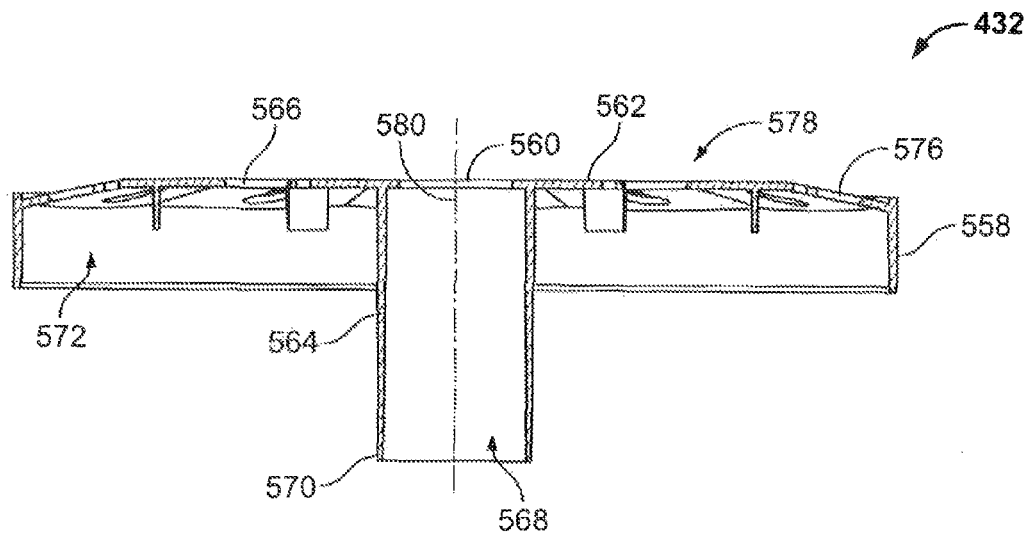
FIG. 36 is a sectional view of the fine debris container top taken along line 36-36 of FIG. 35.

With additional reference to FIGS. 35 and 36, top and sectional views of the fine debris container top 432 are provided. The fine debris container top 432 defines a substantially circular outer perimeter wall 558 and a central opening 560 formed in the top surface 562. The fine debris container top 432 includes a central radial extension 564 protruding from an inner surface 566 of the fine debris container top 432. The central radial extension 564 includes an interior cavity 568 that connects with the central opening 560. The radial wall of the central radial extension 564 can taper gradually such that the thickness of the radial wall is greater near the inner surface 566 than the thickness of the radial wall at a distal end 570 of the central radial extension 564.

The outer perimeter wall 558 can extend downwardly from the top surface 562 to form an enclosed cavity 572 between the outer perimeter wall 558 and the central radial extension 564. The top surface 562 includes a circumferential polygonal edge 574 from which a plurality of plates 576 extend. The plates 576 can be angled downwardly relative to a central portion 578 of the top surface 562 (and a central vertical axis 580) and form the perimeter of the fine debris container top 432. The central portion 578 of the top surface 562 includes a plurality of radial openings 582 formed therein and circumferentially disposed relative to the central vertical axis 580. Each of the plates 576 includes an opening 584 formed therein. The openings 582, 584 can be configured and dimensioned to receive the distal ends of the respective cyclone containers 420.

With reference to FIG. 25, during assembly, the central radial extension 564 of the fine debris container top 432 can be positioned concentrically within the central radial extension 526 of the fine debris container 434. The distal end 570 of the central radial extension 564 and the distal end 534 of the central radial extension 526 can be positioned against the gasket 468 of the large debris container 444 to create a water-tight seal therebetween. As will be discussed in greater detail below, fine debris filtered from the fluid flow during a second cyclonic filtering stage can be deposited in the cavity or chamber formed between the central radial extensions 526, 564 and the gasket 468.

As shown in FIG. 25, the gasket 468 can include first and second radial extensions 598, 600. The first radial extension 598 can seal against the distal end 570 of the central radial extension 564 of the fine debris container top 432. The second radial extension 600 can be positioned against the central hub 480 of the large debris container 444 and seals against the distal end 534 of the central radial extension 526 of the fine debris container 434. The gasket 468 further includes a lower hook section 602 that fits within and hooks around the edge of the top opening 486 of the central hub 480, thereby fixating the gasket 468 to the central hub 480. The gasket 468 thereby forms a water-tight seal between the large debris container 444, the fine debris container 434 and the fine debris container top 432.

It should be understood that when the large debris container 444 is unlatched from the canister body 440 and is in the open position, large debris from the large debris container 444 and fine debris from the cavity or chamber formed between the central radial extensions 526, 564 can be simultaneously emptied. In particular, opening the large debris container 444 releases the seal formed between the gasket 468 and the distal ends 534, 570 of the central radial extensions 526, 564, allowing the fine debris to be simultaneously emptied from the canister body 440.

Figure 37:
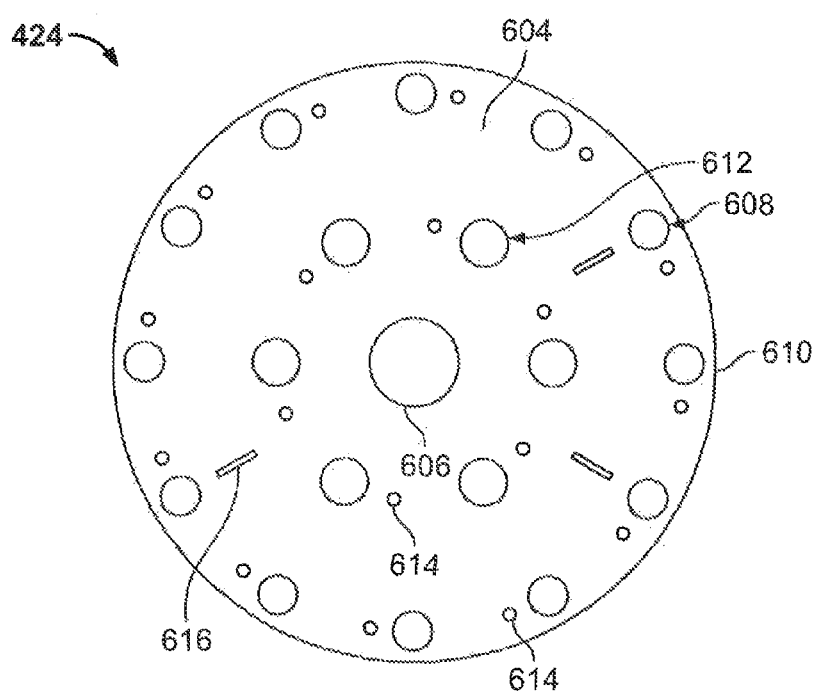
FIG. 37 is a top view of a second gasket of the hydrocyclonic particle separator assembly of FIG. 20.

With additional reference to FIG. 37, a top view of the second gasket 424 is provided. The second gasket 424 can be disposed over the fine debris container top 432. The gasket body 604 of the second gasket 424 can define a substantially planar and disc-like configuration. The gasket body 604 includes a central opening 606, a first set of radial openings 608 spaced from a perimeter edge 610, and a second set of radial openings 612 between the central opening 606 and the first set of radial openings 608. The position of the first and second set of radial openings 608, 612 can correspond to the position of the radial openings 582, 584 of the fine debris container top 432. Each of the openings 608, 612 of the first and second set of radial openings 608, 612 includes a smaller sized opening 614 formed adjacent thereto. In some embodiments, the gasket body 604 can include one or more radial slots 616 aligned with corresponding openings 608 of the first set of radial openings 608.

As noted above, the filtering assembly 426 includes the filtering medium support 428 and the filtering medium 430. The filtering medium support 428 includes a support body 586 defining a frustoconical configuration. The support body 586 includes a top circumferential frame 588 and a bottom circumferential frame 590. A diameter of the top circumferential frame 588 can be dimensioned greater than a diameter of the bottom circumferential frame 590. The support body 586 further includes a plurality of windows 592 formed between the top and bottom circumferential frames 588, 590. In some embodiments, the windows 592 can be dimensioned substantially similarly relative to each other. In some embodiments, one section of the support body 586 can include a plurality of vertical slit windows 594 that are dimensioned smaller than the windows 592. During assembly, the vertical slit windows 594 can be positioned to face the tangential outlet 472 of the canister body 440. The vertical slit windows 594 provide structural support to the filtering assembly 426 against fluid flow entering the canister body 440 through the tangential outlet 472. In some embodiments, the support body 586 can include a circumferential wall 596 extending downwardly from the bottom circumferential frame 590. The diameter of the circumferential wall 596 can be dimensioned such that during assembly, the circumferential wall 596 mates with the debris separator ring 438.

The filtering medium 430 (e.g., a mesh, filter, polymesh, or the like) can be received by the support body 586 such that the filtering medium 430 covers each of the windows 492 and the vertical slit windows 594. In particular, the filtering medium 430 extends the perimeter wall of the filtering assembly 426. As will be discussed in greater detail below, in a first cyclonic separation stage, the filtering assembly 426 can filter out a first debris size, e.g., large debris, from the fluid flow with the large debris dropping into the large debris container 444. In particular, the large debris contacts the filtering medium 430, or the interior wall of the canister body 440, and is knocked down out of the fluid flow and does not enter the interior of the filtering assembly 426. The fluid flow with at least some fine debris can continue through the filtering assembly 426 and into the cyclone block 418.

Figure 38:
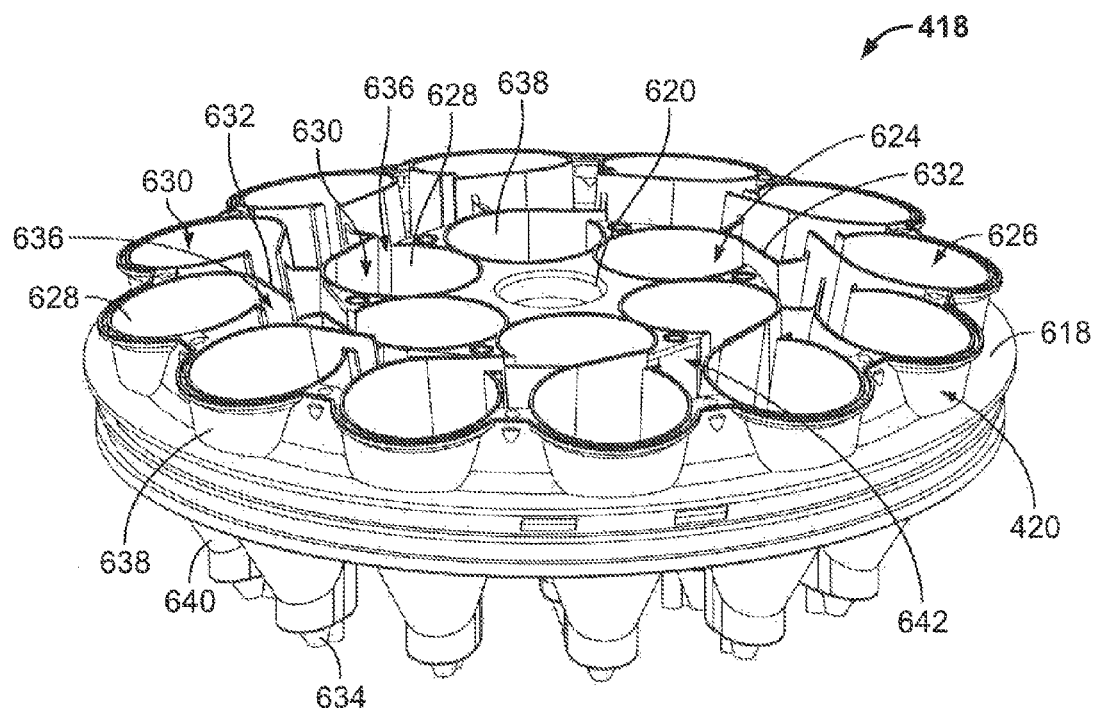
FIG. 38 is a perspective view of a cyclone block of the hydrocyclonic particle separator assembly of FIG. 20.
Figure 39:
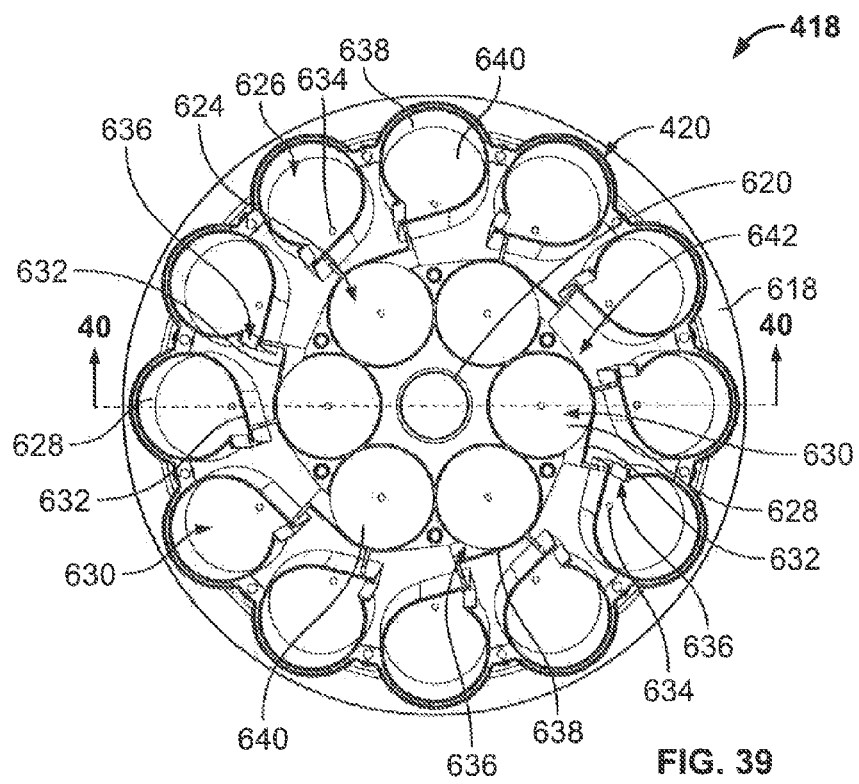
FIG. 39 is a top view of a cyclone block of the hydrocyclonic particle separator assembly of FIG. 20.
Figure 40:
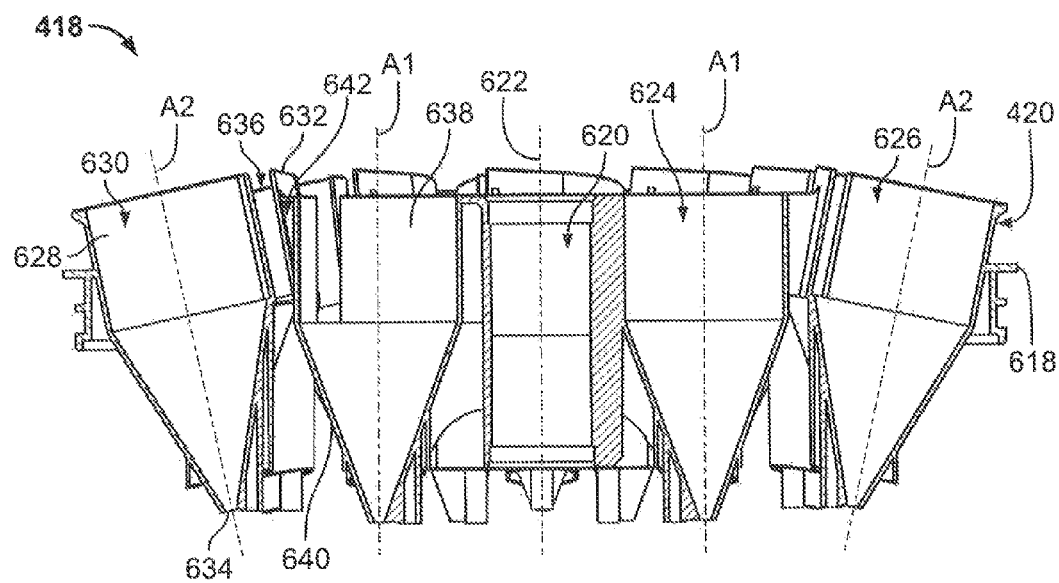
FIG. 40 is a sectional view of the cyclone block taken along line 40-40 of FIG. 39.

With additional reference to FIGS. 38-40, the cyclone block 418 includes a cyclone block body 618 in the form of a cylindrical disc with a central opening 620 formed in the cyclone block body 618. The first gasket 422 can be disposed within grooves on an outer surface of the cyclone block body 618. In some embodiments, the first gasket 422 can define a U-shaped cross-section. The cyclone block body 618 includes a plurality of individual cyclone containers 420 radially disposed relative to a central vertical axis 622. In particular, the cyclone block 418 includes a first set of cyclone containers 624 radially disposed around the central opening 620 and a second set of cyclone containers 626 radially disposed around the first set of cyclone containers 624.

Each of the cyclone containers 420 of the first set of cyclone containers 624 can extend substantially parallel to the central vertical axis 622. Each of the cyclone containers 420 of the second set of cyclone containers 626 can extend in an angled manner relative to the central vertical axis 622 (e.g., angled with a bottom of the cyclone container 626 in the direction of the central vertical axis 622). In particular, a central axis A1 of each of the cyclone containers 420 of the first set of cyclone containers 624 can be substantially parallel to the central vertical axis 622, while a central axis A2 of each of the cyclone containers 420 of the second set of cyclone containers 626 can be angled relative to the central vertical axis 622. In particular, a cylindrical top portion 638 of each of the second set of cyclone containers 626 can be disposed further from the central vertical axis 622 than a debris underflow nozzle 634.

It should be understood that the description of a single cyclone container 420 holds true for all of the cyclone containers 420 that make up the ring of cyclone containers 420 (i.e., the cyclone block 418), unless noted otherwise. Each cyclone container 420 includes a circular tapered container body 628 that defines a cyclone chamber 630 and includes an overflow opening 632, a debris underflow nozzle 634, and a tangential inlet 636 generally positioned on a radially inward portion of each cyclone container 420. Each cyclone container 420 generally includes a cylindrical top portion 638 and a frustoconical bottom portion 640 that tapers downward to the debris underflow nozzle 634. The frustoconical bottom portion 640 aids in maintaining a centrifugal acceleration of the fluid flow as the fluid travels downward along the interior of the frustoconical bottom portion 640 in the direction of the debris underflow nozzle 634. In some embodiments, the tangential inlet 636 of every other cyclone container 420 of the second set of cyclone containers 626 can be in fluid communication with the tangential inlet 636 of a respective cyclone container 420 of the first set of cyclone containers 624 via a passage 642. As will be discussed in greater detail below, fluid passing through the filtering assembly 426 enters the inner chamber 470 of the canister body 440 around the frustoconical bottom portions 640 of the cyclone containers 420 and travels upward into the respective tangential inlets 636 of the cyclone containers 420. Therefore, fluid enters each of the cyclone chambers 630 of the first and second set of cyclone containers 624, 626 substantially simultaneously and forms individual cyclones within the cyclone containers 420. A concentric, dual-cyclone configuration within the cyclone block 418 is thereby formed.

Each of the frustoconical bottom portions 640 can be configured and dimensioned to be partially received within the radial openings 582, 584 of the fine debris container top 432 such that fine debris filtered by the cyclone containers 420 falls through the debris underflow nozzle 634 and into the fine debris container 434. Thus, the fine debris container top 432 maintains the debris underflow nozzles 634 suspended over or spaced from the dish 516 of the fine debris container 434. Accordingly, debris falls out of the debris-laden water within each individual cyclone container 420, e.g., due to contact with the wall of the cyclone container body 628, and falls through the debris underflow nozzle 634 and into the fine debris container 434. During assembly, as shown in FIG. 25, the frustoconical bottom portions 640 of the cyclone containers 420 are positioned within and surrounded by the filtering assembly 426. Thus, the hydrocyclonic particle separator assembly 400 includes a dual cyclone system with the first cyclone occurring between the canister body 440 and the filtering assembly 426, and the second cyclones occurring in each of the cyclone containers 420.

The shaft 414 includes a proximal end 642 and a distal end 644. The proximal end 642 can include a tip 646 configured to mate with a complementary opening 648 of the impeller 406. Thus, rotation of the shaft 414 simultaneously drives rotation of the impeller 406. The tip 646 allows the impeller 406 to be removably attached to the shaft 414. The distal end 644 includes a female member 650 configured to mate with a male member of the third motor (e.g., a spline coupling, or the like). The third motor can thereby drive rotation of the shaft 414. The shaft 414 can pass through the central openings of the components of the hydrocyclonic particle separator assembly 400 with the distal end 644 being positioned over the central hub 480 of the large debris container 444. The male member of the third motor can pass through the opening 468 of the central hub 480 and engages the female member 650 to rotate the shaft 414 within the hydrocyclonic particle separator assembly 400.

Figure 41:
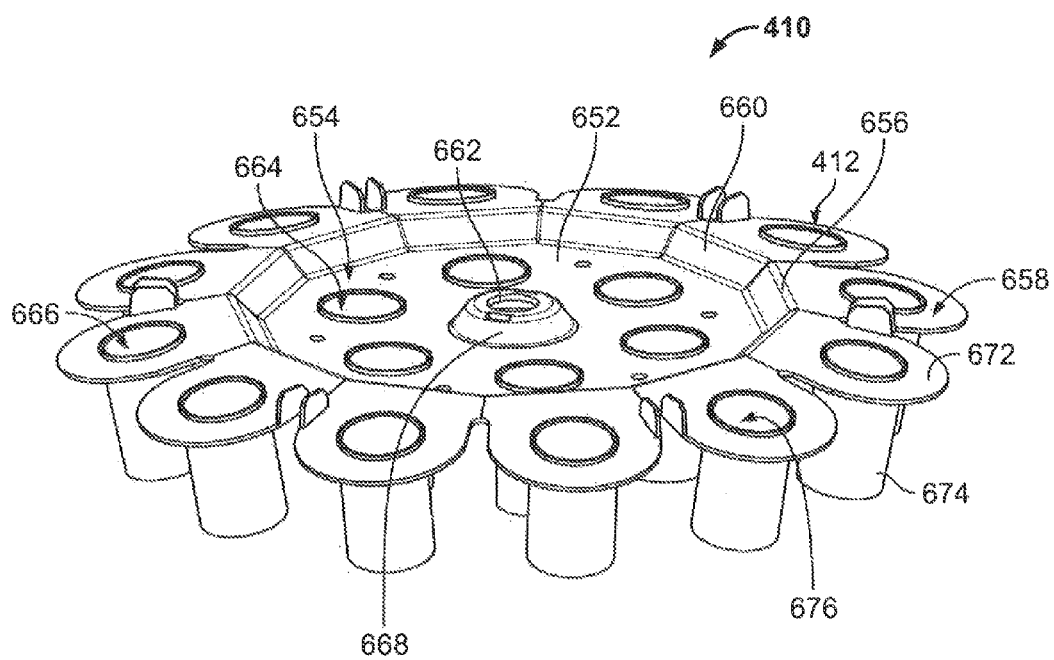
FIG. 41 is a perspective view of a ring of vortex finders of the hydrocyclonic particle separator assembly of FIG. 20.
Figure 42:
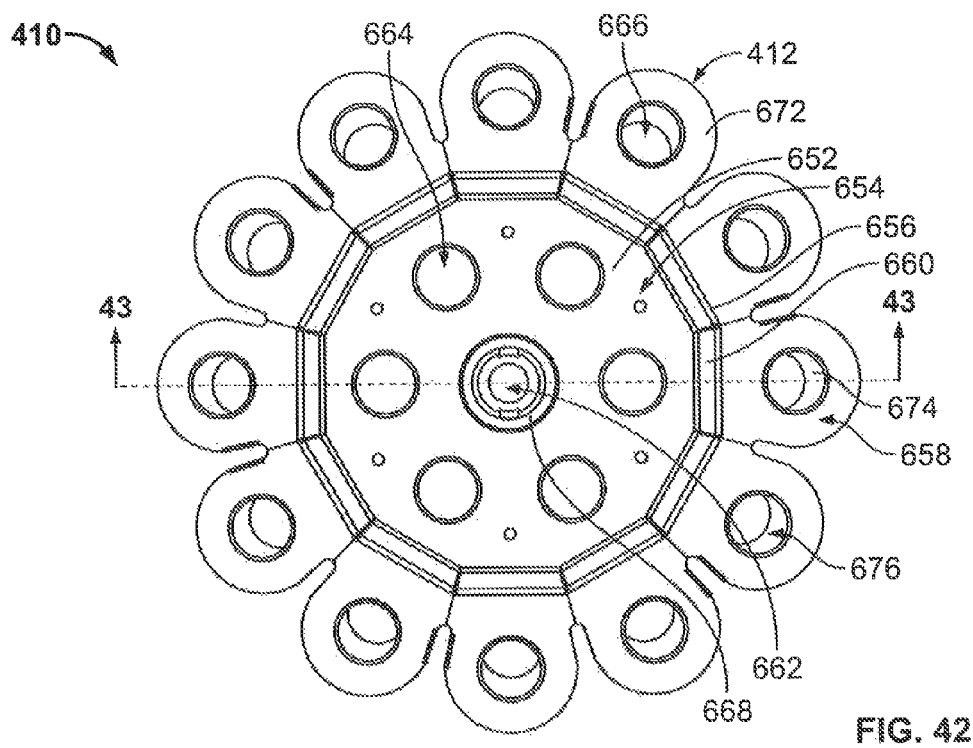
FIG. 42 is a top view of a ring of vortex finders of the hydrocyclonic particle separator assembly of FIG. 20.
Figure 43:
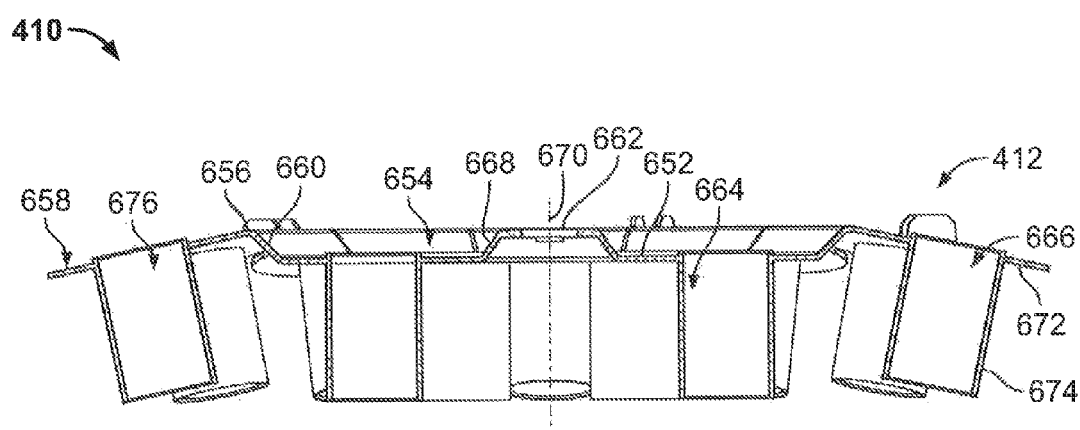
FIG. 43 is a sectional view of the ring of vortex finders taken along line 43-43 of FIG. 42.

With additional reference to FIGS. 41-43, perspective, top and sectional views of the ring 410 of vortex finders 412 are provided. The ring 410 includes a ring body 652 with a central portion 654 with a polygonal perimeter 656, and a plurality of perimeter flaps 658 extending from the polygonal perimeter 656. The central portion 654 can be recessed relative to the perimeter flaps 658, with respective angled wall sections 660 connecting the central portion 654 to the perimeter flaps 658.

The ring body 652 includes a central opening 662, a first set of vortex finders 664 radially disposed around the central opening 662, and a second set of vortex finders 666 radially disposed around the first set of vortex finders 664. The central opening 662 can be formed in a central hub 668 that is raised relative to the recessed central portion 654. Each of the vortex finders 412 of the first set of vortex finders 664 can extend substantially parallel to a central vertical axis 670. Each of the vortex finders 412 of the second set of vortex finders 666 can be angled relative to the central vertical axis 670. In particular, the angle of the second set of vortex finders 666 can be substantially equal to the angle of the cyclone containers 420 of the second set of cyclone containers 626. In some embodiments, the perimeter flaps 658 can be hingedly connected to the angled wall sections 660 such that the angle of each vortex finder 412 can be individually adjusted relative to the central vertical axis 670. During assembly, the vortex finders 412 of the first set of vortex finders 664 can be positioned at least partially into the cyclone containers 420 of the first set of cyclone containers 624, and the vortex finders 412 of the second set of vortex finders 666 can be positioned at least partially into the cyclone containers 420 of the second set of cyclone containers 626.

Each of the vortex finders 412 includes a planar top surface 672 and a cylindrical extension 674 protruding downwardly from the planar top surface 672. Each cylindrical extension 674 includes a uniform channel 676 passing therethrough. When positioned within the respective cyclone containers 420, the vortex finders 412 assist in generating a vortex within the cyclone containers 420 such that debris of a second size (e.g., fine debris) hits the inner walls of the cyclone container 420 and travels downwardly through the frustoconical bottom portion 640, through the debris underflow nozzle 634 and into the fine debris container 434.

Figure 44:
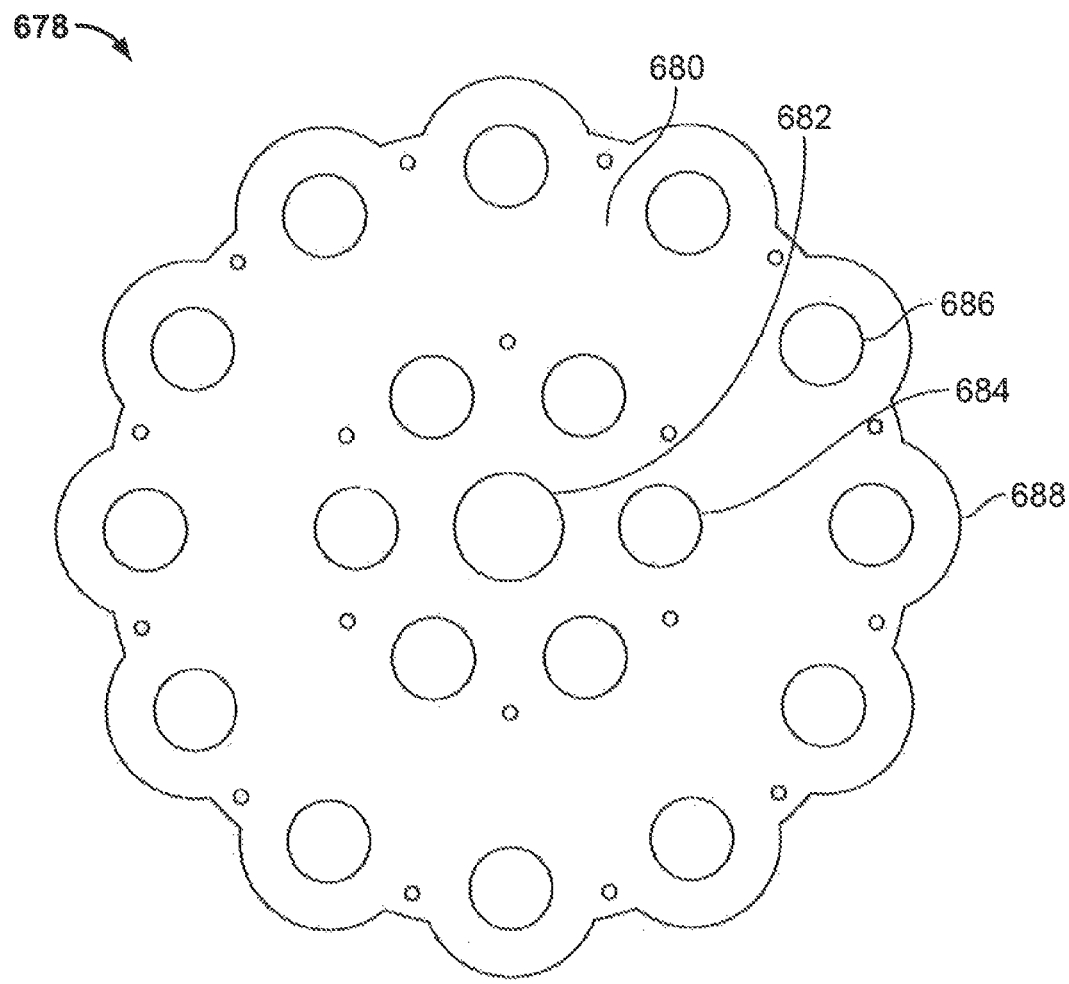
FIG. 44 is a top view of a vortex finder gasket of the hydrocyclonic particle separator assembly of FIG. 20.
Figure 45:
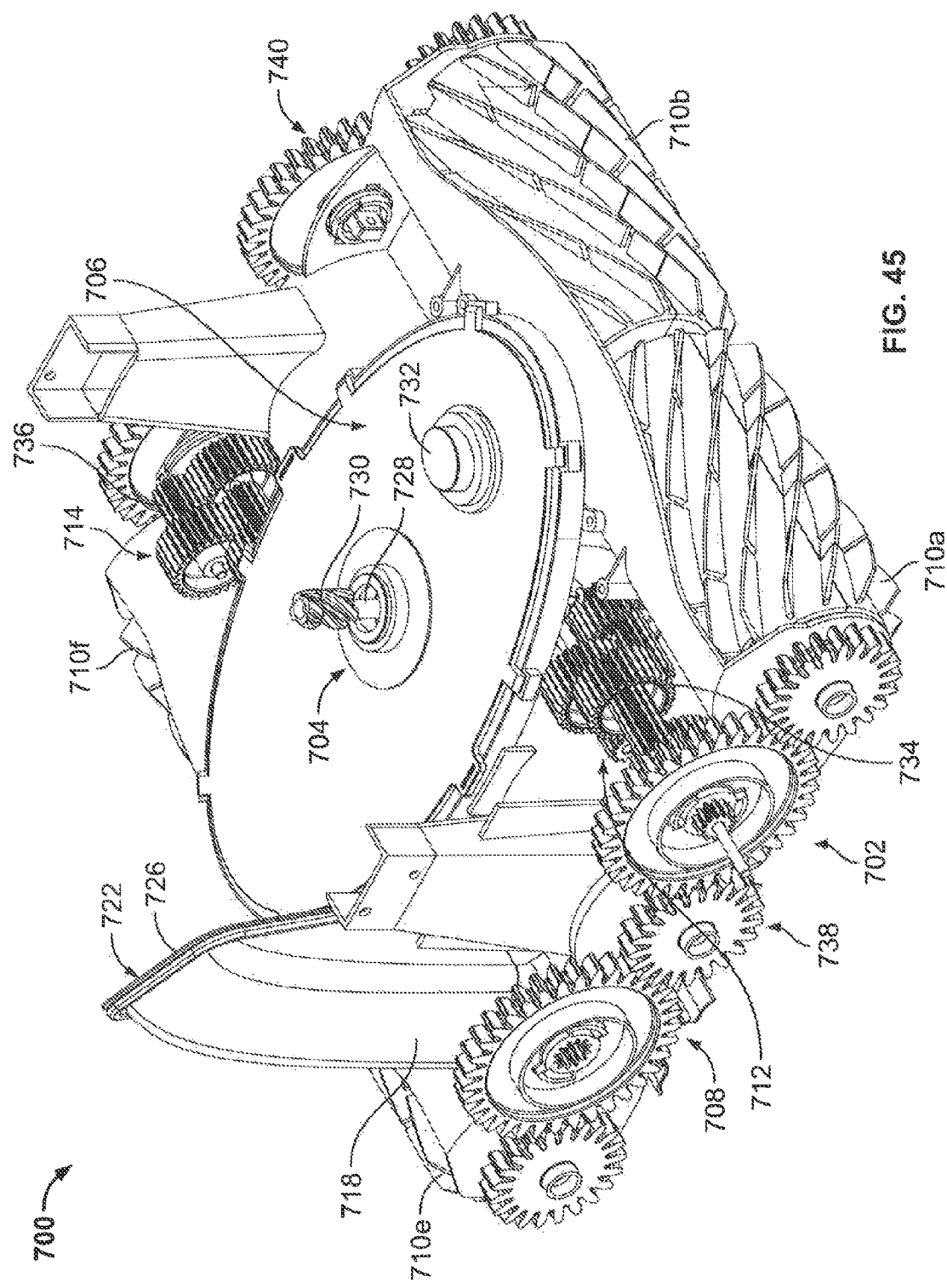
FIG. 45 is a perspective view of a second embodiment of a pool cleaner including a motor assembly and a drive assembly, an outer housing or skin of the pool cleaner having been removed for clarity.
Figure 46:
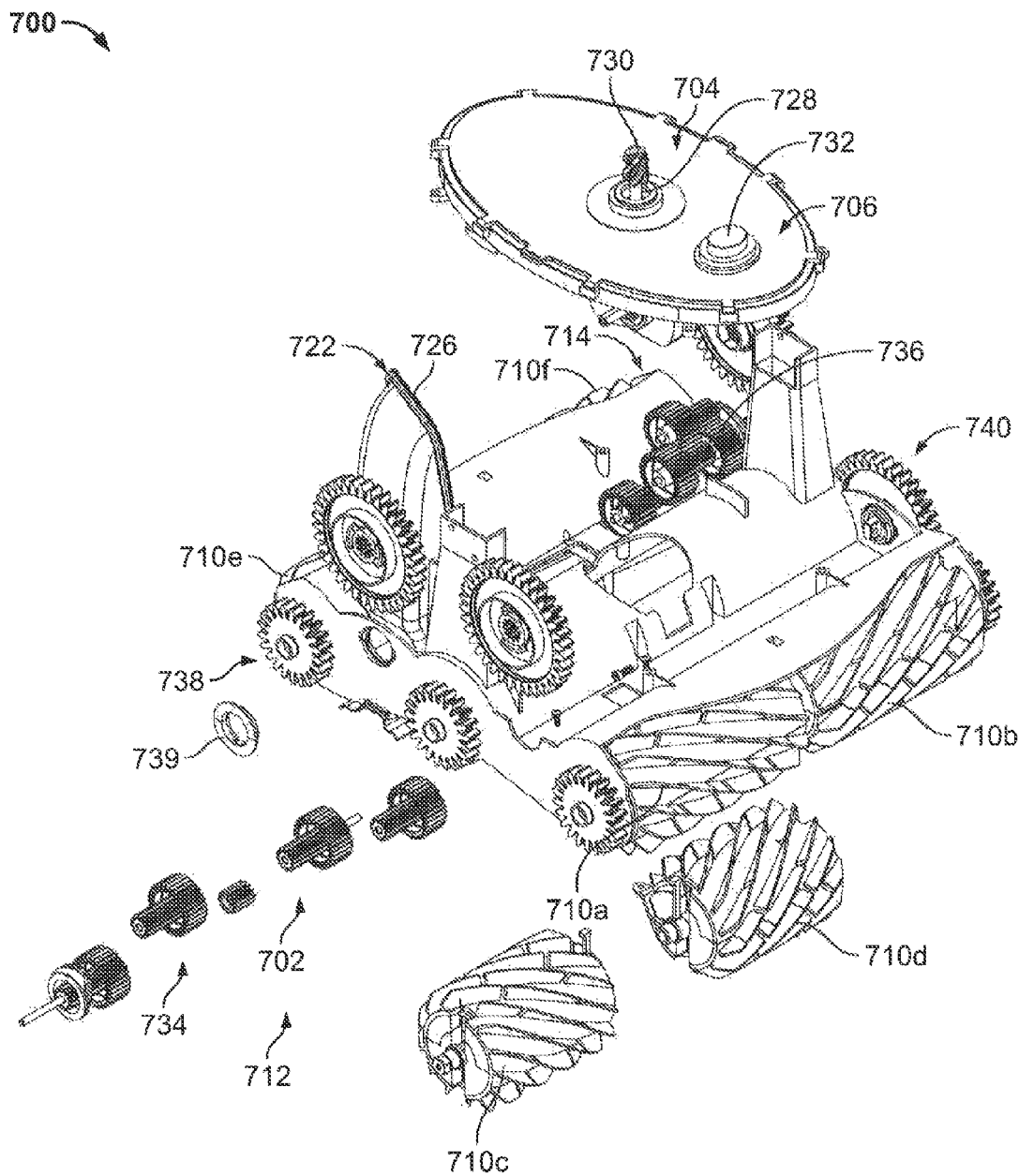
FIG. 46 is a perspective exploded view of the pool cleaner of FIG. 45.
Figure 47:
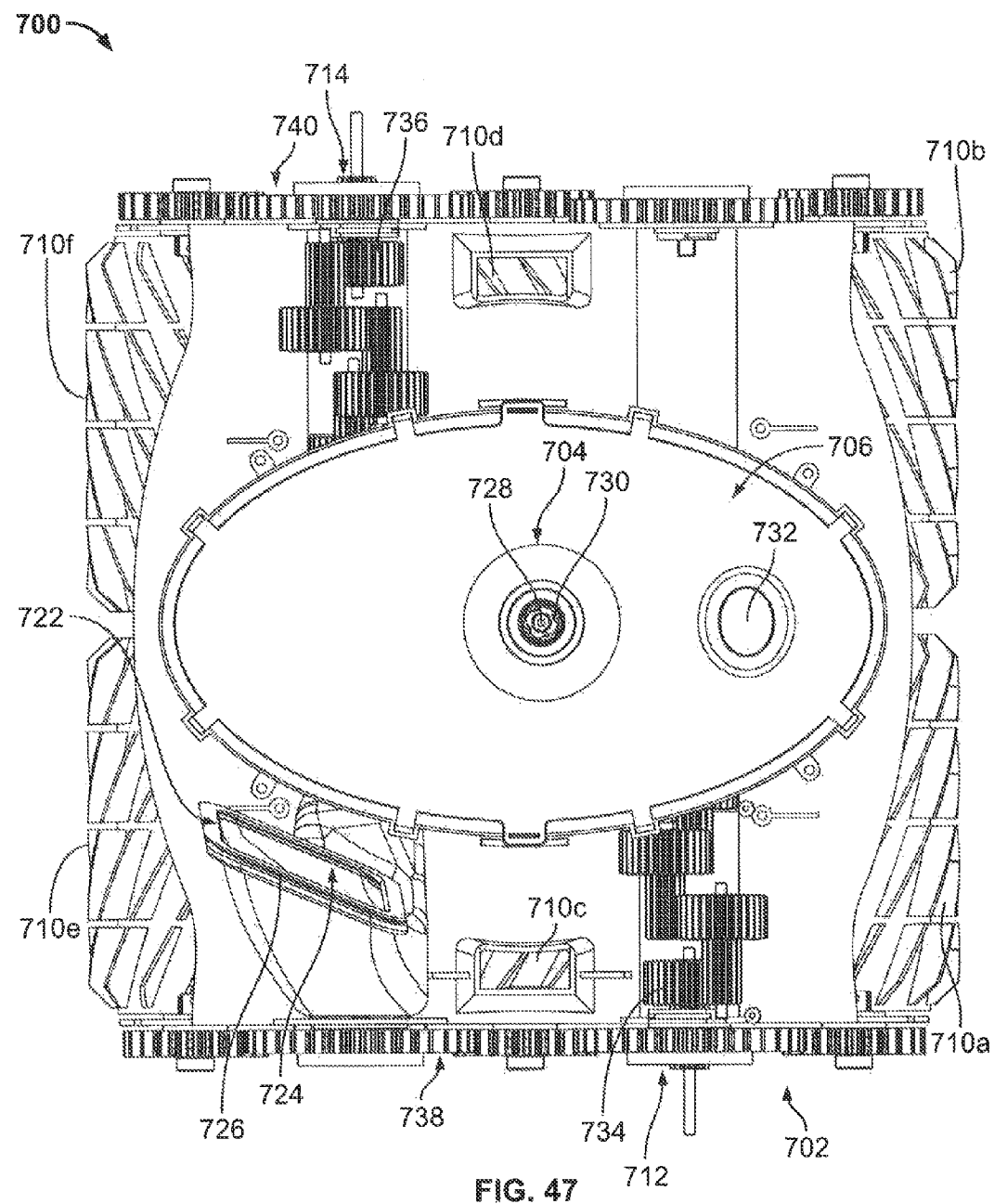
FIG. 47 is a top view of the pool cleaner of FIG. 45.
Figure 48:
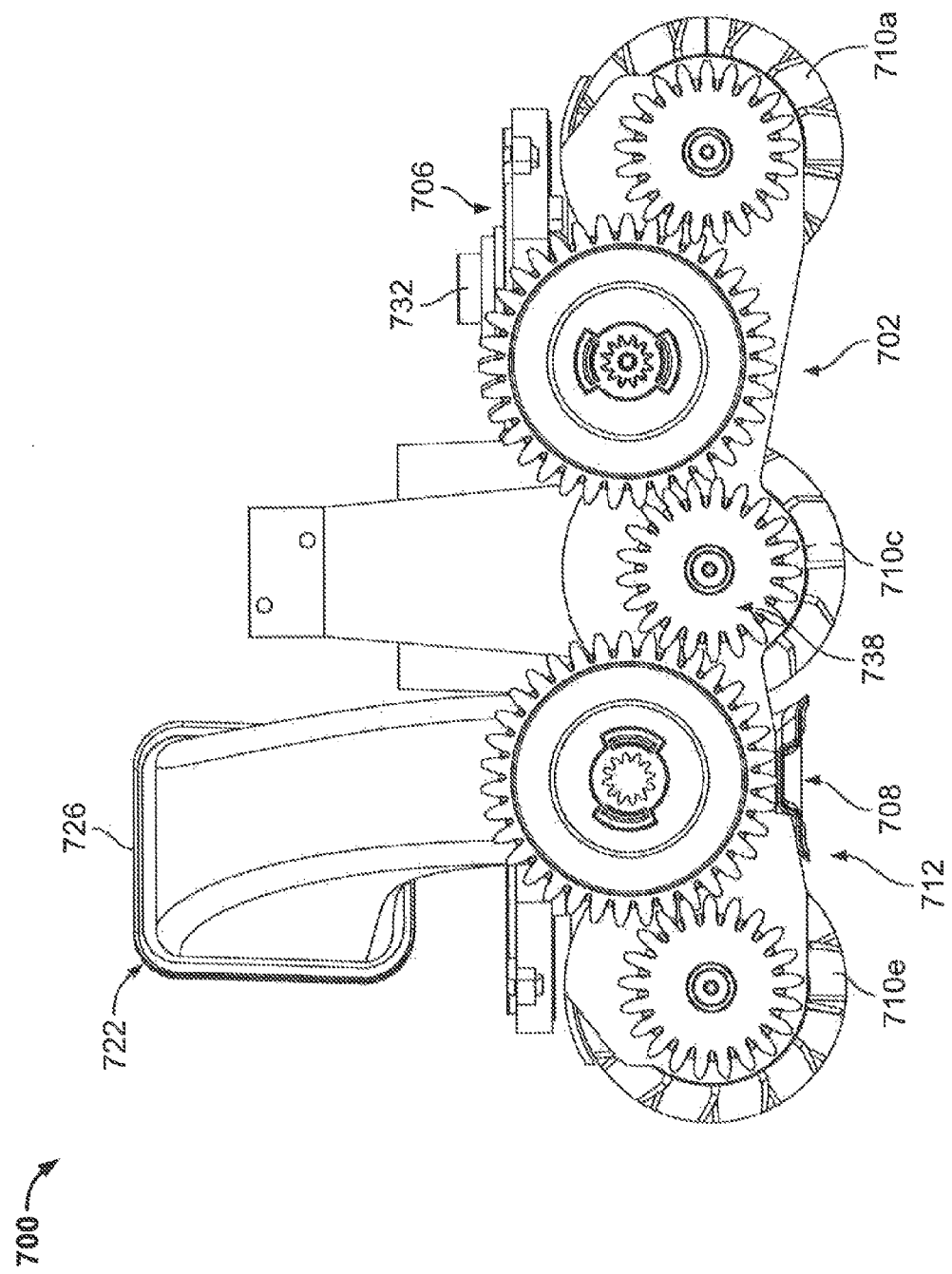
FIG. 48 is a side view of the pool cleaner of FIG. 45.
Figure 49:
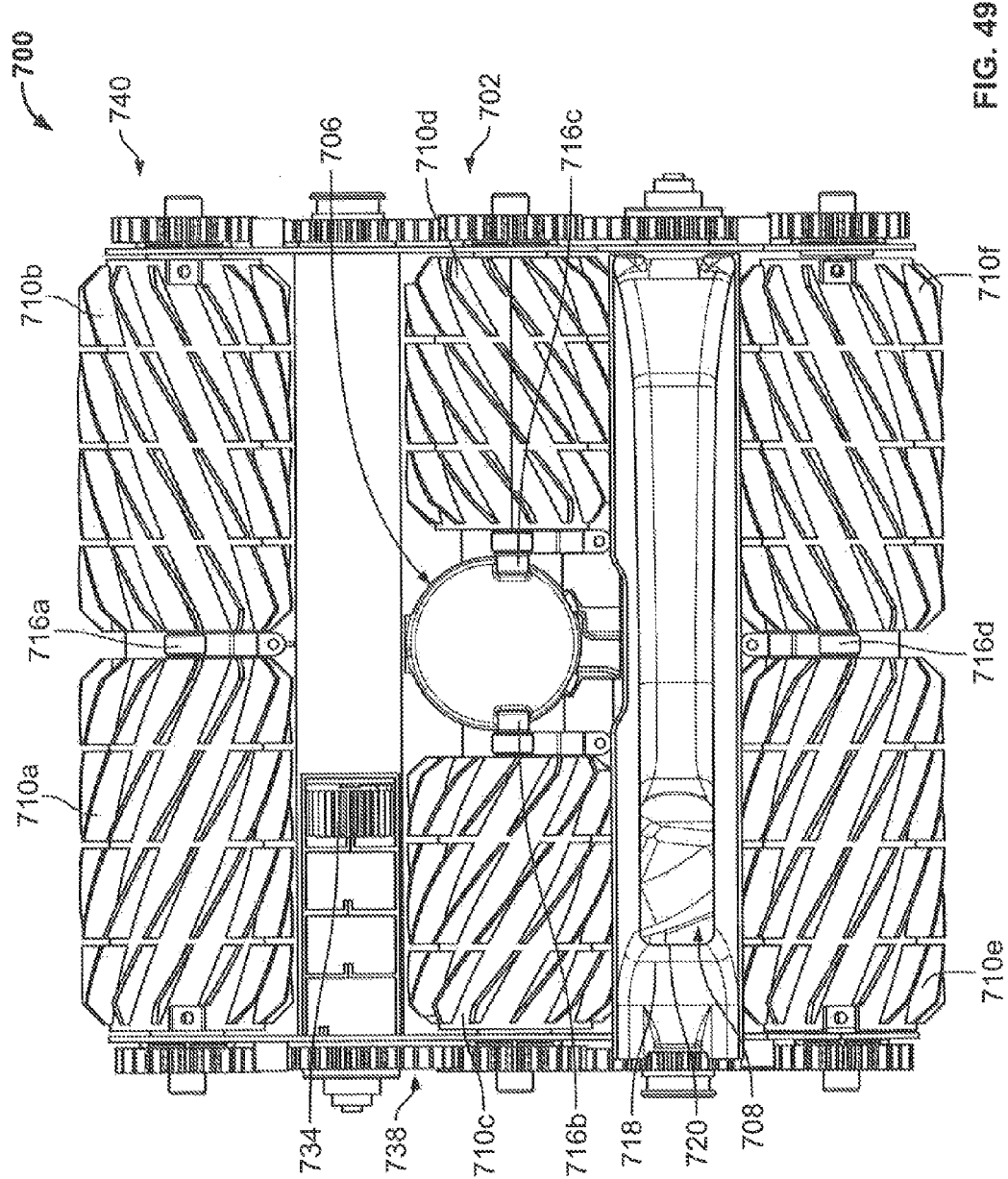
FIG. 49 is a bottom view of the pool cleaner of FIG. 45.

With additional reference to FIG. 44, a top view of the vortex finder gasket 678 is provided. The vortex finder gasket 678 can be substantially disc-shaped and includes a gasket body 680. The gasket body 680 includes a central opening 682, a first set of openings 684 radially disposed around the central opening 682, and a second set of openings 686 radially disposed around the first set of openings 684. The positions of the first and second set of openings 684 can correspond to the vortex finders 412 of the ring 410. During assembly, the respective vortex finders 412 can be inserted through the openings 684, 686 such that the vortex finder gasket 678 is disposed against the bottom surface of the ring body 652. The gasket body 680 includes a plurality of radial protrusions 688 adjacent to the second set of openings 684 that substantially match the configuration of the top surface 672 of the second set of vortex finders 666. The radial protrusions 688 define the perimeter edge of the vortex finder gasket 678.

The top cap 404 includes a top plate 690 with a plurality of rounded lobes 692 extending from the perimeter of the top plate 690. The number of rounded lobes 692 can equal the number of cyclone containers 420 in the second set of cyclone containers 624 and the number of vortex finders 412 in the second set of vortex finders 666. Each of the rounded lobes 692 extends through the top plate 690 and converges at a central cavity 694 within the top cap 404. The cavity 694 forms a tubular wall 696 defining an outlet 698 of the top cap 404. The tubular wall 696 can extend upwardly relative to the surface of the top plate 690. The diffuser 402 can be positioned over the outlet 698 to promote suction of fluid out of the cavity 694. In some embodiments, the top cap 404 can include a handle 405 extending from the top cap 404 to allow for removal of the hydrocyclonic particle separator assembly 400 from the motor housing (see, e.g., FIGS. 27 and 28). In particular, a user can grasp the handle 405 to disengage the hydrocyclonic particle separator assembly 400 from the motor housing.

When assembled, each of the rounded lobes 692 is positioned over the respective vortex finder 412 and cyclone container 420 such that fluid can exit the cyclone container 420 through the respective vortex finder 412, travels into the cavity 694, and out of the outlet 698. Thus, individual fluid cyclonic flows within the cyclone block 418 can merge within the cavity 694 prior to being expelled from the outlet 698. The top cap 404 can be secured to the cyclone block 418 by a plurality of screws or bolts. A plurality of screws of bolts can similarly be used to secure the fine debris container top 432, the fine debris container 434 and the canister body 440. The large debris container 444 can be placed in a closed position by positioning the large debris container 444 against the gasket 442, and the extension 458 of the large debris container 444 can be engaged with the locking assembly 448. In particular, the extension 458 can be flexed outwardly to position the large debris container 444 against the gasket 442, and released to allow a curved hook of the extension 458 to engage a protrusion of the locking assembly 448. The slide cover 454 can be positioned over the snap plate 450 to maintain engagement of the extension 458 with the locking assembly 448.

With reference to FIGS. 45-49, perspective, top, side and bottom views of a second embodiment of an exemplary pool cleaner 700 are provided. The pool cleaner 700 includes an outer housing or skin (not shown) in which one or more components of the pool cleaner 700 can be enclosed. The pool cleaner 700 can be implemented with the hydrocyclonic particle separator assembly 400 discussed above. The pool cleaner 700 generally includes a drive assembly 702 and a motor assembly 704. In an exemplary embodiment, the pool leaner 700 is an electric pool cleaner that includes six rollers and the hydrocyclonic particle separator assembly 400. The motor assembly 704 can be powered by an electric cable (not shown) extending to a power source at the surface of the swimming pool, a battery and/or inductive coupling, for example.

The drive assembly 702 includes a motor housing 706, an intake 708, six brushed rollers 710a-f, a first roller drive 712 and a second roller drive 714. The first and second roller drives 712, 714 are positioned on opposite sides of the motor housing 706. Each of the roller drives 712, 714 is respectively in operative communication with a first and second motor (not shown) positioned within the motor housing 706. A first roller set (rollers 710a, 710c, 710e) is in mechanical communication with the first roller drive 712, which is in communication with the first drive motor so that each of the rollers of the first roller set (e.g., rollers 710a, 710c, 710e) turn in the same direction and independently from a second roller set (rollers 710b, 710d, 710f). In some embodiments, each of the rollers of the first roller set (rollers 710a, 710c, 710e) can be independently spun relative to each other. The second roller set (rollers 710b, 710d, 710f) is in mechanical communication with the second roller drive 714, which is in communication with the second drive motor, so each of the rollers of the second roller set (e.g., rollers 710b, 710d, 710f) turn in the same direction and independently from the first roller set (rollers 710a, 710c, 710e). In some embodiments, the rollers of the first roller set can turn at the same rate, and the rollers of the second roller set can turn at the same rate. For purposes of turning the pool cleaner 700, the first set of rollers can be driven to turn in a single direction and the second set of rollers can be driven to turn in an opposing direction, thereby generating a moment for turning the pool cleaner 700. Each of the rollers 710a-f can be mounted to roller mounts 716a-d of the motor housing 706. Each of the roller drives 712, 714 includes a first drive train 734, 736 disposed underneath the motor housing 706 and a second drive train 738, 740 disposed on the respective sides of the frame of the pool cleaner 700. In some embodiments, one or more split bearings 739 can be used in combination with the first and second drive trains 734, 736, 738, 740.

The intake 708 includes a body 718 extending the width of the pool cleaner 700 between the rollers 710 c, d and the rollers 710 e, f. The intake 708 includes an inlet opening 720 and an outlet opening 722 defined by the body 718. A channel 724 extends between the inlet opening 720 and the outlet opening 722. A rim 726 extends about the perimeter of the outlet opening 722 and is configured and dimensioned to cooperate with inlet 446 of the canister body 440.

The motor housing 706 includes a motor shaft 728 with a male member 730 that engages the female member 650 of the shaft 414. In particular, the hydrocyclonic particle separator assembly 400 can be mounted over the male member 730 of the motor shaft 728 such that engagement between the motor shaft 728 and the shaft 414 occurs. The motor shaft 728 can thereby drive the hydrocyclonic particle separator assembly 400. A locking interface 732 on the motor housing 706 can detachably interlock relative to a bottom surface of the large debris container 444 to interlock the hydrocyclonic particle separator assembly 400 with the motor housing 706. For example, the bottom surface of the large debris container 444 can include a concave portion 445 configured and dimensioned to receive the locking interface 732 of the motor housing 706.

With reference to FIG. 50, a bottom view of a third embodiment of an exemplary pool cleaner 742 is provided. The pool cleaner 742 includes an outer housing or skin (not shown) in which one or more components of the pool cleaner 742 can be enclosed. The pool cleaner 742 can be substantially similar in structure and function to the pool cleaner 742, except for the distinctions noted herein. Therefore, like reference numbers are used for like structures. In particular, rather than including six rollers 710a-f, the pool cleaner 742 includes four brushed rollers 744a-d. Specifically, the pool cleaner 742 includes a single front roller 744a and a single rear roller 744d. The pool cleaner 742 includes a first roller drive 746 and a second roller drive 748 positioned on opposite sides of the motor housing 706. Each of the roller drives 746, 748 is in operative communication with respective first and second motors (not shown) positioned within the motor housing 706.

A first roller set (rollers 744a, 744b) is in mechanical communication with the first roller drive 746, which is in communication with the first drive motor so that each of the rollers of the first roller set (e.g., rollers 744a, 744b) turn in the same direction and independently from a second roller set (rollers 744c, 744d). In some embodiments, each of the rollers of the first roller set (744a, 744b) can be independently spun relative to each other. The second roller set (rollers 744c, 744d) is in mechanical communication with the second roller drive 748, which is in communication with the second drive motor, so each of the rollers of the second roller set (e.g., 744c, 744d) turn in the same direction and independently from the first roller set (744a, 744b). In some embodiments, the rollers of the first roller set can turn at the same rate, and the rollers of the second roller set can turn at the same rate.

During operation, turning capability can be provided by the moment created by the middle split rollers 744b, 744c. In particular, rotation of the rollers 744b, 744c in their opposing respective directions creates a moment for rotating the pool cleaner 742. Each of the rollers 744a-d can be mounted to roller mounts 750a-d of the motor housing 706. Each of the roller drives 746, 748 includes a first drive train 734, 736 disposed underneath the motor housing 706 and a second drive train 752, 754 disposed on the respective sides of the frame of the pool cleaner 742.

When the hydrocyclonic particle separator assembly 400 is fully assembled and attached to the motor housing 706 and intake 708, a plurality of different chambers and flow paths are formed. FIG. 25 is a sectional view of the hydrocyclonic particle separator assembly 400 showing, among other things, reference numbers for the chambers and flow paths within the pool cleaner.

A first chamber C1 is generally formed at the interior of the canister body 440 and as a portion of the inner chamber 470 of the canister body 440. The first chamber C1 is generally delineated as being between the inside of the canister body 440, the outside of the filtering assembly 426, and the outside of the fine debris container 434. The first chamber C1 receives debris-laden water having large and small debris contained therein. Flow of the debris-laden water within the first chamber C1 is discussed in greater detail below. A second chamber C2 is generally formed at the interior of the large debris container 444. The second chamber C2 receives and retains large debris filtered from the water. The third chamber C3 is generally formed between the outer surfaces of the cyclone containers 420 of the cyclone block 418, and is generally delineated as being between the inside of the filtering assembly 426, the outer surfaces of the cyclone containers 420, the ring body 652 of the ring 410 of vortex finders 412, and the fine debris container top 432. The third chamber C3 receives once-filtered debris-laden water from the first chamber C1, e.g., water that has small debris contained therein with the large debris filtered out and retained in the second chamber C2.

Fourth and fifth chambers C4, C5 are generally formed within each of the cyclone containers 420 of the first and second set of cyclone containers 624, 626. In particular, the fourth chamber C4 is formed within the cyclone containers 420 of the second set of cyclone containers 626 and the fifth chamber C4 is formed within the cyclone containers 420 of the first set of cyclone containers 624. As will be discussed in greater detail below, once-filtered debris-laden water can enter the fourth and fifth chambers C4, C5 substantially simultaneously. The fourth and fifth chambers C4, C5 are generally delineated as being within the inner chambers 470 of the cyclone containers 420 between the interior of a cyclone container 440 and a vortex finder 412. The fourth and fifth chambers C4, C5 receive the once-filtered debris-laden water from the third chamber C3.

A sixth chamber C6 is generally formed at the interior of the fine debris container 434, and is generally delineated as being between the central radial extension 526 of the fine debris container 434, the central radial extension 564 of the fine debris container top 432, and the gasket 468. The sixth chamber C6 is a static flow area that receives small debris that is separated out from the once-filtered debris-laden water that passes through the fourth and fifth chambers C4, C5. The once-filtered debris-laden water is filtered a second time in the fourth and fifth chambers C4, C5, where small debris "falls out" from the water and passes through the debris underflow nozzles 634 of each respective individual cyclone container 420 and into the sixth chamber C6.

The seventh chamber C7 extends from the uniform channel 676 of each vortex finder 412 to the central outlet 698 of the top cap 404. The seventh chamber C7 is generally delineated by the interior of the plurality of vortex finders 412, the interior chamber of each rounded lobe 692, the central outlet 698, the parabolically-shaped outer surface of the impeller skirt 408, and the top of the diffuser 402. Accordingly, the seventh chamber C7 is a lobed chamber that originates at the channel 676 of each individual vortex finder 412 and extends to the central outlet 698 of the top cap 404, with the impeller 406, impeller skirt 408 and diffuser 402 being positioned in the seventh chamber C7. The seventh chamber C7 receives the twice-filtered water, e.g., water having minimal debris therein, from the fourth and fifth chambers C4, C5, and expels the filtered water from the central outlet 698.

Turning now to a description of the flow paths through the hydrocyclonic particle separator assembly 400, FIG. 25 is a sectional view of the hydrocyclonic particle separator assembly 400 that illustrates the flow paths therethrough. Although not shown in FIG. 25, it should be understood that the flow path within the intake 708 of the pool cleaner 700, 742 leading to the hydrocyclonic particle separator 400 is substantially similar to the flow paths shown in FIG. 10C.

Thus, a first flow path F1 extends from the inlet opening 720 of the intake 708, across the channel 724, out of the outlet opening 722, into the inlet 446 of the canister body 440, across the canister intake channel 474, and out of the tangential outlet 472 where the fluid enters the canister body 440. Water flowing through the first flow path F1 is unfiltered water that is laden with large and small debris $D_L$, $D_S$.

The second flow path F2 starts at the end of the first flow path F1, e.g., at the tangential outlet 472, entering the inner chamber 470 of the canister body 440 at the tangential outlet 472. The second flow path F2 enters the inner chamber 470 at a tangent to the canister body 440, the inner chamber 470, and the first chamber C1 and is directed to flow between the inner wall of the canister body 440 and the filtering assembly 426. The tangential entrance of the second flow path F2 results in the generation of a cyclonic/rotational flow within the first chamber C1 that circles about a central axis A2 of the hydrocyclonic particle separator assembly 400. The cyclonic flow of the second flow path F2 within the first chamber C1 results in large debris particles $D_L$, e.g., debris having an aggregate size (e.g., each dimension) of up to about 1.25 inches, for example, such as, sticks, leaves, grass, coarse sand, fine sand, stones, pebbles, insects, small animals, etc., striking the interior surface of the canister body 440 and the filtering assembly 426 and losing velocity, resulting in the large debris particles $D_L$ falling to the bottom of the canister body 440 and into the large debris container 444 (e.g., the second chamber C2) where they are collected and stored until the hydrocyclonic particle separator assembly 400 is removed from the pool cleaner and emptied.

A third flow path F3 extends radially inward from the second flow path F2, flowing across the filtering medium 430 of the filtering assembly 426 into the third chamber C3. Fluid and smaller debris $D_S$ are contained in the third flow path F3, but the larger debris $D_L$ has been separated out. Accordingly, the fluid in the third flow path F3 is once-filtered fluid. The third flow path F3 enters the third chamber C3 around the outer surface of the frustoconical bottom portions 640 of the cyclone containers 420 and rises upward in the direction of the cylindrical top portions 638 of the cyclone containers 420. As the fluid of the third flow path F3 reaches the tangential inlet 636 of each of the cyclone containers 420, the third flow path F3 connects with fourth and fifth flow paths F4, F5. In particular, the third flow path F3 enters each of the cyclone containers 420 of the first and second set of cyclone containers 624, 626 substantially simultaneously as fluid rises to the level of the tangential inlets 636.

The fourth flow path F4 enters each individual cyclone container 420 of the second set of cyclone containers 626 at the respective tangential inlet 636 where it proceeds to the respective cyclone chamber 630, e.g., the fourth chamber C4. Substantially simultaneously to the fourth flow path F4 entering the cyclone containers 420 of the second set of cyclone containers 626, the fifth flow path F5 enters each individual cyclone container 420 of the first set of cyclone containers 624 at the respective tangential inlet 636 where it proceeds to the respective cyclone chamber 630, e.g., the fifth chamber C5. The placement of the individual cyclone container's tangential inlet 636, e.g., at a tangent to the respective cyclone chamber 630, results in the fourth and fifth flow paths F4, F5 being a cyclonic/rotational flow within each cyclone chamber 630. The fourth and fifth flow paths F4, F5 rotate within each individual cyclone container 440 of the respective second and first set of cyclone containers 626, 624 to separate smaller debris $D_S$, e.g., debris having an aggregate size (e.g., each dimension) of up to about 0.080 inches, for example, such as, coarse sand, fine sand, silt, dirt, insects, etc., based on the ratio of the smaller debris' $D_S$ centripetal force to fluid resistance from the fluid stream of the fourth and fifth flow paths F4, F5. More specifically, the fourth and fifth flow paths F4, F5 travel along the interior wall of the respective cyclone container 420, travels downward along the cyclone container 420 through the frustoconical bottom portion 640 where the cyclone container 420 tapers, and toward the debris underflow nozzle 634.

As the fourth and fifth flow paths F4, F5 travel along the frustoconical bottom portion 640, the rotational radius of the fourth and fifth flow paths F4, F5 is reduced. As the rotational radius of the fourth and fifth flow paths F4, F5 is reduced, the larger and denser particles of the smaller debris particles $D_S$ within the fourth and fifth flow paths F4, F5 have too much inertia to follow the continually reducing rotational radius of the fourth and fifth flow paths F4, F5 causing the smaller debris particles $D_S$ to contact the inner surface of the cyclone container 420 and fall to the bottom where the small debris particles $D_S$ fall through the respective debris underflow nozzles 634 and onto the tapered fine debris container 434. The tapered configuration of the fine debris container 434 causes the small debris particles $D_S$ to slide downward and into the sixth chamber C6 where the small debris particles $D_S$ are collected and stored by the fine debris container 434 until the hydrocyclonic particle separator assembly 400 is removed from the pool cleaner and emptied. Thus, the small debris particles $D_S$ separated from the water in both the first and second set of cyclone containers 624, 626 is collected in the same fine debris container 434 until the pool cleaner is emptied.

The result of the above description is that smaller and smaller debris is separated from the fluid flowing in the fourth and fifth flow paths F4, F5 as these flow paths proceed down the frustoconical bottom portions 640 of the respective cyclone containers 420 forming an inner vortex. Additionally, as the fluid within the fourth and fifth flow paths F4, F5 reaches the bottom of the frustoconical bottom portions 640 and the inner vortex, it slows down causing the fluid therein to be pulled upward through the respective vortex finders 412 as twice-filtered fluid. The twice-filtered fluid enters the seventh chamber C7 where it merges with the sixth flow path F6.

The sixth flow path F6 connects with the fourth and fifth flow paths F4, F5 at the top of the channel 676 of each vortex finder 412 where twice-filtered water enters the seventh chamber C7. The sixth flow path F6 extends from the channel 676 of each vortex finder 412, across each inner lobe 692 of the top cap 404, into the tubular outlet 698, and through the diffuser 402 to exit the hydrocyclonic particle separator assembly 400. That is, the sixth flow path F6 completely traverses the seventh chamber C7.

Accordingly, the larger cyclonic/rotational flow travels about the central axis A2, while the smaller cyclonic/rotational flows are formed and flow about the secondary central axes of the individual cyclone containers 420 of the cyclone block 418, resulting in a plurality of smaller cyclonic/rotational flows within a larger cyclonic/rotational flow. In particular, the hydrocyclonic particle separator assembly 400 includes three levels of cyclonic/rotational flow—around the filtering assembly 426, within the second set of cyclone containers 626, and within the first set of cyclone containers 624.

As such, debris-laden fluid flowing through the pool cleaner is filtered twice by particle separation due to the generated cyclones. Utilizing the cyclonic flows within the pool cleaner to separate the particles and drop the particles out of the flow path results in the retention of suction performance throughout the cleaner, as there is no opportunity for the debris particles to clog the filtering elements. This allows for optimum fluid flow performance through entire cleaning cycles, longer cleaner run times between debris removal, and the collection of more debris before needing to empty the hydrocyclonic particle separator assembly 400. As is known in the art, the outward flow of clean fluid results in an opposing force, which, as is also known in the art, can be relied upon in navigation of the pool cleaner for the purpose of forcing a pool cleaner downward against the floor when the pool cleaner is traversing the floor and sideways against a wall, when the pool cleaner is traversing a wall of the pool.

It will be understood that the embodiments of the present disclosure described herein are merely exemplary and that a person skilled in the art may make many variations and modifications without departing from the spirit and the scope of the disclosure. All such variations and modifications, including those discussed above, are intended to be included within the scope of the disclosure.

The invention claimed is:

1. A pool cleaner, comprising: a canister body including an inner chamber within inner walls of the canister body;
   a filtering medium assembly disposed within the inner chamber of the canister body;
   a fine debris container disposed within the inner chamber of the canister body, the fine debris container including a dish and a central radial extension protruding from a bottom surface of the fine debris container; and
   a cyclone block disposed within the inner chamber of the canister body and at least partially surrounded by the filtering medium assembly, the cyclone block including a plurality of cyclone containers;
   wherein a first cyclonic flow is generated between the inner walls of the canister body and the filtering medium assembly; and
   wherein a second cyclonic flow is generated within each of the plurality of cyclone containers.

2. The pool cleaner of claim 1, wherein the canister body defines a cylindrical configuration.

3. The pool cleaner of claim 1, wherein the canister body comprises a tangential inlet.

4. The pool cleaner of claim 1, wherein the filtering medium assembly comprises a filtering medium support and a filtering medium.

5. The pool cleaner of claim 1, wherein the filtering medium assembly is configured to separate large debris particles from a fluid flow during the first cyclonic flow.

6. The pool cleaner of claim 1, wherein each of the cyclone containers comprises a cylindrical cyclone chamber with a tangential inlet and a debris underflow nozzle.

7. The pool cleaner of claim 6, wherein the cyclone containers are radially disposed around a central axis.

8. The pool cleaner of claim 1, wherein each of the cyclone containers comprises a cylindrical top portion, a frustoconical bottom portion, and a debris underflow nozzle at a distal end of the cyclone container.

9. The pool cleaner of claim 1, wherein the plurality of cyclone containers comprises a first set of radially disposed cyclone containers and a second set of radially disposed cyclone containers positioned around the first set of radially disposed cyclone containers.

10. The pool cleaner of claim 1, wherein each of the plurality of cyclone containers is configured to separate small debris particles from a fluid flow during the second cyclonic flow.

11. The pool cleaner of claim 1, comprising a large debris container hingedly connected to a bottom edge of the canister body.

12. The pool cleaner of claim 11, wherein the large debris container comprises a dish including upwardly angled side walls.

13. The pool cleaner of claim 11, comprising a debris separator ring disposed between the filtering medium assembly and the large debris container.

14. The pool cleaner of claim 13, wherein the debris separator ring comprises a mesh ring configured to maintain large debris particles within the large debris container.

15. The pool cleaner of claim 1, wherein the fine debris container dish comprises a rounded dish including a central hub.

16. The pool cleaner of claim 1, wherein the central radial extension defines an inner chamber configured and dimensioned to maintain small debris particles separated from a fluid flow during the second cyclonic flow.

17. The pool cleaner of claim 16, wherein the central radial extension is disposed against a dish of a large debris container, the central radial extension maintaining a separation between the small debris particles within the inner chamber and large debris particles collected in the large debris container.

18. The pool cleaner of claim 17, comprising a gasket disposed between the dish of the large debris container and the central radial extension, the gasket maintaining separation between the small debris particles within the inner chamber and the large debris particles collected in the large debris container.

19. The pool cleaner of claim 18, wherein positioning the large debris container in an open position simultaneously empties the large debris container and the inner chamber of the fine debris container.

20. The pool cleaner of claim 1, comprising a ring of vortex finders, each of the vortex finders positioned within respective cyclone containers of the plurality of cyclone containers.

21. The pool cleaner of claim 20, wherein the ring of vortex finders comprises a central portion and a plurality of perimeter flaps, each of the perimeter flaps including a vortex finder.

22. The pool cleaner of claim 21, wherein a top surface of the central portion is recessed relative to surfaces of the plurality of perimeter flaps.

23. The pool cleaner of claim 21, wherein each of the plurality of perimeter flaps are hingedly connected to a polygonal perimeter of the central portion.

24. The pool cleaner of claim 1, comprising a top cap disposed over the canister body.

25. The pool cleaner of claim 24, wherein the top cap comprises a plurality of radially arched tubes defining a chamber extending to an outlet.

26. The pool cleaner of claim 24, wherein the top cap comprises a plurality of rounded lobes defining a chamber extending to an outlet.

27. The pool cleaner of claim 1, comprising a drive assembly comprising one front roller, one rear roller, and two middle rollers.

28. The pool cleaner of claim 1, comprising a drive assembly comprising two front rollers, two middle rollers, and two rear rollers.

29. A pool cleaner, comprising:
a drive assembly including one front roller, one rear roller, a first middle roller, and a second middle roller, the first and second middle rollers being disposed adjacent to each other;
a motor housing mounted relative to the drive assembly, the motor housing including a first drive motor and a second drive motor; and
a hydrocyclonic particle separator assembly mounted to the motor housing;
wherein the first drive motor drives rotation of the one front roller and the first middle roller; and
wherein the second drive motor drives rotation of the one rear roller and the second middle roller.

30. The pool cleaner of claim 29, wherein the first drive motor drives the one front roller and the first middle roller at the same rate.

31. The pool cleaner of claim 29, wherein the second drive motor drives the one rear roller and the second middle roller at the same rate.

32. A pool cleaner, comprising:
a drive assembly including a first front roller, a second front roller, a first middle roller, a second middle roller, a first rear roller, and a second rear roller, the first and second front rollers being disposed adjacent to each other, the first and second middle rollers being disposed adjacent to each other, and the first and second rear rollers being disposed adjacent to each other;
a motor housing mounted relative to the drive assembly, the motor housing including a first drive motor and a second drive motor; and
a hydrocyclonic particle separator assembly mounted to the motor housing;
wherein the first drive motor drives rotation of the first front roller, the first middle roller, and the first rear roller; and
wherein the second drive motor drives rotation of the second front roller, the second middle roller, and the second rear roller.

33. The pool cleaner of claim 32, wherein the first drive motor drives the first front roller, the first middle roller, and the first rear roller at the same rate.

34. The pool cleaner of claim 32, wherein the second drive motor drives the second front roller, the second middle roller, and the second rear roller at the same rate.

35. The pool cleaner of claim 32, comprising:
a canister body including an inner chamber within inner walls of the canister body;
a filtering medium assembly disposed within the inner chamber of the canister body; and
a cyclone block disposed within the inner chamber of the canister body and at least partially surrounded by the filtering medium assembly, the cyclone block including a plurality of cyclone containers;
wherein a first cyclonic flow is generated between the inner walls of the canister body and the filtering medium assembly; and
wherein a second cyclonic flow is generated within each of the plurality of cyclone containers.

36. The pool cleaner of claim 35, wherein the canister body defines a cylindrical configuration.

37. The pool cleaner of claim 35, wherein the canister body comprises a tangential inlet.

38. The pool cleaner of claim 35, wherein the filtering medium assembly comprises a filtering medium support and a filtering medium.

39. The pool cleaner of claim 35, wherein the filtering medium assembly is configured to separate large debris particles from a fluid flow during the first cyclonic flow.

40. The pool cleaner of claim 35, wherein each of the cyclone containers comprises a cylindrical cyclone chamber with a tangential inlet and a debris underflow nozzle.

41. The pool cleaner of claim 40, wherein the cyclone containers are radially disposed around a central axis.

42. The pool cleaner of claim 35, wherein each of the cyclone containers comprises a cylindrical top portion, a frustoconical bottom portion, and a debris underflow nozzle at a distal end of the cyclone container.

43. The pool cleaner of claim 35, wherein the plurality of cyclone containers comprises a first set of radially disposed cyclone containers and a second set of radially disposed cyclone containers positioned around the first set of radially disposed cyclone containers.

44. The pool cleaner of claim 35, wherein each of the plurality of cyclone containers is configured to separate small debris particles from a fluid flow during the second cyclonic flow.

45. The pool cleaner of claim 35, comprising a large debris container hingedly connected to a bottom edge of the canister body.

46. The pool cleaner of claim 45, wherein the large debris container comprises a dish including upwardly angled side walls.

47. The pool cleaner of claim 45, comprising a debris separator ring disposed between the filtering medium assembly and the large debris container.

48. The pool cleaner of claim 47, wherein the debris separator ring comprises a mesh ring configured to maintain large debris particles within the large debris container.

49. The pool cleaner of claim 35, comprising a fine debris container disposed within the inner chamber of the canister body.

50. The pool cleaner of claim 49, wherein the fine debris container comprises a rounded dish including a central hub.

51. The pool cleaner of claim 49, wherein the fine debris container comprises a dish and a central radial extension protruding from a bottom surface of the fine debris container.

52. The pool cleaner of claim 51, wherein the central radial extension defines an inner chamber configured and dimensioned to maintain small debris particles separated from a fluid flow during the second cyclonic flow.

53. The pool cleaner of claim 52, wherein the central radial extension is disposed against a dish of a large debris container, the central radial extension maintaining a separation between the small debris particles within the inner chamber and large debris particles collected in the large debris container.

54. The pool cleaner of claim 53, comprising a gasket disposed between the dish of the large debris container and the central radial extension, the gasket maintaining separation between the small debris particles within the inner chamber and the large debris particles collected in the large debris container.

55. The pool cleaner of claim 54, wherein positioning the large debris container in an open position simultaneously empties the large debris container and the inner chamber of the fine debris container.

56. The pool cleaner of claim 35, comprising a ring of vortex finders, each of the vortex finders positioned within respective cyclone containers of the plurality of cyclone containers.

57. The pool cleaner of claim 56, wherein the ring of vortex finders comprises a central portion and a plurality of perimeter flaps, each of the perimeter flaps including a vortex finder.

58. The pool cleaner of claim 57, wherein a top surface of the central portion is recessed relative to surfaces of the plurality of perimeter flaps.

59. The pool cleaner of claim 57, wherein each of the plurality of perimeter flaps are hingedly connected to a polygonal perimeter of the central portion.

60. The pool cleaner of claim 35, comprising a top cap disposed over the canister body.

61. The pool cleaner of claim 60, wherein the top cap comprises a plurality of radially arched tubes defining a chamber extending to an outlet.

62. The pool cleaner of claim 60, wherein the top cap comprises a plurality of rounded lobes defining a chamber extending to an outlet.

63. A pool cleaner, comprising:
a canister body including an inner chamber within inner walls of the canister body;
a filtering medium assembly disposed within the inner chamber of the canister body;
a cyclone block disposed within the inner chamber of the canister body and at least partially surrounded by the filtering medium assembly, the cyclone block including a plurality of cyclone containers; and
a ring of vortex finders, the ring of vortex finders including a central portion and a plurality of perimeter flaps, each of the perimeter flaps including a vortex finder, each of the vortex finders positioned within respective cyclone containers of the plurality of cyclone containers
wherein a first cyclonic flow is generated between the inner walls of the canister body and the filtering medium assembly; and
wherein a second cyclonic flow is generated within each of the plurality of cyclone containers.

64. The pool cleaner of claim 63, wherein the canister body defines a cylindrical configuration.

65. The pool cleaner of claim 63, wherein the canister body comprises a tangential inlet.

66. The pool cleaner of claim 63, wherein the filtering medium assembly comprises a filtering medium support and a filtering medium.

67. The pool cleaner of claim 63, wherein the filtering medium assembly is configured to separate large debris particles from a fluid flow during the first cyclonic flow.

68. The pool cleaner of claim 63, wherein each of the cyclone containers comprises a cylindrical cyclone chamber with a tangential inlet and a debris underflow nozzle.

69. The pool cleaner of claim 68, wherein the cyclone containers are radially disposed around a central axis.

70. The pool cleaner of claim 63, wherein each of the cyclone containers comprises a cylindrical top portion, a frustoconical bottom portion, and a debris underflow nozzle at a distal end of the cyclone container.

71. The pool cleaner of claim 63, wherein the plurality of cyclone containers comprises a first set of radially disposed cyclone containers and a second set of radially disposed cyclone containers positioned around the first set of radially disposed cyclone containers.

72. The pool cleaner of claim 63, wherein each of the plurality of cyclone containers is configured to separate small debris particles from a fluid flow during the second cyclonic flow.

73. The pool cleaner of claim 63, comprising a large debris container hingedly connected to a bottom edge of the canister body.

74. The pool cleaner of claim 73, wherein the large debris container comprises a dish including upwardly angled side walls.

75. The pool cleaner of claim 73, comprising a debris separator ring disposed between the filtering medium assembly and the large debris container.

76. The pool cleaner of claim 75, wherein the debris separator ring comprises a mesh ring configured to maintain large debris particles within the large debris container.

77. The pool cleaner of claim 63, comprising a fine debris container disposed within the inner chamber of the canister body.

78. The pool cleaner of claim 77, wherein the fine debris container comprises a rounded dish including a central hub.

79. The pool cleaner of claim 77, wherein the fine debris container comprises a dish and a central radial extension protruding from a bottom surface of the fine debris container.

80. The pool cleaner of claim 79, wherein the central radial extension defines an inner chamber configured and dimensioned to maintain small debris particles separated from a fluid flow during the second cyclonic flow.

81. The pool cleaner of claim 80, wherein the central radial extension is disposed against a dish of a large debris container, the central radial extension maintaining a separation between the small debris particles within the inner chamber and large debris particles collected in the large debris container.

82. The pool cleaner of claim 81, comprising a gasket disposed between the dish of the large debris container and the central radial extension, the gasket maintaining separation between the small debris particles within the inner chamber and the large debris particles collected in the large debris container.

83. The pool cleaner of claim 82, wherein positioning the large debris container in an open position simultaneously empties the large debris container and the inner chamber of the fine debris container.

84. The pool cleaner of claim 63, wherein a top surface of the central portion is recessed relative to surfaces of the plurality of perimeter flaps.

85. The pool cleaner of claim 63, wherein each of the plurality of perimeter flaps are hingedly connected to a polygonal perimeter of the central portion.

86. The pool cleaner of claim 63, comprising a top cap disposed over the canister body.

87. The pool cleaner of claim 86, wherein the top cap comprises a plurality of radially arched tubes defining a chamber extending to an outlet.

88. The pool cleaner of claim 86, wherein the top cap comprises a plurality of rounded lobes defining a chamber extending to an outlet.

89. The pool cleaner of claim 63, comprising a drive assembly comprising one front roller, one rear roller, and two middle rollers.

90. The pool cleaner of claim 63, comprising a drive assembly comprising two front rollers, two middle rollers, and two rear rollers.

* * * * *